(12) United States Patent
Sybert et al.

(10) Patent No.: US 9,365,719 B2
(45) Date of Patent: *Jun. 14, 2016

(54) MARINE VEHICLE COMPONENT COMPRISING FLAME RETARDANT COMPOSITIONS, AND METHODS OF MANUFACTURE

(75) Inventors: Paul Dean Sybert, Evansville, IN (US); James Franklin Hoover, Evansville, IN (US); Thomas L. Evans, Mt. Vernon, IN (US)

(73) Assignee: SABIC GLOBAL TECHNOLOGIES B.V. (NL)

(*) Notice: Subject to any disclaimer, the term of this patent is extended or adjusted under 35 U.S.C. 154(b) by 1093 days.

This patent is subject to a terminal disclaimer.

(21) Appl. No.: 13/436,782

(22) Filed: Mar. 30, 2012

(65) Prior Publication Data

US 2012/0269994 A1 Oct. 25, 2012

Related U.S. Application Data

(63) Continuation-in-part of application No. 13/251,122, filed on Sep. 30, 2011, now Pat. No. 8,981,015.

(30) Foreign Application Priority Data

Mar. 31, 2011 (IN) .............................. 920/DEL/2011

(51) Int. Cl.
| | |
|---|---|
| C08L 83/04 | (2006.01) |
| C08L 83/06 | (2006.01) |
| C08L 69/00 | (2006.01) |
| C08L 63/00 | (2006.01) |
| C08K 3/22 | (2006.01) |
| C08K 5/00 | (2006.01) |

(52) U.S. Cl.
CPC . *C08L 83/06* (2013.01); *C08K 3/22* (2013.01); *C08K 5/0041* (2013.01); *C08K 2003/2237* (2013.01); *C08L 63/00* (2013.01); *C08L 69/00* (2013.01); *Y10T 428/31507* (2015.04)

(58) Field of Classification Search
CPC ................................. C08L 83/06; C08L 83/04
See application file for complete search history.

(56) References Cited

U.S. PATENT DOCUMENTS

| | | | |
|---|---|---|---|
| 3,539,655 A | 11/1970 | Strachan et al. | |
| 3,539,657 A | 11/1970 | Noshay et al. | |
| 3,751,400 A | 8/1973 | Crennan et al. | |
| 3,929,908 A | 12/1975 | Orlando et al. | |
| 4,170,711 A | 10/1979 | Orlando et al. | |
| 4,404,350 A | 9/1983 | Ryang | |
| 4,443,581 A | 4/1984 | Robeson et al. | |
| 4,690,997 A | 9/1987 | Cella et al. | |
| 4,808,686 A | 2/1989 | Cella et al. | |
| 4,814,392 A | 3/1989 | Shea et al. | |
| 4,923,933 A * | 5/1990 | Curry .............. | 525/439 |
| 5,204,438 A | 4/1993 | Snow et al. | |
| 5,451,632 A | 9/1995 | Okumura et al. | |
| 5,596,048 A | 1/1997 | Blohm et al. | |
| 5,981,661 A | 11/1999 | Liao et al. | |
| 6,031,036 A * | 2/2000 | Rosenquist et al. .......... | 524/164 |
| 6,140,399 A | 10/2000 | Munro | |
| 6,462,111 B1 | 10/2002 | Singh et al. | |
| 6,723,864 B2 | 4/2004 | Silva et al. | |
| 6,753,367 B2 | 6/2004 | Goossens et al. | |
| 6,822,041 B2 | 11/2004 | Schottland et al. | |
| 6,833,422 B2 | 12/2004 | Silva et al. | |
| 7,253,223 B2 | 8/2007 | Kawato et al. | |
| 7,309,730 B2 | 12/2007 | Kim | |
| 7,652,107 B2 | 1/2010 | Gallucci et al. | |
| 7,790,292 B2 | 9/2010 | Colborn et al. | |
| 7,928,168 B2 | 4/2011 | Li et al. | |
| 2005/0085580 A1 | 4/2005 | Marugan et al. | |
| 2006/0030664 A1* | 2/2006 | Kim .............................. | 524/588 |
| 2007/0135569 A1 | 6/2007 | DeRudder | |
| 2008/0230751 A1 | 9/2008 | Li et al. | |
| 2008/0823075 | 9/2008 | Li et al. | |
| 2009/0043053 A1 | 2/2009 | Gorny et al. | |
| 2009/0326129 A1 | 12/2009 | Rogunova et al. | |
| 2010/0075125 A1 | 3/2010 | Maas et al. | |
| 2011/0098386 A1 | 4/2011 | Krauter et al. | |
| 2011/0207846 A1* | 8/2011 | Monden ........................ | 523/134 |
| 2012/0248102 A1 | 10/2012 | Van De Wetering et al. | |
| 2013/0284991 A1 | 10/2013 | Sybert et al. | |

FOREIGN PATENT DOCUMENTS

| | | |
|---|---|---|
| DE | 102008054329 A1 | 5/2010 |
| EP | 0524731 A1 | 1/1993 |
| EP | 0524731 B1 | 3/2002 |
| EP | 0899306 B1 | 11/2004 |
| EP | 1555296 A1 | 7/2005 |
| WO | 2005037921 A1 | 4/2005 |
| WO | 2010005486 A3 | 1/2010 |

OTHER PUBLICATIONS

U.S. Appl. No. 13/027,930, filed Aug. 11, 2011.
U.S. Appl. No. 13/207,939, filed Aug. 11, 2011.
U.S. Appl. No. 13/207,946, filed Aug. 11, 2011.
U.S. Appl. No. 13/251,122, filed Sep. 30, 2011.
U.S. Appl. No. 13/251,130, filed Sep. 30, 2011.
U.S. Appl. No. 13/251,137, filed Sep. 30, 2011.
U.S. Appl. No. 13/436,787, filed Mar. 30, 2012.
U.S. Appl. No. 13/436,791, filed Mar. 30, 2012.

(Continued)

*Primary Examiner* — Margaret Moore
(74) *Attorney, Agent, or Firm* — Cantor Colburn LLP

(57) ABSTRACT

A marine vehicle component wherein the component is a partition or a light cover, and wherein the marine vehicle component is molded or formed from a thermoplastic polymer composition comprising a siloxane-containing copolymer in an amount effective to provide a total of 0.2 to 6.5 wt % of siloxane units based on the total weight of the polymers in the thermoplastic polymer composition, a bromine-containing polymer in an amount effective to provide 9 to 13 wt % of bromine, based on the total weight of the polymers in the thermoplastic polymer composition, and optionally a third polymer, wherein the wt % of the siloxane-containing copolymer, the bromine-containing polymer, and the optional third polymer, sum to 100 wt %, and 0.05 to 10 wt % of a light diffuser additive, based on the total weight of polymers in the thermoplastic polymer composition.

73 Claims, 3 Drawing Sheets

(56) References Cited

OTHER PUBLICATIONS

Evonik Industries, Europlex PPSU 99470 CF130, 2010, 8 pages.
"Federal Aviation Administration Section 28.853", Federal Aviation Regulations [online], retrieved on Nov. 18, 2011; from http://www.gpo.gov/fdsys/pkg/CFR-2011-title14-vol1/pdf/CFR-2011-title14-vol1-sec25-853.pdf, 51 pages.
"Federal Aviation Regulations Section 25, Appendix F, Part IV", Federal Aviation Regulations [online], retrieved on Nov. 18, 2011; from http://www.gpo.gov/fdsys/pkg/CFR-2011-title14-vol1/pdf/CFR-2011-title14-vol1-part25-appF.pdf, 51 pages.
Innes et al., "Flame retardants for polycarbonate—new and classical solutions", Plastics Additives & Compounding, Jan.-Feb. 2006:26-26.
Lexan EXL9930 Catalog, 2004, pp. 1-6.
Lexan Resin FST9705 Datasheet. Last updated Jan. 6, 2011, 2 pages.
International Search Report for International Application No. PCT/US2012/031132, International Filing Date Mar. 29, 2012, Date of Mailing Jun. 13, 2012, 5 pages.
Written Opinion for International Application No. PCT/US2012/031132, International Filing Date Mar. 29, 2012, Date of Mailing Jun. 13, 2012, 7 pages.
SABIC Innovative Plastics Purity+ Permformance Specialty Additives & Intermediates, 2013, pp. 1-20, www.sabic-ip.com.
International Search Report of the International Searching Authority; International Application No. PCT/US2012/031731; International Filing Date: Mar. 30, 2012; Date of Mailing: Jul. 23, 2012; 7 Pages.
Written Opinion of the International Searching Authority; International Application No. PCT/US2012/031731; International Filing Date: Mar. 30, 2012; Date of Mailing: Jul. 23, 2012; 4 Pages.

* cited by examiner

MARINE VEHICLE COMPONENT COMPRISING FLAME RETARDANT COMPOSITIONS, AND METHODS OF MANUFACTURE

CROSS-REFERENCE TO RELATED APPLICATION

This application claims priority to India Patent Application No. 920/DEL/2011, India Patent Application No. 921/DEL/2011 and India Patent Application No. 922/DEL/2011 all filed Mar. 31, 2011, the contents of all applications being incorporated by reference herein in their entirety.

BACKGROUND OF THE INVENTION

This disclosure generally relates to marine vehicle components, and more particularly to marine vehicle components comprising flame retardant compositions containing specific combinations of siloxane block copolymers.

Flame retardant (FR) polymers and polymer blends, for example polycarbonates and polycarbonate blends with UL V0 and 5V A and B Underwriters Laboratories flammability ratings are widely prepared and used, especially in a wide variety of electrical and electronic applications. Conversely, only a very limited set of polycarbonates are used in certain marine applications, particularly interior parts for passenger vessels such as windows, partition walls, ceiling panels, cabinet walls, storage compartments, galley surfaces, light panels, and the like. All of these applications have stringent flammability safety requirements that the polycarbonates must meet. Particular requirements include smoke density, flame spread, and heat release values. Furthermore, it is anticipated that marine passenger vehicle requirements will approach or align with current aircraft standards. In the United States, Federal Aviation Regulation (FAR) Part 25.853 sets forth the airworthiness standards for aircraft compartment interiors. The safety standards for transportation systems used in the United States include a smoke density test specified in FAR 25.5 Appendix F, Part V Amdt 25-116. Flammability requirements include the "60 second test" specified in FAR 25.853(a) Appendix F, Part I, (a), 1, (i) and the heat release rate standard (referred to as the OSU 65/65 standard) described in FAR F25.4 (FAR Section 25, Appendix F, Part IV), or the French flame retardant tests such as, NF-P-92-504 (flame spread) or NF-P-92-505 (drip test). In another example, the aircraft manufacturer Airbus has smoke density and other safety requirements set forth in ABD0031. In the event of a fire, components made from materials having these properties can increase the amount of time available for escape and provide for better visibility during a fire.

Despite extensive investigation, current materials that meet these FAR standards (and thus potential marine standards) could be further improved with respect to other properties. Thus, there is a perceived need for polysulfones having improved melt flow, improved ultraviolet (UV) stability, and improved light transmission. Siloxane-polyestercarbonates have low melt flow and good color stability to indoor light, but may shift in color upon exposure to UV light. Certain polycarbonate-polyetherimide blends also have low melt flow, but can be difficult to formulate so as to provide bright white compositions.

In view of the current interior material safety standards, and in anticipation of more stringent standards in the future, materials that exceed governmental and aircraft or marine vehicle manufacturer flame safety requirements are sought for anticipated marine applications. Such materials should also advantageously maintain excellent physical properties, such as toughness (high impact strength and high ductility). It would be a further advantage if such materials could be manufactured to be colorless and transparent. Still other advantageous features include good processability for forming articles, smooth surface finish, and light stability.

BRIEF SUMMARY OF THE INVENTION

Disclosed herein is a marine vehicle component wherein the component is a partition or a light cover, and wherein the marine vehicle component is molded or formed from a thermoplastic polymer composition comprising a siloxane-containing copolymer in an amount effective to provide a total of 0.2 to 6.5 wt % of siloxane units based on the total weight of the polymers in the thermoplastic polymer composition, a bromine-containing polymer in an amount effective to provide 9 to 13 wt % of bromine, based on the total weight of the polymers in the thermoplastic polymer composition, and optionally a third polymer, wherein the wt % of the siloxane-containing copolymer, the bromine-containing polymer, and the optional third polymer, sum to 100 wt %, and 0.05 to 10 wt % of a light diffuser additive, based on the total weight of polymers in the thermoplastic polymer composition; wherein a molded or formed sample of the thermoplastic polymer composition has a transmission of 20% to 90% or a haze of 70% to 99.9%, each measured using the color space CIE1931 (Illuminant C and a 2° observer) at a thickness of 3.2 mm, an OSU integrated 2 minute heat release test value of less than 65 kW-min/m$^2$ and a peak heat release rate of less than 65 kW/m$^2$, each measured using the method of FAR F25.4, in accordance with Federal Aviation Regulation FAR 25.853 (d), and an E662 smoke test Dmax value of less than 200 when measured at a thickness of 1.6 mm.

Also described is a marine vehicle component wherein the component is a partition or a light cover, and wherein the marine vehicle component is molded or formed from a thermoplastic polymer composition comprising: a siloxane-containing copolymer in an amount effective to provide a total of 0.2 to 6.5 wt % of siloxane units based on the total weight of the polymers in the thermoplastic polymer composition, a bromine-containing polymer in an amount effective to provide 9 to 13 wt % of bromine, based on the total weight of the polymers in the thermoplastic polymer composition, and optionally a third polymer, wherein the wt % of the siloxane-containing copolymer, the bromine-containing polymer, and the optional third polymer, sum to 100 wt %, and 0.05 to 10 wt % of a light diffuser additive, based on the total weight of polymers in the thermoplastic polymer composition; wherein a molded or formed sample of the thermoplastic polymer composition has a transmission of 20% to 90% or a haze of 70% to 99.9%, each measured using the color space CIE1931 (Illuminant C and a 2° observer) at a thickness of 3.2 mm, an OSU integrated 2 minute heat release test value of less than 65 kW-min/m$^2$ and a peak heat release rate of less than 65 kW/m$^2$, each measured using the method of FAR F25.4, in accordance with Federal Aviation Regulation FAR 25.853 (d), and an E662 smoke test Dmax value of less than 200 when measured at a thickness of 1.6 mm.

Also described is a marine vehicle component, wherein the marine vehicle component is a window, window dust cover, partition, light cover, electronics screen, display cover, or plastic mirror, and wherein the marine vehicle component is molded or formed from a thermoplastic polymer composition comprising: a siloxane-containing copolymer in an amount effective to provide a total of 0.2 to 1.5 wt % of siloxane units based on the total weight of polymers in the thermoplastic polymer composition; a bromine-containing polymer in an amount effective to provide 9 to 13 wt % of bromine, based on the total weight of the polymers in the thermoplastic polymer composition, and optionally, a third polymer, wherein the wt % of the siloxane-containing copolymer, the bromine-containing polymer, and the optional third polymer sum to 100 wt %; wherein a molded or formed sample of the thermoplastic polymer composition has a transmission of 87% or more or a haze of 2% or less, each measured using the color space CIE 1931 (Illuminant C and a 2° observer) at a thickness of 3.2 mm, an OSU integrated 2 minute heat release test value of less than 65 kW-min/m² and a peak heat release rate of less than 65 kW/m², each measured using the method of FAR F25.4, in accordance with Federal Aviation Regulation FAR 25.853 (d), and an E662 smoke test Dmax value of less than 200 when measured at a thickness of 1.6 mm.

Also described is a marine vehicle component, wherein the component is an access door panel, a seat component and a component of a trolley cart, wherein the marine vehicle component is molded or formed from a thermoplastic polymer composition comprising: a siloxane-containing copolymer in an amount effective to provide a total of 2.5 to 6.0 wt % of siloxane units based on the total weight of polymers in the thermoplastic polymer composition, optionally a second siloxane-containing copolymer, a bromine-containing polymer in an amount effective to provide 9 to 13 wt % of bromine, based on the total weight of the polymers in the thermoplastic polymer composition, and optionally, a third polymer wherein the wt % of the siloxane-containing copolymer, the bromine-containing polymer, and the optional third polymer, sum to 100 wt %; and wherein a molded or formed sample of the thermoplastic polymer composition has a notched Izod impact strength of 480 J/m or greater, measured according to ASTM D 256-10 at a 3.2 mm thickness at 0° C., an OSU integrated 2 minute heat release test value of less than 65 kW-min/m² and a peak heat release rate of less than 65 kW/m², each measured using the method of FAR F25.4, in accordance with Federal Aviation Regulation FAR 25.853 (d), and an E662 smoke test Dmax value of less than 200 when measured at a thickness of 1.6 mm.

Also described is a marine vehicle component, wherein the component is an access door panel, a seat component, a component of a stow bin, a magazine rack, a seat component, a component of a trolley cart, an access door panel call button, a light bezel, a door pull, a door handle, an arm rest, a foot rest, or a trolley cart, wherein the marine vehicle component is molded or formed from a thermoplastic polymer composition comprising a first siloxane-containing copolymer in an amount effective to provide a total of 2.5 to 6.0 wt % of siloxane units based on the total weight of polymers in the thermoplastic polymer composition, and wherein the siloxane-containing copolymer comprises siloxane blocks having 10 to 200 siloxane units per block; a bromine-containing polymer in an amount effective to provide 9 to 13 wt % of bromine, based on the total weight of the polymers in the thermoplastic polymer composition, and optionally a third polymer, wherein the wt % of the siloxane-containing copolymer, the bromine-containing polymer, and the optional third polymer, sum to 100 wt %; and wherein a molded or formed sample of the thermoplastic polymer composition has a notched Izod impact strength of 2.0 ft-lb/in or greater, measured according to ASTM D 256-10 at a 3.2 mm thickness at room temperature, an OSU integrated 2 minute heat release test value of less than 65 kW-min/m² and a peak heat release rate of less than 65 kW/m², each measured using the method of FAR F25.4, in accordance with Federal Aviation Regulation FAR 25.853 (d), and an E662 smoke test Dmax value of less than 200 when measured at a thickness of 1.6 mm.

Also described is a marine vehicle component, wherein the marine vehicle component is a window, window dust cover, partition, light cover, electronics screen, display cover, or plastic mirror, and wherein the marine vehicle component is molded or formed from a thermoplastic polymer composition comprising a siloxane-containing copolymer in an amount effective to provide a total of 0.2 to 1.5 wt % of siloxane units based on the total weight of polymers in the thermoplastic polymer composition, wherein a molded plaque of the siloxane-containing copolymer has a percent haze value of 3% or less measured using the color space CIE 1931 (Illuminant C and a 2° observer) at a thickness of 3.2 mm, a bromine-containing polymer in an amount effective to provide 9 to 13 wt % of bromine, based on the total weight of the polymers in the thermoplastic polymer composition, and optionally a third polymer, wherein the wt % of the siloxane-containing copolymer, the bromine-containing polymer and the optional third polymer sums to 100 wt %, wherein a molded or formed sample of the thermoplastic polymer composition has a transmission of 87% or more or a haze of 2% or less, each measured using the color space CIE 1931 (Illuminant C and a 2° observer) at a thickness of 3.2 mm, an OSU integrated 2 minute heat release test value of less than 65 kW-min/m2 and a peak heat release rate of less than 65 kW/m2, each measured using the method of FAR F25.4, in accordance with Federal Aviation Regulation FAR 25.853 (d), and an E662 smoke test Dmax value of less than 200 when measured at a thickness of 1.6 mm.

The above described and other features are exemplified by the following Detailed Description, Figures, and Examples.

BRIEF DESCRIPTION OF THE FIGURES

A description of the Figures, which are meant to be exemplary and not limiting, is provided below.

DETAILED DESCRIPTION OF THE INVENTION

Figure 1:
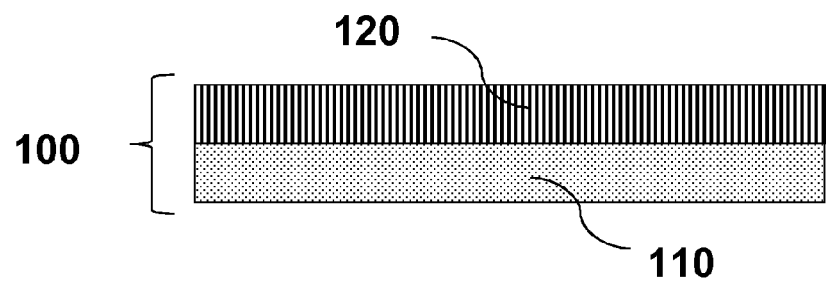
FIG. 1 is a diagram of a hard coated sheet.

The inventors hereof have discovered that flame retardant, low smoke compositions comprising specific siloxane block copolymers can unexpectedly be obtained when certain siloxane-containing copolymer compositions and bromine-containing compositions, neither of which meets strict low density smoke standards, are used in combination. In particular, certain poly(siloxane) block copolymer compositions and certain bromine-containing compositions, do not by themselves meet strict low smoke density standards when burned. However, specific combinations of these two compositions can meet low smoke density standards, and have very low heat release properties. Achieving very low smoke density and very low flammability ratings are conflicting requirements. Halogenated, specifically brominated, flame retardants are used in poly(siloxane) copolymer compositions for their effectiveness in improving flame spread properties and satisfying stringent interior flammability standards. Brominated flame retardant additives, however, cause an increase in smoke when the sheet compositions are ignited. It is therefore surprising that a brominated flame retardant can be added to a poly(siloxane) block or graft copolymer and lower the smoke density of the poly(siloxane) copolymer.

The compositions can further have excellent mechanical properties, including at least one of high impact strength, low brittleness (high ductility) as well as favorable processing characteristics, such as low melt viscosity. In a further advantageous feature, the combinations can be transparent. In another advantageous feature, the compositions can have low density. Such compositions are especially useful in the manufacture of flame retardant, low smoke poly(siloxane) copolymer sheets that can be used in marine applications.

The compositions contain a first polymer comprising first repeating units and blocks of repeating polysiloxane units; a brominated second polymer different from the first polymer; and optionally, one or more third polymers different from the first polymer and second polymer, wherein the weight percent (wt %) of the first polymer, second polymer, and optional one or more third polymers sum to 100 wt %, and the polysiloxane units are present in the composition in an amount of at least 0.3 wt %, based on the sum of the wt % of the first, second, and optional third polymers, and bromine is present in the composition in an amount of at least 7.8 wt %, based on the sum of the wt % of the first, second, and optional third polymers; and further wherein an article molded from the composition has an OSU integrated 2 minute heat release test value of less than 65 kW-min/m$^2$ and a peak heat release rate of less than 65 kW/m$^2$ as measured using the method of FAR F25.4, in accordance with Federal Aviation Regulation FAR 25.853 (d), and an E662 smoke test DsMax value of less than 200 when measured at a thickness of 1.6 mm. For simplicity, this test can be referred to herein as the "smoke density test."

The first, second, and optionally one or more third polymers are further selected and used in amounts effective to satisfy the requirements for heat release rates described in FAR F25.4 (Federal Aviation Regulations Section 25, Appendix F, Part IV). Materials in compliance with this standard are required to have a 2-minute integrated heat release rate of less than or equal to 65 kilowatt-minutes per square meter (kW-min/m$^2$) and a peak heat release rate of less than 65 kilowatts per square meter (kW/m$^2$) determined using the Ohio State University calorimeter, abbreviated as OSU 65/65 (2 min/peak). In applications requiring a more stringent standards, where a better heat release rate performance is called for, a 2-minute integrated heat release rate of less than or equal to 55 kW-min/m$^2$ and a peak heat release rate of less than 55 kW/m$^2$ (abbreviated as OSU 55/55) may be required.

Without being bound by theory, it is believed that the unexpected combination of low smoke density and low heat release values obtained is achieved by careful selection and balancing of the absolute and relative amounts of the first polymer, the second polymer, and the optional one or more third polymers, including selecting an amount of first polymer, block size (i.e., length) of the siloxane blocks, and number of siloxane blocks such that at least 0.3 wt % polysiloxane units are present in the composition; and selecting the type and amount of the second polymer and the amount of bromine in the second polymer such that at least 7.8 wt % bromine is present in the composition. The compositions therefore include amounts of the first and second polymers effective, i.e., sufficient, to provide the desired amount of polysiloxane units and bromine, which in turn yields compositions having the an OSU-integrated 2 minute heat release test value of less than 65 kW-min/m$^2$ and a peak heat release rate of less than 65 kW/m$^2$ as measured using the method of FAR F25.4, in accordance with Federal Aviation Regulation FAR 25.853 (d), and an E662 smoke test DsMax value of less than 200 when tested at a thickness of 1.6 mm.

In an embodiment, an effective amount of the siloxane-containing copolymer is at least 1 wt %, specifically 1 to 85 wt % of the siloxane-containing copolymer, and an effective amount of the brominated polymer is at least 15 wt %, specifically 15 to 95 wt %, each based on the total weight of the first polymer, second polymer, and optional one or more third polymers. The precise amount of the first polymer effective to provide at least 0.3 wt % of the polysiloxane units depends on the selected copolymer, the length of the siloxane block, the number the siloxane-containing blocks, and the desired properties, such as smoke density, heat release values, transparency, impact strength, melt viscosity, and/or other desired physical properties. In general, to be effective, when a block copolymer is used, the smaller the block size and/or the lower the number of blocks in the first polymer, the higher the fractional concentration of the first polymer, based on the total weight of the first, second and optionally one or more third polymers. When a graft copolymer is used, the lower the number of branches and/or the shorter the branches, the higher is the fractional concentration of the first polymer based on the total weight of the first, second and optionally one or more third polymers. Similarly, for the brominated polymer, the precise amount depends on the type of polymer, the amount of bromine in the polymer, and other desired characteristics of the compositions. The lower the weight percent of bromine in the second polymer, the higher the fractional concentration of the second polymer, based on the total weight of the first, second and optionally one or more third polymers. Thus, an effective amount of the siloxane-containing copolymer in some embodiments can be at least 5 wt %, specifically 5 to 80 wt %, or at least 10 wt %, specifically 10 to 70 wt %, or at least 15 wt %, specifically 15 to 60 wt %, and an effective amount of the brominated polymer in some embodiments can be at least 20 wt %, specifically 20 to 85 wt %, or 20 to 75 wt %, each based on the total weight of the first polymer, second polymer, and optional one or more third polymers.

As stated above, the first polymer comprises first repeating units and blocks of repeating polysiloxane units. In a particularly advantageous feature, the first repeating units can be a variety of different units, which allows manufacture of low smoke, low heat release compositions having a variety of properties. The first repeating units can be polycarbonate units, etherimide units, ester units, sulfone units, ether sulfone units, arylene ether sulfone units, arylene ether units, and combinations comprising at least one of the foregoing, for example resorcinol-based aryl ester-carbonate units, etherimide-sulfone units, and arylene ether-sulfone units.

In a specific embodiment, the first, second, and optional third polymers are polycarbonates, that is, polymers containing repeating carbonate units. Thus the first polymer is a poly(siloxane-carbonate) copolymer, the second polymer is a brominated polymer containing repeating carbonate units, and the one or more optional third polymers are polycarbonate homopolymers or copolymers. In an embodiment, the thermoplastic composition comprises at least 5 wt %, specifically 5 to 85 wt % of the first poly(siloxane-carbonate) copolymer, at least 15 wt %, specifically 15 to 95 wt % of the second brominated polycarbonate, such as a brominated polycarbonate derived from 2,2',6,6'-tetrabromo-4,4'-isopropylidenediphenol (2,2-bis(3,5-dibromo-4-hydroxyphenyl) propane (TBBPA) and carbonate units derived from at least one dihydroxy aromatic compound that is not TBBPA ("TBBPA copolymer"), and 0 to 70 wt % of the optional one or more third polymers, based on the total weight of the first, second, and optional one or more third polymers, i.e., the wt % of the first polymer, second polymer, and optional one or more third polymers sum to 100 wt %. The siloxane blocks present in the first polymer have an average of 5 to 200 units, specifically 5 to 100, or 20 to 65 units. At least 0.3 wt % siloxane and at least 7.8 wt % bromine is present, each based on total weight of the first polymer, second polymer, and optional one or more third polymers.

Further in this embodiment, when the siloxane blocks have an average of 25 to 75 units, specifically 25 to 50 units, and at least 2.0 wt % siloxane is present based on total weight of the first polymer, second polymer, and optional one or more third polymers, excellent toughness is obtained, in particular an article molded from the composition further has a room temperature notched Izod impact of greater than 500 J/m as measured according to ASTM D 256-10 at a 0.125 inch (3.2 mm) thickness. The articles can further have 100% ductility. The amount of siloxane in the composition can be varied by controlling the length of units per block, the number of blocks and the tacticity of the blocks along the backbone.

Still further in this embodiment, when the polysiloxane units of the first polymer is present in an amount of at least 2.0 wt % of the composition has 35 to 50 wt % of the second polymer (the TBBPA copolymer), each based on total weight of the first polymer, second polymer, and optional one or more third polymers, and the siloxane blocks have an average length of 25 to 50 units, excellent transparency can be obtained, in particular an article molded from this composition has a haze of less than 10% and a transmission greater than 70%, each measured using the color space CIE1931 (Illuminant C and a 2° observer), or according to ASTM D 1003 (2007) using illuminant C at a 0.125 inch (3.2 mm) thickness.

Excellent transparency can also be obtained when the thermoplastic composition comprises the first polymer in an amount effective to provide at least 0.3 wt % siloxane and the second polymer in an amount effective to provide at least 5.0 wt % bromine, each based on total weight of the first polymer, second polymer, and optional one or more third polymers, and the siloxane blocks or grafts have an average of 5 to 75, specifically 5 to 15 units. Effective amounts can be at least 30 wt %, specifically 30 to 80 wt % of the first polymer, and at least 20 wt %, specifically at least 20 to 50 wt % of the second polymer (the TBBPA copolymer), and 0 to 50 wt % of the optional one or more third polymers, each based on the total weight of the first, second, and optionally one or more third polymers. An article molded from the composition has a haze of less than 3% and a transmission greater than 85%, each measured using the color space CIE1931 (Illuminant C and a 2° observer), or according to ASTM D 1003 (2007) using illuminant C at a 0.062 inch (1.5 mm) thickness.

In still other embodiments, it has been found that limiting the amount of the optional third polymer, together with use of specific first and second polycarbonates can produce compositions with advantageous properties. In one such embodiment, the thermoplastic composition comprises the first polymer (the poly(siloxane-carbonate)), the second polymer (the TBBPA copolymer or brominated oligomer), and 8 to 12 wt % of the one or more third polymers, wherein the wt % of the first polymer, second polymer, and one or more third polymers sum to 100 wt % based on the total weight of the first, second and optionally one or more third polymers. The siloxane blocks have an average value of 20 to 85 units. At least 0.4 wt % of siloxane and at least 7.8 wt % of bromine is present, each based on total weight of the first polymer, second polymer, and one or more third polymers. In an embodiment, the thermoplastic composition comprises 5 to 60 wt % of the first poly(siloxane-carbonate) 30 to 60 wt % of the second polymer (the TBBPA copolymer).

In an alternative embodiment of the thermoplastic compositions, it has been found that other brominated oligomers can be used in place of the TBBPA copolymer, such as other brominated polycarbonate oligomers or brominated epoxy oligomers. In this embodiment, the thermoplastic compositions contain the first poly(siloxane-carbonate), a brominated oligomer, and an optional additional polycarbonate different from the first polymer and the brominated oligomer. The optional additional polycarbonate can be the same as the optional one or more third polymers described in the above embodiments. The first polymer, the brominated oligomer, and the optional additional polycarbonate are present in amounts effective to provide at least 0.4 wt % of siloxane and at least 7.8 wt % of bromine, each based on total weight of the first polymer, brominated oligomer, and additional polycarbonate, and thus satisfy at least the smoke density test and the heat release OSU 65/65 test. In particular, the thermoplastic compositions comprise at least 5 wt %, specifically 5 to 85 wt % of the first poly(siloxane-carbonate), at least 15 wt %, specifically at least 15 to 95 wt % of the brominated oligomer, and 0 to 60 wt % of the optional additional polycarbonate, each based on the total weight of the first polymer, brominated oligomer, and optional additional polycarbonate. The siloxane blocks have an average of 5 to 200, or 5 to 100 units.

While the smoke density and OSU tests demonstrate the ability of the poly(siloxane) copolymer compositions described herein to comply with both the smoke generation and heat release requirements for marine interiors, any of the above-described compositions can advantageously comply with other related flammability and safety tests as described above.

In certain embodiments, the first, second, and optional one or more third polymers, as well as the brominated polycarbonates (including the TBBPA copolymer and brominated polycarbonate oligomers) have repeating structural carbonate units of formula (1)

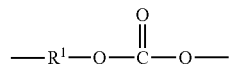

(1)

wherein at least 60%, specifically at least 80%, and specifically at least 90% of the total number of $R^1$ groups contains aromatic organic groups and the balance thereof are aliphatic or alicyclic groups. In particular, use of aliphatic groups is minimized in order to maintain the flammability performance of the polycarbonates. In an embodiment, at least 70%, at least 80%, or 95 to 100% of the $R^1$ groups are aromatic groups. In an embodiment, each $R^1$ is a divalent aromatic group, for example derived from an aromatic dihydroxy compound of formula (2)

$$HO-A^1-Y^1-A^2-OH \quad (2)$$

wherein each of $A^1$ and $A^2$ is independently a monocyclic divalent arylene group, and $Y^1$ is a single bond or a bridging group having one or two atoms that separate $A^1$ from $A^2$. In an embodiment, one atom separates $A^1$ from $A^2$. In another embodiment, when each of $A^1$ and $A^2$ is phenylene, $Y^1$ is para to each of the hydroxyl groups on the phenylenes. Illustrative non-limiting examples of groups of this type are —O—, —S—, —S(O)—, —S(O)$_2$—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging group $Y^1$ can be a hydrocarbon group, specifically a saturated hydrocarbon group such as methylene, cyclohexylidene, or isopropylidene.

Included within the scope of formula (2) are bisphenol compounds of formula (3)

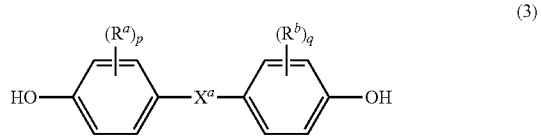

(3)

wherein each of $R^a$ and $R^b$ is independently a halogen atom or a monovalent hydrocarbon group; p and q are each independently integers of 0 to 4; and $X^a$ represents a single bond or one of the groups of formulas (4) or (5)

(4)

(5)

wherein each $R^c$ and $R^d$ is independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, and $R^e$ is a divalent $C_{1-12}$ hydrocarbon group. In particular, $R^c$ and $R^d$ are each the same hydrogen or $C_{1-4}$ alkyl, specifically the same $C_{1-3}$ alkyl, even more specifically, methyl.

In an embodiment, $R^c$ and $R^d$ taken together is a $C_{3-20}$ cyclic alkylene or a heteroatom-containing $C_{3-20}$ cyclic alkylene comprising carbon atoms and heteroatoms with a valency of two or greater. These groups can be in the form of a single saturated or unsaturated ring, or a fused polycyclic ring system wherein the fused rings are saturated, unsaturated, or aromatic. A specific heteroatom-containing cyclic alkylene group comprises at least one heteroatom with a valency of 2 or greater, and at least two carbon atoms. Heteroatoms in the heteroatom-containing cyclic alkylene group include —O—, —S—, and —N(Z)—, where Z is a substituent selected from hydrogen, hydroxy, $C_{1-12}$ alkyl, $C_{1-12}$ alkoxy, or $C_{1-12}$ acyl.

In a specific embodiment, $X^a$ is a substituted $C_{3-18}$ cycloalkylidene of formula (6)

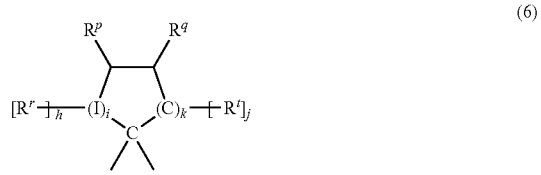

(6)

wherein each $R^r$, $R^p$, $R^q$, and $R^t$ is independently hydrogen, halogen, oxygen, or $C_{1-12}$ organic group; I is a direct bond, a carbon, or a divalent oxygen, sulfur, or —N(Z)— wherein Z is hydrogen, halogen, hydroxy, $C_{1-12}$ alkyl, $C_{1-12}$ alkoxy, or $C_{1-12}$ acyl; h is 0 to 2, j is 1 or 2, i is an integer of 0 or 1, and k is an integer of 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (6) will have an unsaturated carbon-carbon linkage where the ring is fused. When k is 1 and i is 0, the ring as shown in formula (6) contains 4 carbon atoms, when k is 2, the ring as shown contains 5 carbon atoms, and when k is 3, the ring contains 6 carbon atoms. In an embodiment, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group.

When k is 3 and i is 0, bisphenols containing substituted or unsubstituted cyclohexane units are used, for example bisphenols of formula (7)

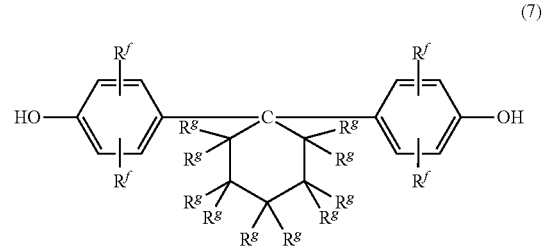

(7)

wherein $R^f$ is each independently hydrogen, $C_{1-12}$ alkyl, or halogen; and $R^g$ is each independently hydrogen or $C_{1-12}$ alkyl. The substituents can be aliphatic or aromatic, straight chain, cyclic, bicyclic, branched, saturated, or unsaturated. Such cyclohexane-containing bisphenols, for example the reaction product of two moles of a phenol with one mole of a hydrogenated isophorone, are useful for making polycarbonate polymers with high glass transition temperatures ($T_g$) and high heat distortion temperatures (HDT). Cyclohexyl bisphenol-containing polycarbonates, or a combination comprising at least one of the foregoing with other bisphenol polycarbonates, are supplied by Bayer Co. under the APEC® trade name.

Other useful dihydroxy compounds having the formula HO—$R^1$—OH include aromatic dihydroxy compounds of formula (8)

(8)

wherein $R^h$ is each independently a halogen atom, a $C_{1-10}$ hydrocarbyl such as a $C_{1-10}$ alkyl group, a halogen substituted $C_{1-10}$ hydrocarbyl such as a halogen-substituted $C_{1-10}$ alkyl group, and h is 0 to 4. The halogen is usually bromine.

Some illustrative examples of dihydroxy compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantane, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl) propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9 to bis (4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, and the like; catechol; hydroquinone; and substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, and the like. Combinations comprising at least one of the foregoing dihydroxy compounds can be used.

Specific examples of bisphenol compounds that can be represented by formula (3) include 1,1-bis(4-hydroxyphenyl) methane, 1,1-bis(4-hydroxyphenyl)ethane, 2,2-bis(4-hydroxyphenyl)propane (bisphenol A or BPA), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis (4-hydroxy-t-butylphenyl)propane, 3,3-bis(4-hydroxyphenyl)phthalimidine, 2-phenyl-3,3-bis(4-hydroxyphenyl)phthalimidine (PPPBP), and 1,1-bis(4-hydroxy-3-methylphenyl)cyclohexane (DMBPC). Combinations comprising at least one of the foregoing dihydroxy compounds can also be used.

"Polycarbonate" as used herein includes homopolycarbonates, copolymers comprising different $R^1$ moieties in the carbonate ("copolycarbonates"), and copolymers comprising carbonate units and other types of polymer units, such as polysiloxane units or ester units. In a specific embodiment, the one or more optional third polymers is a linear homopolymer or copolymer comprising units derived from bisphenol A, in which each of $A^1$ and $A^2$ is p-phenylene and $Y^1$ is isopropylidene in formula (2). More specifically, at least 60%, particularly at least 80% of the $R^1$ groups in the polycarbonate homopolymer or copolymer are derived from bisphenol A. In an embodiment, the first polymer is a block or graft copolymer comprising carbonate units of formula (1) and blocks of polysiloxane units, i.e., a poly(siloxane-co-carbonate), referred to herein as a "poly(siloxane-carbonate)." Block poly(siloxane-carbonate) copolymers comprise siloxane blocks and carbonate blocks in the polymer backbone. Graft poly(siloxane-carbonate) copolymers are non-linear copolymers comprising the siloxane blocks connected to linear or branch polymer backbone comprising carbonate blocks.

In addition to the first repeating units in the first polymer (for example polycarbonate units (1) as described above), the first polymer comprises blocks of

(9)

wherein R is each independently a $C_1$-$C_{30}$ hydrocarbon group, specifically a $C_{1-13}$ alkyl group, $C_{2-13}$ alkenyl group, $C_{3-6}$ cycloalkyl group, $C_{6-14}$ aryl group, $C_{7-13}$ arylalkyl group, or $C_{7-13}$ alkylaryl group. The foregoing groups can be fully or partially halogenated with fluorine, chlorine, bromine, or iodine, or a combination comprising at least one of the foregoing. Combinations of the foregoing R groups can be used in the same copolymer. In an embodiment, the polysiloxane comprises R groups that have minimum hydrocarbon content. In yet another embodiment, the foregoing R groups are functionalized wherein at least one methyl group has been replaced by another group, which is preferably not hydrogen, or wherein the functionalized R groups incorporate reactive functional groups such as anhydrides and epoxides that can react with other components by, for example, covalent bonding. In a specific embodiment, R is each the same and is a methyl group.

The average value of E in formula (9) can vary from 5 to 200. In an embodiment, E has an average value of 5 to 100, 10 to 100, 10 to 50, 25 to 50, or 35 to 50. In another embodiment, E has an average value of 5 to 75, specifically 5 to 15, specifically 5 to 12, more specifically 7 to 12. The siloxane blocks can be atactic, isotactic, or syndiotactic. In an embodiment, the tacticity of the siloxane can affect the effective amount of each copolymer used as well as the physico-chemical characteristic of the thermoplastic compositions formed (e.g., crystallinity, transparency, impact resistance and the like). The siloxane containing copolymer can be a graft copolymer wherein the siloxane-containing blocks are branched from a polymer backbone having blocks of the first repeating units, for example carbonate units of formula (1).

In an embodiment, for example in poly(siloxane-carbonates), the polysiloxane units can be derived from polysiloxane bisphenols of formula (10) or (11)

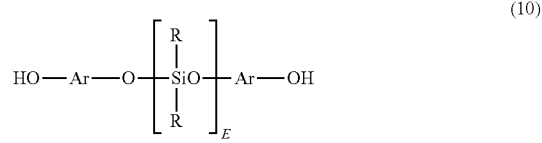

(10)

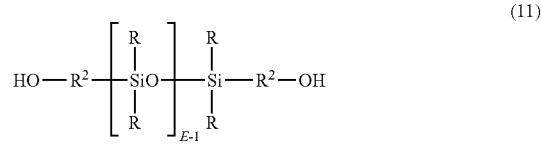

(11)

wherein E is as defined in formula (9); each R can be the same or different, and is as defined in formula (9); each Ar can be the same or different, and is a substituted or unsubstituted $C_{6-30}$ arylene group; and each $R^2$ is the same or different, and is a divalent $C_{1-30}$ alkylene or $C_{7-30}$ arylenealkylene wherein the bonds of the hydroxyl groups are directly bonded to the arylene moiety or the alkylene moiety.

The Ar groups in formula (10) can be derived from a $C_{6-30}$ dihydroxy aromatic compound, for example a dihydroxy aromatic compound of formula (2), (3), (6), (7), or (8) above. Combinations comprising at least one of the foregoing dihydroxy aromatic compounds can also be used. Illustrative examples of dihydroxy aromatic compounds are resorcinol (i.e., 1,3-dihydroxybenzene), 4-methyl-1,3-dihydroxybenzene, 5-methyl-1,3-dihydroxybenzene, 4,6-dimethyl-1,3-dihydroxybenzene, 1,4-dihydroxybenzene, 1,1-bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxyphenyl)cyclohexane, bis(4-hydroxyphenyl sulfide), and 1,1-bis(4-hydroxy-t-butylphenyl)propane. Combinations comprising at least one of the foregoing dihydroxy compounds can also be used. In an embodiment, the dihydroxy aromatic compound is unsubstituted, or is not substituted with non-aromatic hydrocarbon-containing substituents such as alkyl, alkoxy, or alkylene substituents.

In a specific embodiment, where Ar is derived from resorcinol, the polydiorganosiloxane repeating units are derived from polysiloxane bisphenols of formula (12)

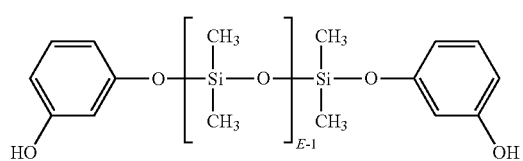

(12)

or, where Ar is derived from bisphenol A, from polysiloxane bisphenols of formula (13)

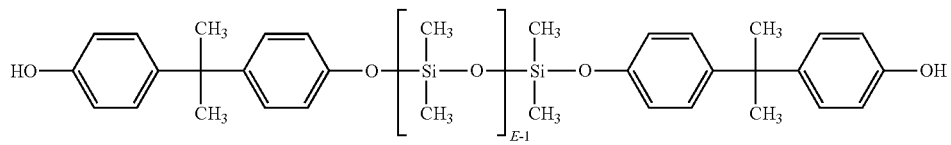

(13)

wherein E is as defined in formula (9) above.

Where $R^2$ is $C_{7-30}$ arylenealkylene in formula (11), the polysiloxane units can be derived from polysiloxane bisphenols of formula (14)

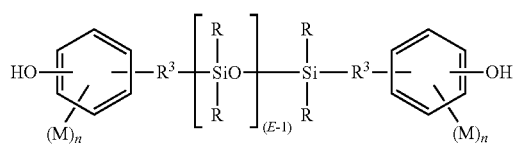

(14)

wherein R and E are as defined in formula (9). $R^3$ is each independently a divalent $C_{2-8}$ aliphatic group. Each M can be the same or different, and can be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy group, $C_{3-8}$ cycloalkyl, $C_{3-8}$ cycloalkoxy, $C_{6-10}$ aryl, $C_{6-10}$ aryloxy, $C_{7-12}$ arylalkyl, $C_{7-12}$ arylalkoxy, $C_{7-12}$ alkylaryl, or $C_{7-12}$ alkylaryloxy, wherein each n is independently 0, 1, 2, 3, or 4. In an embodiment, M is bromo or chloro, an alkyl such as methyl, ethyl, or propyl, an alkoxy such as methoxy, ethoxy, or propoxy, or an aryl such as phenyl, chlorophenyl, or tolyl; $R^3$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, M is methoxy, n is 0 or 1, $R^3$ is a divalent $C_{1-3}$ aliphatic group, and R is methyl.

In a specific embodiment, the polysiloxane units are derived from a polysiloxane bisphenol of formula (15)

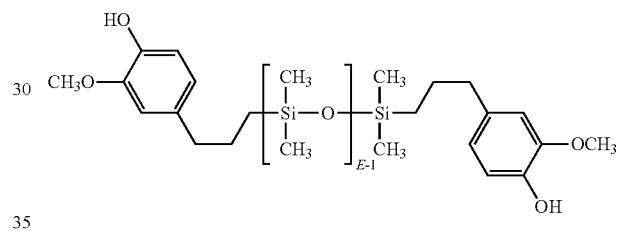

(15)

wherein E is as described in formula (9).

[1] In another specific embodiment, the polysiloxane units are derived from polysiloxane bisphenol of formula (16)

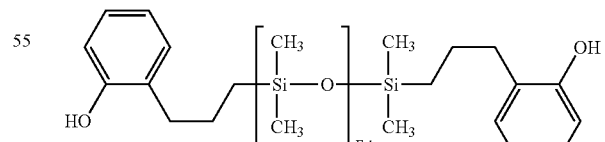

(16)

wherein E is as described in formula (9).

The relative amount of carbonate and polysiloxane units in the poly(siloxane-carbonate) will depend on the desired properties, and are carefully selected using the guidelines provided herein. In particular, as mentioned above, the block or graft poly(siloxane-carbonate) copolymer is selected to have a certain average value of E, and is selected and used in amount effective to provide the desired wt % of polysiloxane units in the composition. In an embodiment, the poly(siloxane-carbonate) can comprise polysiloxane units in an amount of 0.3 to 30 weight percent (wt %), specifically 0.5 to 25 wt %, or 0.5 to 15 wt %, or even more specifically 0.7 to 8 wt %, or 0.7 to 7 wt %, based on the total weight of the poly(siloxane-carbonate), with remainder being carbonate units. In another embodiment, the poly(siloxane-carbonate) can comprise polysiloxane units in an amount of 0.5 to 25 weight percent (wt %), specifically 0.5 to 20 wt %, or 0.5 to 10 wt % based on the total weight of the poly(siloxane-carbonate), with remainder being carbonate units.

In an embodiment, the poly(siloxane-carbonate) comprises units derived from polysiloxane bisphenols (14) as described above, specifically wherein M is methoxy, n is 0 or 1, $R^3$ is a divalent $C_{1-3}$ aliphatic group, and R is methyl, still more specifically a polysiloxane bisphenol of formula (15) or (16). In these embodiments, E can have an average value of 5 to 200, or 8 to 100, wherein the polysiloxane units are present in an amount of 0.3 to 25 wt % based on the total weight of the poly(siloxane-carbonate); or, in other embodiments, E can have an average value of 25 to 100, wherein the polysiloxane units are present in an amount of 5 to 30 wt % based on the total weight of the poly(siloxane-carbonate); or E can have an average value of 30 to 50, or 40 to 50, wherein the polysiloxane units are present in an amount of 4 to 8 wt % based on the total weight of the poly(siloxane-carbonate); or E can have an average value of 5 to 12, wherein the polysiloxane units are present in an amount of 0.5 to 7 wt % based on the total weight of the poly(siloxane-carbonate). In other embodiments, specifically those used in translucent, high clarity, medium clarity, high impact, and colored marine vehicle articles, E can have an average value of 5 to 200, or 8 to 100, wherein the polysiloxane units are present in an amount of 0.5 to 25 wt % based on the total weight of the poly(siloxane-carbonate); or, in other embodiments, E can have an average value of 25 to 65, wherein the polysiloxane units are present in an amount of 15 to 25 wt % based on the total weight of the poly(siloxane-carbonate); or E can have an average value of 20 to 65, or 40 to 65, wherein the polysiloxane units are present in an amount of 4 to 25 wt % based on the total weight of the poly(siloxane-carbonate); or E can have an average value of 5 to 12, wherein the polysiloxane units are present in an amount of 0.5 to 7 wt % based on the total weight of the poly(siloxane-carbonate).

In another embodiment, the first polymer is a poly(siloxane-etherimide) copolymer comprising siloxane blocks (9) and polyetherimide units of formula (17)

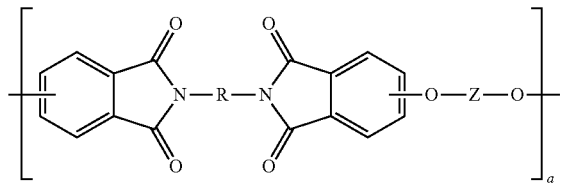

(17)

wherein a is 1 or greater than 1, for example 5 to 1,000 or more, or more specifically 10 to 500. In this embodiment, the first polymer is a block or graft copolymer comprising etherimide units of formula (17) and blocks of polysiloxane units, i.e., a poly(siloxane-co-etherimide), referred to herein as a "(polyetherimide-siloxane)." Block poly(siloxane-etherimide) copolymers comprise siloxane blocks and etherimide blocks in the polymer backbone. The siloxane blocks and the polyetherimide units can be present in random order, as blocks (i.e., AABB), alternating (i.e., ABAB), or a combination thereof. Graft poly(siloxane-etherimide) copolymers are non-linear copolymers comprising the siloxane blocks connected to linear or branch polymer backbone comprising etherimide blocks.

The group R in formula (17) is a divalent hydrocarbon group, such as a $C_{6-20}$ aromatic hydrocarbon group or halogenated derivative thereof, a straight or branched chain $C_{2-20}$ alkylene group or halogenated derivative thereof, a $C_{3-20}$ cycloalkylene group or halogenated derivative thereof, or a divalent group of formula (18)

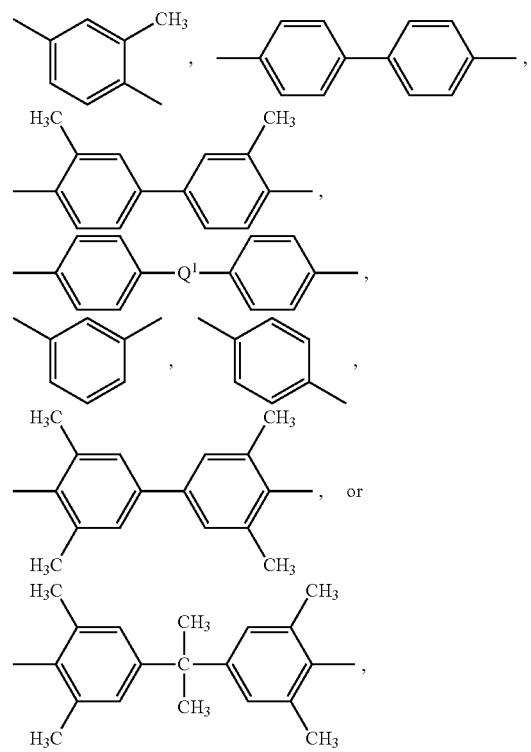

(18)

wherein $Q^1$ is —O—, —S—, —C(O)—, —SO$_2$—, —SO—, and —$C_yH_{2y}$— and a halogenated derivative thereof (which includes perfluoroalkylene groups) wherein y is an integer from 1 to 5. In a specific embodiment R is a m-phenylene or p-phenylene.

The group Z in formula (17) is also a divalent hydrocarbon group, and can be an aromatic $C_{6-24}$ monocyclic or polycyclic moiety optionally substituted with 1 to 6 $C_{1-8}$ alkyl groups, 1 to 8 halogen atoms, or a combination thereof, provided that the valence of Z is not exceeded. Exemplary groups Z include groups derived from a dihydroxy compound of formula (3). A specific example of a group Z is a divalent group of formula (19)

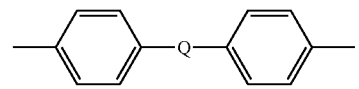

(19)

wherein Q is —O—, —S—, —C(O)—, —SO$_2$—, —SO—, and —$C_yH_{2y}$— and a halogenated derivative thereof (including a perfluoroalkylene group) wherein y is an integer from 1 to 5. In a specific embodiment Z is derived from bisphenol A wherein Q is 2,2-isopropylidene.

More specifically, the first polymer comprises blocks of 10 to 1,000 or 10 to 500 structural units of formula (17) wherein R is a divalent group of formula (19) wherein $Q^1$ is $—C_yH_{2y}—$ wherein y is an integer from 1 to 5 or a halogenated derivative thereof, and Z is a group of formula (19). In a specific embodiment, R is m-phenylene, p-arylene diphenylsulfone, or a combination thereof, and Z is 2,2-(4-phenylene)isopropylidene.

As is known, polyetherimides can be obtained by polymerization of an aromatic bisanhydride of the formula (20)

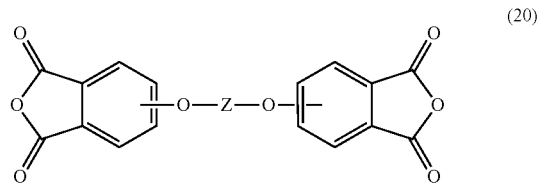

wherein Z is as described in formula (17), with a diamine of the formula (21)

wherein R is as described in formula (17). Illustrative examples of the aromatic bisanhydrides (20) include 3,3-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy) diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy) diphenyl ether dianhydride; 4-(2,3-dicarboxyphenoxy)-4'-(3, 4-dicarboxyphenoxy)diphenyl sulfide dianhydride; 4-(2,3-dicarboxyphenoxy)-4'-(3,4-dicarboxyphenoxy) benzophenone dianhydride and 4-(2,3-dicarboxyphenoxy)-4'-(3,4-dicarboxyphenoxy)diphenyl sulfone dianhydride. Combinations comprising at least one of the foregoing aromatic bisanhydrides (20) can be used.

Illustrative examples of diamines (21) include ethylenediamine, propylenediamine, trimethylenediamine, diethylenetriamine, triethylenetetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis(3-aminopropyl)amine, 3-methoxyhexamethylenediamine, 1,2-bis(3-aminopropoxy)ethane, bis(3-aminopropyl)sulfide, 1,4-cyclohexanediamine, bis-(4-aminocyclohexyl)methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl)methane, bis(2-chloro-4-amino-3,5-diethylphenyl)methane, bis(4-aminophenyl)propane, 2,4-bis (amino-t-butyl)toluene, bis(p-amino-t-butylphenyl)ether, bis (p-methyl-o-aminophenyl)benzene, bis(p-methyl-o-aminopentyl)benzene, 1,3-diamino-4-isopropylbenzene, bis (4-aminophenyl)sulfide, bis(4-aminophenyl)sulfone, bis(4-aminophenyl)ether and 1,3-bis(3-aminopropyl)tetramethyldisiloxane. Combinations comprising at least one of the foregoing aromatic bisanhydrides can be used. Aromatic diamines are often used, especially m- and p-phenylenediamine, sulfonyl dianiline and combinations thereof.

The poly(siloxane-etherimide)s can be formed by polymerization of an aromatic bisanhydride (20) and a diamine component comprising an organic diamine (21) or mixture of diamines (21), and a polysiloxane diamine of formula (22)

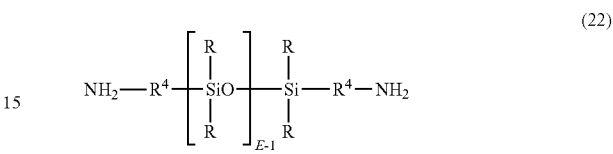

wherein R and E are as described in formula (9), and $R^4$ is each independently a $C_2-C_{20}$ hydrocarbon, in particular a $C_2-C_{20}$ arylene, alkylene, or arylenealkylene group. In an embodiment $R^4$ is a $C_2-C_{20}$ alkyl group, specifically a $C_2-C_{20}$ alkyl group such as propylene, and E has an average value of 5 to 100, 5 to 75, 5 to 60, 5 to 15, or 15 to 40. Procedures for making the polysiloxane diamines of formula (22) are well known in the art. For example, an aminoorganotetraorganodisiloxane can be equilibrated with an octaorganocyclotetrasiloxane, such as octamethylcyclotetrasiloxane, to increase the block length of the polydiorganosiloxane.

In some poly(siloxane-etherimide)s the diamine component can contain 20 to 50 mole percent (mol %), or 25 to 40 mol % of polysiloxane diamine (22) and about 50 to 80 mol %, or 60 to 75 mol % of diamine (21), for example as described in U.S. Pat. No. 4,404,350. The diamine components can be physically mixed prior to reaction with the bisanhydride(s), thus forming a substantially random copolymer. Alternatively, block or alternating copolymers can be formed by selective reaction of (21) and (22) with aromatic dianhydrides (20), to make polyimide blocks that are subsequently reacted together. Thus, the poly(siloxane-imide) copolymer can be a block, random, or graft copolymer.

In an embodiment, the poly(siloxane-etherimide) is made by sequentially intercondensing at temperatures in the range of 100° C. to 300° C., the polysiloxane diamine (22) and the diamine (21) with aromatic bisanhydride (20). A substantially inert organic solvent can be used to facilitate intercondensation, for example, dipolar aprotic solvents such as dimethylformamide, N-methyl-2-pyrrolidone, cresol, orthodichlorobenzene, and the like. A polymerization catalyst can be used at 0.025 to 1.0% by weight, based on the weight of the reaction mixture, such as an alkali metal aryl phosphinate or alkali metal aryl phosphonate, for example, sodium phenylphosphinate.

The sequential intercondensation of the polysiloxane diamine (22) and the diamine (21) with the aromatic bisanhydride (20) can be achieved in either a single container or in multiple containers. In the "single pot" procedure, an off stoichiometric amount of either the polysiloxane diamine (22) or the diamine (21), is intercondensed with the aromatic bisanhydride (20) in the presence of an inert organic solvent to produce a mixture of polyimide oligomer chain stopped with either intercondensed diamine or aromatic bisanhydride. An excess of aromatic bisanhydride (2) or diamine (21) corresponding to the chain stopping units also can be present. The oligomer can be either a silicone polyimide, or an oligomer of intercondensed aromatic bisanhydride and diamine. There is then added to the same pot, after the initial period of oligomer formation, the remaining diamine, which can be either the polysiloxane diamine (22) or the diamine (21) and optionally sufficient aromatic bisanhydride (20) to achieve stoichiometry. There also can be added to the resulting intercondensation mixture, chain stoppers, such a phthalic anhydride or monofunctional arylamine such as aniline to control the molecular weight of the 55 final silicone polyimide. In the multiple pot procedure, diamine oligomer and polysiloxane diamine oligomer can be intercondensed with aromatic bisanhydride in separate containers. The multiple pot procedure can achieve satisfactory results in instances where two or more oligomers are required providing a substantially stoichiometric balance maintained between total aromatic bisanhydride and diamine.

Oligomer block size can vary depending upon the proportions of polysiloxane diamine (22) and the diamine (21) used, per mole of aromatic bisanhydride (20). For example, for a "three block," oligomer, a 4/3 ratio can be used, i.e. 4 moles of diamine for 3 moles of bisanhydride. Reaction can continue until the intercondensation of anhydride and amine functional groups are achieved and the water of reaction is completely removed, such as by azeotroping from the reaction mixture.

Examples of such poly(siloxane-etherimide) are described in U.S. Pat. Nos. 4,404,350, 4,808,686 and 4,690,997. In an embodiment, the poly(siloxane-etherimide) has units of formula (23)

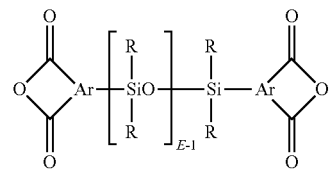

wherein R and E are as described in structure (9) and each Ar is independently a $C_6$-$C_{30}$ aromatic group. In some poly(siloxane-etherimide)s the dianhydride component can contain 20 to 50 mole percent (mol %), or 25 to 40 mol % of polysiloxane dianhydride (24) and/or (25) and about 50 to 80 mol %, or 60 to 75 mol % of dianhydride (20), for example as described in U.S. Pat. No. 4,404,350. The anhydride components can be physically mixed prior to reaction with the diamine(s), thus forming a substantially random copolymer. Alternatively, block or alternating copolymers can be formed by selective reaction of anhydrides (20) and (24) and/or (25) with diamine (21), to make polyimide blocks that are subsequently reacted together.

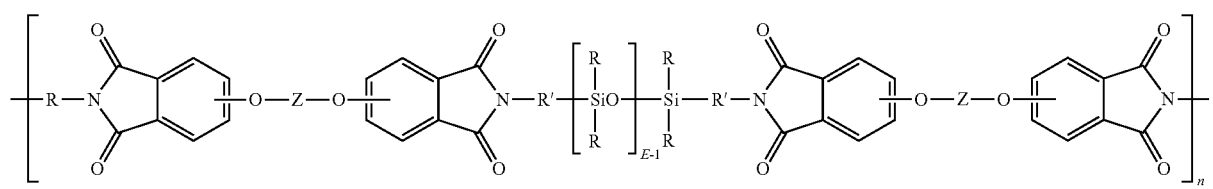

wherein E is as in formula (9), R and Z are as in formula (17), $R^4$ is as in formula (22), and n is an integer from 5 to 100.

It is also possible to incorporate polysiloxane units into a poly(siloxane-etherimide) by reaction of diamine (21) with an anhydride component comprising aromatic anhydride (20) and a polysiloxane dianhydride of formula (24), a siloxane dianhydride of formula (25), or a combination thereof

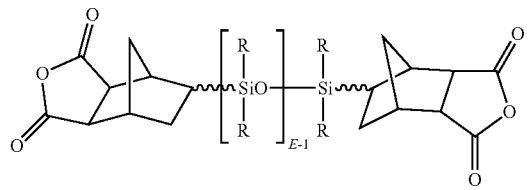

The relative amount of polysiloxane units and etherimide units in the poly(siloxane-etherimide) depends on the desired properties, and are carefully selected using the guidelines provided herein. In particular, as mentioned above, the block or graft poly(siloxane-etherimide) copolymer is selected to have a certain average value of E, and is selected and used in amount effective to provide the desired wt % of polysiloxane units in the composition. In an embodiment the poly(siloxane-etherimide) comprises 10 to 50 wt %, 10 to 40 wt %, or 20 to 35 wt % polysiloxane units, based on the total weight of the poly(siloxane-etherimide).

Other poly(siloxane) copolymers include poly(siloxane-sulfone) copolymers such as poly(siloxane-arylene sulfone)s and poly(siloxane-arylene ether sulfone)s wherein the first repeating units are units of formula (26)

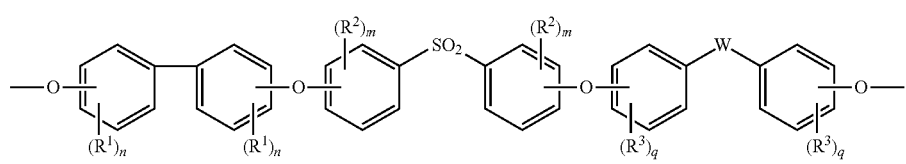

wherein $R^1$, $R^2$, and $R^3$ are each independently a halogen atom, a nitro group, a cyano group, a $C_{1-12}$ aliphatic radical, $C_{3-12}$ cycloaliphatic radical, or a $C_{3-12}$ aromatic radical; n, m, q are each independently 0 to 4; and W is a $C_{3-20}$ cycloaliphatic radical or a $C_3$-$C_{20}$ aromatic radical. In an embodiment, the first units (26) contain at least 5 mol % of aromatic ether units of formula (27)

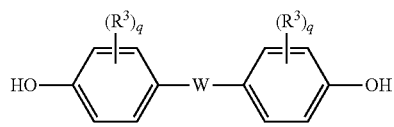

(27)

wherein $R^3$ and W are as defined in formula (26). In an embodiment, n, m, and q are each 0 and W is isopropylidene. These poly(siloxane-sulfone) copolymers may be made by reaction of arylene sulfone-containing, arylene ether-containing, or arylene ether sulfone-containing oligomers with functionalized polysiloxanes to form random or block copolymers. Examples of the poly(siloxane-sulfones and their manufacture, in particular poly(siloxane-arylene sulfone)s and poly(siloxane-arylene ether sulfone)s, are disclosed in U.S. Pat. Nos. 4,443,581, 3,539,657, 3,539,655 and 3,539,655.

The relative amount of polysiloxane units and arylene sulfone units or arylene ether sulfone units in the poly(siloxane-sulfone) copolymers depends on the desired properties, and are carefully selected using the guidelines provided herein. In particular, the block or graft poly(siloxane-sulfone) is selected and used in amount effective to provide the desired wt % of polysiloxane units in the composition. In an embodiment the poly(siloxane-arylene ether sulfone) comprises 10 to 50 wt %, 10 to 35 wt %, or 10 to 30 wt % polysiloxane units, based on the total weight of the poly(siloxane-arylene ether sulfone).

Other poly(siloxane) copolymers include poly(siloxane-arylene ether)s wherein the first repeating units are blocks of units of formula (28)

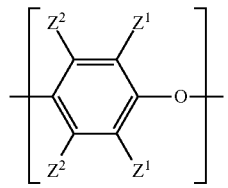

(28)

wherein $Z^1$ is each independently halogen or $C_1$-$C_{12}$ hydrocarbon group with the proviso that that the hydrocarbon group is not tertiary hydrocarbon group; and $Z^2$ is each independently hydrogen, halogen, or $C_1$-$C_{12}$ hydrocarbon group with the proviso that that the hydrocarbon group is not tertiary hydrocarbyl. In an embodiment, $Z^2$ is hydrogen and $Z^1$ is methyl.

Poly(siloxane-arylene ether)s and methods for the manufacture of poly(siloxane-arylene ether)s have been described in U.S. Pat. No. 5,204,438, which is based on the conversion of phenol-siloxane macromers to a silicone polyphenylene ether graft copolymer; and in U.S. Pat. No. 4,814,392. U.S. Pat. No. 5,596,048 discloses reaction of a polyarylene ether with a hydroxyaromatic terminated siloxane in the presence of an oxidant.

The relative amount of polysiloxane units and arylene ether units in the poly(siloxane-arylene ether) depends on the desired properties, and are carefully selected using the guidelines provided herein. In particular, the block or graft poly(siloxane-arylene ether) copolymer is selected and used in amount effective to provide the desired wt % of polysiloxane units in the composition. In an embodiment the poly(siloxane-arylene ether) comprises 1 to 80 wt %, 5 to 50 wt %, 10 to 35 wt %, or 10 to 30 wt % polysiloxane units, based on the total weight of the poly(siloxane-arylene ether).

Other poly(siloxane) copolymers include poly(siloxane-arylene ether ketone)s wherein the first repeating units are units of formula (29)

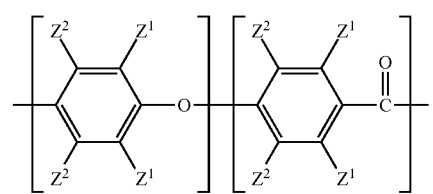

(29)

wherein $Z^1$ is each independently halogen or $C_1$-$C_{12}$ hydrocarbon group with the proviso that that the hydrocarbon group is not tertiary hydrocarbon group; and $Z^2$ is each independently hydrogen, halogen, or $C_1$-$C_{12}$ hydrocarbon group with the proviso that that the hydrocarbon group is not tertiary hydrocarbyl. In an embodiment $Z^2$ and $Z^1$ are hydrogen. The arylene ether units and arylene ketone units can be present in random order, as blocks (i.e., AABB, or alternating (i.e., ABAB), or a combination thereof.

The relative amount of polysiloxane units and arylene ether ketone units in the poly(siloxane-arylene ether ketone) depends on the desired properties, and are carefully selected using the guidelines provided herein. In particular, the block or graft poly(siloxane-arylene ether ketone) copolymer is selected and used in amount effective to provide the desired wt % of polysiloxane units in the composition. In an embodiment the poly(siloxane-arylene ether ketone) comprises 5 to 50 wt %, 10 to 35 wt %, or 10 to 30 wt % polysiloxane units, based on the total weight of the poly(siloxane-arylene ether ketone).

Poly(siloxane-esters), including poly(siloxane-ester-carbonate) copolymers can be used provided that the ester units are selected so as to not significantly adversely affect the desired properties of the poly(siloxane) copolymer compositions, in particular low smoke density and low heat release, as well as other properties such as stability to UV light. For example, aromatic ester units can diminish color stability of the poly(siloxane) copolymer compositions during processing and when exposed to UV light. Aromatic ester units can also decrease the melt flow of the thermoplastic composition. On the other hand, the presence of aliphatic ester units can diminish the heat release values. In an embodiment the poly(siloxane-esters), including poly(siloxane-ester-carbonate) copolymers comprise 10 to 50 wt %, 10 to 35 wt %, or 10 to 30 wt % polysiloxane units.

The first repeating units in the poly(siloxane-esters) or poly(siloxane-ester-carbonate)s further contain, in addition to the siloxane blocks of formula (9), repeating units of formula (29)

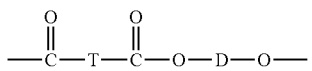

(29)

wherein D is a divalent group derived from a dihydroxy compound, and can be, for example, a $C_{2-10}$ alkylene group, a $C_{6-20}$ alicyclic group, a $C_{6-20}$ aryl, or a polyoxyalkylene group in which the alkylene groups contain 2 to 6 carbon atoms, specifically 2, 3, or 4 carbon atoms. In an embodiment, D is a $C_{2-30}$ alkylene having a straight chain, branched chain, or cyclic (including polycyclic) structure. In another embodiment, D is derived from an aromatic dihydroxy compound of formula (3), an aromatic dihydroxy compound of formula (8), or a combination thereof. T in formula (29) is a divalent group derived from a dicarboxylic acid, and can be, for example, a $C_{2-10}$ alkylene group, a $C_{6-20}$ alicyclic group, a $C_{6-20}$ alkyl aromatic group, or a $C_{6-20}$ aromatic group. Examples of aromatic dicarboxylic acids that can be used to prepare the polyester units include isophthalic or terephthalic acid, 1,2-di(p-carboxyphenyl)ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or combinations comprising at least one of the foregoing. A specific dicarboxylic acid comprises a combination of isophthalic acid and terephthalic acid wherein the weight ratio of isophthalic acid to terephthalic acid is 100:0 to 0:100, or 99:1 to 1:99, or 91:9 to 2:98.

In another specific embodiment, D is a $C_{2-6}$ alkylene and T is p-phenylene, m-phenylene, naphthalene, a divalent cycloaliphatic group, or a combination comprising at least one of the foregoing. Alternatively, the ester unit can be an arylate ester unit derived from the reaction of an aromatic dihydroxy compound of formula (8) (e.g., resorcinol) with a combination of isophthalic and terephthalic diacids (or derivatives thereof). In another specific embodiment, the ester unit is derived from the reaction of bisphenol A with a combination of isophthalic acid and terephthalic acid. A specific poly(siloxane-ester-carbonate) comprises siloxane blocks (9), ester units derived from resorcinol and isophthalic and/or terephthalic diacids, and carbonate units (1) derived from resorcinol, bisphenol A, or a combination of resorcinol and bisphenol A in a molar ratio of resorcinol carbonate units to bisphenol A carbonate units of 1:99 to 99:1, specifically 20:80 to 80:20. The molar ratio of ester units to carbonate units in these copolymers can vary broadly, for example 1:99 to 99:1, specifically 10:90 to 90:10, more specifically 25:75 to 75:25, depending on the desired properties of the final composition. Poly(siloxane-ester-carbonate)s of this type can include siloxane blocks (9), and blocks comprising 50 to 99 mol % arylate ester units (e.g., resorcinol ester units) and 1 to 50 mol % aromatic carbonate units including resorcinol carbonate units and optionally bisphenol A carbonate units. Such copolymers are described in U.S. Pat. No. 7,605,221.

Any of the foregoing poly(siloxane) copolymers can have an Mw of 5,000 to 250,000, specifically 10,000 to 200,000 grams per mole (Daltons), even more specifically 15,000 to 100,000 Daltons, as measured by gel permeation chromatography (GPC), using a crosslinked styrene-divinylbenzene column and calibrated to polycarbonate references. GPC samples are prepared at a concentration of 1 mg/ml, and are eluted at a flow rate of 1.5 ml/min.

Melt volume flow rate (often abbreviated "MVR") measures the rate of extrusion of a poly(siloxane) copolymer through an orifice at a prescribed temperature and load. The foregoing poly(siloxane) copolymers can have an MVR, measured at 300° C. under a load of 1.2 kg, of 0.1 to 200 cubic centimeters per 10 minutes (cm³/10 min), specifically 1 to 100 cm³/10 min.

In some embodiments a combination of two or more different poly(siloxane) copolymers are used to obtain the desired properties. The poly(siloxane) copolymers can differ in one or more of a property (e.g., polydispersity or molecular weight) or a structural feature (e.g., the value of E, the number of blocks of E, or the identity of the first repeating unit). For example, a poly(siloxane-carbonate) having a relatively lower weight percent (e.g., 3 to 10 wt %, or 6 wt %) of relatively longer length (E having an average value of 30-60) can provide a composition of lower colorability, whereas a poly(siloxane-carbonate) having a relatively higher weight percent of siloxane units (e.g., 15 to 25 wt %, or 20 wt %) of the same length siloxane units, can provide better impact properties. As another example, For example, a poly(siloxane-carbonate) having a relatively lower weight percent (e.g., 3 to 10 wt %, or 6 wt %) of relatively longer length (E having an average value of 30-60) can provide a composition of lower colorability, whereas a poly(siloxane-carbonate) having a relatively higher weight percent of siloxane units (e.g., 15 to 25 wt %, or 20 wt %) of the same length siloxane units, can provide better impact properties. Use of a combination of these two poly(siloxane-carbonate)s can provide a composition having both good colorability and impact properties. Similarly, a poly(siloxane-carbonate) can be used with a poly(siloxane-etherimide) to improve impact.

The first polymer, i.e., the poly(siloxane) copolymer, is used with a second brominated polymer, wherein the type and amount of the brominated polymer is selected so as to provide at least 7.8 wt., or at least 9.0 wt. % bromine to the composition as described above. As used herein, a "brominated polymer" is inclusive of homopolymers and copolymers, and includes molecules having at least 2, at least 5, at least 10, or at least 20 repeat units with bromine substitution, and an Mw of at least 1,000 Daltons, for example 1,000 to 50,000 Daltons.

In certain embodiments, the second polymer is a specific brominated polycarbonate, i.e., a polycarbonate containing brominated carbonate units derived from 2,2',6,6'-tetrabromo-4,4'-isopropylidenediphenol (TBBPA) and carbonate units derived from at least one dihydroxy aromatic compound that is not TBBPA. The dihydroxy aromatic compound can be one of formula (5), (6), (7), (8), (9), or (10). In a specific embodiment the dihydroxy aromatic compound is of formula (5), more specifically dihydroxy aromatic compound (5) containing no additional halogen atoms. In an embodiment, the dihydroxy aromatic compound is Bisphenol A.

The relative ratio of TBBPA to the dihydroxy aromatic compound used to manufacture the TBBPA copolymer will depend in some embodiments on the amount of the TBBPA copolymer used and the amount of bromine desired in the thermoplastic composition. In an embodiment, the TBBPA copolymer is manufactured from a composition having 30 to 70 wt % of TBBPA and 30 to 70 wt % of the dihydroxy aromatic compound, specifically Bisphenol A, or specifically 45 to 55 wt % of TBBPA and 45 to 55 wt % of the dihydroxy aromatic compound, specifically bisphenol A. In an embodiment, no other monomers are present in the TBBPA copolymer.

Combinations of different TBBPA copolymers can be used. Specifically, a TBBPA copolymer can be used having phenol endcaps. Also specifically, a TBBPA carbonate can be used having 2,4,6-tribromophenol endcaps can be used.

The TBBPA copolymers can have an Mw from 18,000 to 30,000 Daltons, specifically 20,000 to 30,000 Daltons as measured by gel permeation chromatography (GPC) using polycarbonate standards.

Alternatively, the poly(siloxane) copolymer is used with a brominated oligomer. Thus, instead of a TBBPA copolymer as the second polymer in certain embodiments, a brominated oligomer having an Mw of 18,000 Daltons or less is used. The term "brominated oligomer" is used herein for convenience to identify a brominated compound comprising at least two repeat units with bromine substitution, and having an Mw of less than 18,000 Daltons. The brominated oligomer can have an Mw of 1,000 to 18,000 Daltons, specifically 2,000 to 15,000 Daltons, and more specifically 3,000 to 12,000 Daltons.

In certain embodiments the brominated oligomer has a bromine content of 40 to 60 wt %, specifically 45 to 55 wt %, more specifically 50 to 55 wt %. The specific brominated oligomer and the amount of brominated oligomer are selected to provide at least 7.8 wt % bromine, specifically 7.8 to 14 wt % bromine, more specifically 8 to 12 wt % bromine, each based on the total weight of first polymer, the brominated oligomer, and the optional additional polycarbonate. In other embodiments, the specific brominated oligomer and the amount of brominated oligomer are selected to provide at least 9.0 wt % bromine, specifically 9.0 to 13 wt % bromine based on the total weight of first polymer, the brominated oligomer, and the optional additional polycarbonate.

The brominated oligomer can be a brominated polycarbonate oligomer derived from brominated aromatic dihydroxy compounds (e.g., brominated compounds of formula (1)) and a carbonate precursor, or from a combination of brominated and non-brominated aromatic dihydroxy compounds, e.g., of formula (1), and a carbonate precursor. Brominated polycarbonate oligomers are disclosed, for example, in U.S. Pat. No. 4,923,933, U.S. Pat. No. 4,170,711, and U.S. Pat. No. 3,929,908. Examples of brominated aromatic dihydroxy compounds include 2,2-bis(3,5-dibromo-4-hydroxyphenyl)propane, bis(3,5-dibromo-4-hydroxyphenyl)menthanone, and 2,2',6,6'-tetramethyl-3,3',5,5'-tetrabromo-4,4'-biphenol. Examples of non-brominated aromatic dihydroxy compounds for copolymerization with the brominated aromatic dihydroxy compounds include bisphenol A, bis(4-hydroxyphenyl)methane, 2,2-bis(4-hydroxy-3-methylphenyl)propane, 4,4-bis(4-hydroxyphenyl)heptane, and (3,3'-dichloro-4,4'-dihydroxydiphenyl)methane. Combinations of two or more different brominated and non-brominated aromatic dihydroxy compounds can be used. If a combination of aromatic dihydroxy compounds is used, then the combinations can contain 25 to 55 mole percent of the brominated aromatic dihydroxy compounds and 75 to 65 mole percent of a non-brominated dihydric phenol. Branched brominated polycarbonate oligomers can also be used, as can compositions of a linear brominated polycarbonate oligomer and a branched brominated polycarbonate oligomer. Combinations of different brominated copolycarbonate oligomers can be used. Various endcaps can be present, for example polycarbonates having phenol endcaps or 2,4,6-tribromophenol endcaps can be used.

Other types of brominated oligomers can be used, for example brominated epoxy oligomers. Examples of brominated epoxy oligomers include those derived from Bisphenol A, hydrogenated Bisphenol A, Bisphenol-F, Bisphenol-S, novolak epoxies, phenol novolac epoxies, cresol novolac epoxies, N-glycidyl epoxies, glyoxal epoxies dicyclopentadiene phenolic epoxies, silicone-modified epoxies, and epsilon-caprolactone modified epoxies. Combinations of different brominated epoxy oligomers can be used. Specifically, a tetrabromobisphenol A epoxy be used, having 2,4,6-tribromophenol endcaps. An epoxy equivalent weight of 200 to 3000 can be used.

In some embodiments a combination of two or more different brominated polymers are used to obtain the desired properties. The brominated polymers can differ in one or more of a property (e.g., polydispersity or molecular weight) or a structural feature (e.g., the identity of the repeating units, the presence of copolymer units, or the amount of bromine in the polymer). For example, two different TBBPA copolymers can be used, or a combination of a TBBPA copolymer and a brominated epoxy oligomer. Of course, two or more different poly(siloxane) copolymers can be used with two or more different brominated polymers.

The poly(siloxane) copolymer compositions can further optionally comprise one or more polymers additional to the poly(siloxane) copolymer and the brominated polymer, which can be referred to herein as "one or more third polymers" for convenience. The one or more third polymers can be homopolymers or copolymers and can have repeating units that are the same or different from first repeating units of the poly(siloxane) copolymer. The one or more third polymers can comprise different types of repeating units, provided that the type and amount of repeating units does not significantly adversely affect the desired properties of the compositions, in particular low smoke density and low heat release. The one or more third polymers can comprise carbonate units (1), imide units, etherimide units (17), arylene ether sulfone units (26), arylene ether units (28), ester units (29), or a combination of units comprising at least one of the foregoing. However, in an embodiment, the one or more third polymers do not contain either polysiloxane units or bromine. The one or more third polymers can have an Mw, for example, of 5,000 to 500,000 Daltons, specifically 10,000 to 250,000 Daltons, or 10,000 to 100,000 Daltons, as measured by gel permeation chromatography (GPC), using a crosslinked styrene-divinylbenzene column and calibrated to polycarbonate references. GPC samples are prepared at a concentration of 1 mg/ml, and are eluted at a flow rate of 1.5 ml/min. The one or more third polymers can have an MVR, measured at 300° C. under a load of 1.2 kg, of 0.1 to 200 cubic centimeters per 10 minutes ($cm^3/10$ min), specifically 1 to 100 $cm^3/10$ min.

The one or more third polymers is selected and used in an amount to provide the desired characteristics to the compositions. The amount of the one or more third polycarbonates can be 0 to 85 wt %, 1 to 80 wt %, 5 to 75 wt %, 8 to 60 wt %, 20 to 50 wt %, or 30 to 40 wt %, based on the total weight of the first polymer, the second polymer, and the one or more third polymers. In a specific embodiment the third polymer is present in an amount of 8 to 50 wt %, the polysiloxane unit is present in an amount of 1.5 to 3.5 wt %, and the bromine is present in an amount of 7.8 to 13 wt %, each based on the sum of the wt % of the first, second, and third polymers.

In a specific embodiment, in the thermoplastic compositions comprising a poly(siloxane-carbonate) and the TBBPA copolymer, an optional third polycarbonate can be present that is not same as the first poly(siloxane-carbonate) or the TBBPA copolymer. Specifically in certain embodiments, the one or more third polymers do not contain either polysiloxane units or bromine. In the alternative thermoplastic compositions comprising the poly(siloxane-carbonate) and the brominated oligomer, an additional polycarbonate that is not the same as the first poly(siloxane) or the brominated oligomer is present. Specifically, the additional polycarbonate does not contain polysiloxane units or bromine. When the optional one or more third polymer is a polycarbonate, the polymer comprises units of formula (1) as described above, specifically wherein $R^1$ is derived from the dihydroxy aromatic compound (2) (3), (8), or a combination thereof, and more the specifically dihydroxy aromatic compound (3) containing no additional halogen atoms. In an embodiment, at least 60%, at least 80%, or at least 90% of the $R^1$ units are bisphenol A units. In an embodiment, the optional one or more third polymer (including the additional polycarbonate) is a homopolymer with bisphenol A carbonate units. It is also possible for the one or more third polycarbonates or additional polycarbonates to contain units other than polycarbonate units, for example ester units (29), provided that the ester units are selected so as to not significantly adversely affect the desired properties of the poly(siloxane) copolymer compositions as described above. In an embodiment, the ester units are arylate ester unit derived from the reaction of an aromatic dihydroxy compound of formula (8) (e.g., resorcinol) with a combination of isophthalic and terephthalic diacids (or derivatives thereof). In another specific embodiment, the ester unit is derived from the reaction of bisphenol A with a combination of isophthalic acid and terephthalic acid. A specific poly(ester-carbonate) comprises ester units derived from resorcinol and isophthalic and/or terephthalic diacids, and carbonate units (1) derived from resorcinol, bisphenol A, or a combination of resorcinol and bisphenol A in a molar ratio of resorcinol carbonate units to bisphenol A carbonate units of 1:99 to 99:1, specifically 20:80 to 80:20. The molar ratio of ester units to carbonate units in these copolymers can vary broadly, for example 1:99 to 99:1, specifically 10:90 to 90:10, more specifically 25:75 to 75:25, depending on the desired properties of the final composition.

In addition to the poly(siloxane) copolymer, brominated polymer, and one or more optional third polymers, the poly(siloxane) copolymer compositions can include various additives ordinarily incorporated into flame retardant compositions having low smoke density and low heat release, with the proviso that the additive(s) are selected so as to not adversely affect the desired properties of the poly(siloxane) copolymer composition significantly, in particular low smoke density low heat release. Such additives can be mixed at a suitable time during the mixing of the components for forming the composition. Exemplary additives include fillers, reinforcing agents, antioxidants, heat stabilizers, light stabilizers, ultraviolet (UV) light stabilizers, plasticizers, lubricants, mold release agents, antistatic agents, colorants such as such as titanium dioxide, carbon black, and organic dyes, surface effect additives, radiation stabilizers, additional flame retardants, and anti-drip agents. A combination of additives can be used. In general, the additives are used in the amounts generally known to be effective. The total amount of additives (other than any filler or reinforcing agents) is generally 0.01 to 25 parts per parts per hundred parts by weight of the combination of the first, second, and optional one or more third polymers (PHR).

In an advantageous embodiment, it has been found that certain important additives can be used without adversely affecting the heat release and low smoke properties of the poly(siloxane) copolymer compositions significantly, in particular UV stabilizers, heat stabilizers (including phosphites), other flame retardants (such as Rimar salts) and certain colorants. The use of pigments such as titanium dioxide produces white compositions, which are commercially desirable. Pigments such as titanium dioxide (or other mineral fillers) can be present in the poly(siloxane) copolymer compositions in amounts of 0 to 12 PHR, 0.1 to 9 PHR, 0.5 to 5 PHR, or 0.5 to 3 PHR.

Exemplary antioxidant additives include organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite; alkylated monophenols or polyphenols; alkylated reaction products of polyphenols with dienes, such as tetrakis[methylene(3,5-di-tert-butyl-4-hydroxyhydrocinnamate)]methane; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate; amides of beta-(3,5-di-tert-butyl-4-hydroxyphenyl)-propionic acid, or combinations comprising at least one of the foregoing antioxidants. Antioxidants are used in amounts of 0.01 to 0.1 PHR.

Exemplary heat stabilizer additives include organophosphites such as triphenyl phosphite, tris-(2,6-dimethylphenyl) phosphite, tris-(mixed mono- and di-nonylphenyl)phosphite; phosphonates such as dimethylbenzene phosphonate, phosphates such as trimethyl phosphate, or combinations comprising at least one of the foregoing heat stabilizers. Heat stabilizers are used in amounts of 0.01 to 0.1 PHR.

Light stabilizers and/or ultraviolet light (UV) absorbing additives can also be used. Exemplary light stabilizer additives include benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or combinations comprising at least one of the foregoing light stabilizers. Light stabilizers are used in amounts of 0.01 to 5 PHR.

Exemplary UV absorbing additives include hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB® 5411); 2-hydroxy-4-n-octyloxybenzophenone (CYASORB® 531); 2-[4,6-bis(2,4-dimethylphenyl)-1, 3,5-triazin-2-yl]-5-(octyloxy)-phenol (CYASORB® 1164); 2,2'-(1,4-phenylene)bis(4H-3,1-benzoxazin-4-one) (CYASORB® UV-3638); 1,3-bis[(2-cyano-3,3-diphenylacryloyl) oxy]-2,2-bis[[(2-cyano-3,3-diphenylacryloyl)oxy]methyl] propane (UVINUL® 3030); 2,2'-(1,4-phenylene)bis(4H-3,1-benzoxazin-4-one); 1,3-bis[(2-cyano-3,3-diphenylacryloyl) oxy]-2,2-bis[[(2-cyano-3,3-diphenylacryloyl)oxy]methyl] propane; nano-size inorganic materials such as titanium oxide, cerium oxide, and zinc oxide, all with particle size less than or equal to 100 nanometers; or combinations comprising at least one of the foregoing UV absorbers. UV absorbers are used in amounts of 0.01 to 5 PHR.

Plasticizers, lubricants, and/or mold release agents can also be present in the compositions. There is considerable overlap among these types of materials, which include phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl)phosphate of hydroquinone and the bis(diphenyl)phosphate of bisphenol A; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate, and the like; combinations of methyl stearate and hydrophilic and hydrophobic nonionic surfactants comprising polyethylene glycol polymers, polypropylene glycol polymers, poly(ethylene glycol-co-propylene glycol) copolymers, or a combination comprising at least one of the foregoing glycol polymers, e.g., methyl stearate and polyethylene-polypropylene glycol copolymer in a solvent; waxes such as beeswax, montan wax, and paraffin wax. Such materials are used in amounts of 0.1 to 1 PHR.

Additional monomeric flame retardants include organic compounds that include phosphorus, bromine, and/or chlorine. Non-brominated and non-chlorinated phosphorus-containing flame retardants can be added for certain applications, for example organic compounds containing phosphorus-nitrogen bonds.

Inorganic flame retardants can also be used, for example salts of $C_{1-16}$ alkyl sulfonate salts such as potassium perfluorobutane sulfonate (Rimar salt), potassium perfluorooctane sulfonate, tetraethylammonium perfluorohexane sulfonate, and potassium diphenylsulfone sulfonate; salts such as $Na_2CO_3$, $K_2CO_3$, $MgCO_3$, $CaCO_3$, and $BaCO_3$, or fluoro-anion complexes such as $Li_3AlF_6$, $BaSiF_6$, $KBF_4$, $K_3AlF_6$, $KAlF_4$, $K_2SiF_6$, and/or $Na_3AlF_6$. When present, inorganic flame retardant salts are present in amounts of 0.01 to 10 PHR, more specifically 0.02 to 1 PHR.

Anti-drip agents in most embodiments are not used in the poly(siloxane) copolymer compositions. Anti-drip agents include a fibril-forming or non-fibril forming fluoropolymer such as polytetrafluoroethylene (PTFE). The anti-drip agent can be encapsulated by a rigid copolymer, for example styrene-acrylonitrile copolymer (SAN). PTFE encapsulated in SAN is known as TSAN. Antidrip agents are substantially absent or completely absent from the poly(siloxane) copolymer compositions in some embodiments.

Colorants can be used in the thermoplastic compositions. The term "colorant" as used herein includes pigments (generally, particulate colorants that can be inorganic or organic) and dyes (generally organic colorants that are soluble in the compositions, including fluorescent compounds). The colorant can also have further properties such as electrical conductivity, or may be magnetically shielding. Examples of inorganic pigments are white pigments such as titanium dioxide in its three modifications of rutile, anatase or brookite, lead white, zinc white, zinc sulfide or lithopones; black pigments such as carbon black, black iron oxide, iron manganese black or spinel black; chromatic pigments such as chromium oxide, chromium oxide hydrate green, cobalt green or ultramarine green, cobalt blue, iron blue, Milori blue, ultramarine blue or manganese blue, ultramarine violet or cobalt and manganese violet, red iron oxide, cadmium sulfoselenide, molybdate red or ultramarine red; brown iron oxide, mixed brown, spinel phases and corundum phases or chromium orange; yellow iron oxide, nickel titanium yellow, chromium titanium yellow, cadmium sulfide, cadmium zinc sulfide, chromium yellow, zinc yellow, alkaline earth metal chromates, Naples yellow; bismuth vanadate, and effect pigments such as interference pigments and luster pigments. Other specific inorganic pigments include Pigment White 6, Pigment White 7, Pigment Black 7, Pigment Black 11, Pigment Black 22, Pigment Black 27/30, Pigment Yellow 34, Pigment Yellow 35/37, Pigment Yellow 42, Pigment Yellow 53, Pigment Brown 24, Pigment Yellow 119, Pigment Brown 184, Pigment Orange 20, Pigment Orange 75, Pigment Brown 6, Pigment Brown 29, Pigment Brown 31, Pigment Yellow 164, Pigment Red 101, Pigment Red 104, Pigment Red 108, Pigment Red 265, Pigment Violet 15, Pigment Blue 28/36, Pigment Blue 29, Pigment Green 17, and Pigment Green 26/50. A combination comprising at least one of the foregoing pigments can be used. Pigments, when present, can be used in amounts of about 0.1 to 9 PHR, 0.5 to 5 PHR, or 0.5 to 3 PHR.

Exemplary dyes are generally organic materials and include coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3"",5""-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene, chrysene, rubrene, coronene, or the like; or combinations comprising at least one of the foregoing dyes. Dyes can be used in amounts of 0.001 to 5 PHR.

Specific colorants include Solvent Red 135, Solvent Red 52, Pigment Blue 28, Pigment Blue 29:77007, Pigment Blue 60, and Solvent Violet 36.

Compositions used to form light-diffusive articles, for example light-diffusive marine components, can further comprise a light diffuser additive, i.e., a plurality of light-diffusive particles to provide the light-diffusive effect. Such particles are generally insoluble in the polymers of the thermoplastic compositions. Light-diffuser additives include silicone particles, e.g., polymethylsilsesquioxanes available from GE Silicones under the trade name Tospearl®, crosslinked poly (methyl methacrylate) (PMMA) and other organic polymer particles, e.g., methyl methacrylate/ethyleneglycol dimethacrylate copolymers available from Sekisui Plastics Co. under the trade name TECHPOLYMER MBS®, low levels of $TiO_2$. A combination comprising at least one of the foregoing types of light diffuser additives can be used. Such diffuser particles can be added to high clarity or medium clarity compositions to provide light-diffusive compositions, for example in an amount of 0.05 to 10.0 wt %, 0.2 to 3.0 wt %, 0.2 to 2.0 wt %, or 0.25 to 1.00 wt % of the light diffuser additives, based on the total weight of the polymers in the in the thermoplastic compositions. In general, greater amounts of light diffuser additive is used in the manufacture of thinner articles to obtain the same degree of light diffusion. In an embodiment the light diffuser additives are silicone particles. The light diffuser additives can also be PMMA. Likewise, the light diffuser additives can be a combination of silicone particles and PMMA particles.

Methods for forming the poly(siloxane) copolymer compositions can vary. In an embodiment, the poly(siloxane) copolymer, brominated polymer, and optional one or more third polymers are combined (e.g., blended) with any additives (e.g., a mold release agent) such as in a screw-type extruder. The poly(siloxane) copolymer, brominated polymer, optional one or more third polymers and any additives can be combined in any order, and in form, for example, powder, granular, filamentous, as a masterbatch, and the like. The composition can then be foamed, extruded into a sheet or optionally pelletized. Methods of foaming a thermoplastic composition using frothing or physical or chemical blowing agents are known and can be used. The pellets can be used for molding into articles, foaming, or they can be used in forming a sheet of the flame retardant poly(siloxane) copolymer composition. In some embodiments, the composition can be extruded (or co-extruded with a coating or other layer) in the form of a sheet and/or can be processed through calendaring rolls to form the desired sheet.

As discussed above, the poly(siloxane) copolymer compositions are formulated to meet strict flammability requirements. The poly(siloxane) copolymer compositions have an E662 smoke test DsMax value of less than 200 when tested at a thickness of 1.6 mm, and in some embodiments can further have a value of less than 150, less than 100, less than 80, or 70 to 72. The poly(siloxane) copolymer compositions can have an E662 smoke test DsMax value of 70 to 200, 70 to 150, 70 to 100, or 70 to 80.

The poly(siloxane) copolymer compositions further have an OSU integrated 2 minute heat release test value of less than 65 kW-min/m$^2$ and a peak heat release rate of less than 65 kW/m$^2$ as measured using the method of FAR F25.4, in accordance with Federal Aviation Regulation FAR 25.853 (d). In some embodiments the poly(siloxane) copolymer compositions can have an OSU integrated 2 minute heat release test value of less than 55 kW-min/m$^2$ and a peak heat release rate of less than 55 kW/m$^2$ as measured using the method of FAR F25.4, in accordance with Federal Aviation Regulation FAR 25.853 (d).

The poly(siloxane) copolymer compositions can further be formulated to have a haze less than 3% and a transmission greater than 85%, each measured using the color space CIE1931 (Illuminant C and a 2° observer) or according to ASTM D 1003 (2007) using illuminant C at a 0.062 inch (1.5 mm) thickness. In some embodiments, the poly(siloxane) copolymer compositions can be formulated such that an article molded from the composition has all three of a haze less of than 15% and a transmission of greater than 75%, each measured using the color space CIE1931 (Illuminant C and a 2° observer) or according to ASTM D 1003 (2007) using illuminant C at a 0.125 inch (3.2 mm) thickness, and a room temperature notched Izod impact of greater than 500 J/m as measured according to ASTM D 256-10 at a 0.125 inch (3.2 mm) thickness.

Density (or specific gravity) is a critical factor in marine components, and the poly(siloxane) copolymer compositions can be formulated to have lower densities, in particular a density of 1.31 g/cc or less, 1.30 g/cc or less, or 1.29 g/cc or less. Such densities can generally be obtained when the amount of bromine is less than 15 wt %, 13 wt %, 12 wt %, 11 wt %, 10 wt %, 9 wt %, 8 wt %, or 7.8 wt %, each based on the total weight of the first polymer, second polymer, and optional one or more third polymers.

The poly(siloxane-carbonate) compositions can further be formulated to have a hydrogen to carbon ratio of 0.81:1 to 0.88:1.

The compositions can further have good melt viscosities which aids processing. The poly(siloxane) copolymer compositions can have a melt volume flow rate (MVR, cubic centimeter per 10 minutes (cc/10 min), according to ASTM D 1238) of less than 20, less than 19, less than 18, less than 17, less than 16, less than 15, or less than 12, measured at 300° C./1.2 Kg at 360 second dwell.

In a specific embodiment, the thermoplastic compositions (i.e., compositions containing poly(siloxane-carbonate), brominated polymer, and one or more optional third polymers) are formulated to meet strict flammability requirements. The compositions have an E662 smoke test DsMax value of less than 200 when tested at a thickness of 1.6 mm, and in some embodiments can further have a value of less than 150, less than 100, less than 80, or 70 to 72.

The thermoplastic compositions can further have an OSU integrated 2 minute heat release test value of less than 65 kW-min/m$^2$ and a peak heat release rate of less than 65 kW/m$^2$ as measured using the method of FAR F25.4, in accordance with Federal Aviation Regulation FAR 25.853 (d). In some embodiments the thermoplastic compositions can have an OSU integrated 2 minute heat release test value of less than 55 kW-min/m$^2$ and a peak heat release rate of less than 55 kW/m$^2$ as measured using the method of FAR F25.4, in accordance with Federal Aviation Regulation FAR 25.853 (d).

The thermoplastic compositions can further have excellent impact strength, particularly when the average value of E is higher, i.e., 25-200, 25-100, or 25 to 50. Such compositions often have higher siloxane levels, i.e., at least 2.0 wt %, specifically 2.0 to 8 wt %, 2.0 to 5 wt %, 2.0 to 4 wt %, or 2.0 to 3.5 wt %, each based on the total weight of the poly (siloxane-carbonate), brominated copolymer, and optional one or more third polymers, or based on the total weight of the first polymer, the brominated oligomer, and the optional additional polycarbonate. An article molded from the thermoplastic compositions can have a notched Izod impact of greater than 500 J/m as measured according to ASTM D 256-10 at a 0.125 inch (3.2 mm) thickness. In some embodiments the articles have 80% or 100% ductility.

In some applications, it can be desirable to have a transparent article. Haze values, as measured using the color space CIE1931 (Illuminant C and a 2° observer), or by ANSI/ ASTM D1003 (2007), Procedure A, illuminant C, can be a useful determination of the optical properties of the transparent flame retardant polycarbonate sheet. The lower the haze levels, the better the transparency of the finished sheet. In an embodiment, haze levels for an article comprising the thermoplastic composition, when measured at a thickness of 1.5 millimeters (mm), can be less than 10%, specifically 0 to 10%, 0.5 to 10%, and more specifically 1 to 10%, and transparency as measured by % transmission can be 70% or greater, specifically 80% or greater, greater than or equal to 75%, more specifically, greater than or equal to 90%, as measured using the color space CIE1931 (Illuminant C and a 2° observer), or in accordance with ASTM D1003-07, Procedure A, illuminant C. These values can be obtained even when average value of E in the poly(siloxane-carbonate) is higher, i.e., 25 to 200, 25 to 100, or 25 to 50. Such compositions often have higher siloxane levels, i.e., at least 2.0 wt %, specifically 2.0 to 8 wt %, 2.0 to 5 wt %, 2.0 to 4 wt %, or 2.0 to 3.5 wt %, based on the total weight of the polymers in the thermoplastic compositions. The TBBPA copolymer can be present in an amount from 35 to 50 wt %, and the bromine can be present in an amount of at least 7.8 wt %, specifically 8 to 25 wt %, more specifically 8 to 13 wt %, or 10 to 13 wt %, each based on the total weight of the poly(siloxane-carbonate), TBBPA copolymer, and optional one or more third polymers. The bromine-containing oligomer can be present in an amount from 15 to 30 wt %, and the bromine can be present in an amount greater than 8 wt %, specifically 8 to 25 wt %, more specifically 8 to 13 wt %, based on the total weight of the poly(siloxane-carbonate), the brominated oligomer, and the additional polycarbonate.

In another embodiment, even greater transparency can be obtained when the poly(siloxane-carbonate) has an average value of E that is lower, i.e., 5 to 75, 5 to 50, or 5 to 15, specifically 7 to 13, or 8 to 12. Such compositions further have at least 30 wt %, specifically 30 to 80 wt %, or 30 to 60 wt % of the poly(siloxane-carbonate), at least 20 wt %, specifically 20 to 70 wt %, or 20 to 65 wt % of the TBBPA copolymer, and 0 to 50 wt %, specifically 0 to 30 wt %, or 5 to 20 wt % of the optional third copolymer; lower siloxane levels, i.e., at least 0.3 wt %, specifically 0.3 to 2 wt %, 0.3 to 1 wt %, 0.3 to 0.8 wt %; and at least 5 wt %, specifically 5 to 20 wt % bromine, 5 to 10 wt %, or 7.8 to 13 wt % of bromine, each based on the total weight of the first polymer, TBBPA copolymer, and optional one or more third polymers.

Density (or specific gravity), is a critical factor in marine components, and the thermoplastic compositions can be formulated to have lower densities, in particular a density of 1.31 gram per cubic centimeter (g/cc) or less, 1.30 g/cc or less, or 1.29 g/cc or less. Such densities can generally be obtained when the amount of bromine is less than 15 wt %, 13 wt %, 12 wt %, 11 wt %, 10 wt %, 9 wt %, 8 wt %, or 7.8 wt %, each based on the total weight of the poly(siloxane-carbonate), TBBPA copolymer, and optional one or more third polymers, or based on the total weight of the poly(siloxane-carbonate), the brominated oligomer, and the additional polycarbonate.

The compositions can further have good melt viscosities which aids processing. The thermoplastic compositions can have a melt volume rate (MVR, cc/10 min., ASTM D 1238) of less than 20, less than 19, less than 18, less than 17, less than 16, less than 15, or less than 12, measured at 300° C./1.2 Kg at 360 second dwell.

The thermoplastic compositions can advantageously be formulated to have high clarity, medium clarity, to be transparent, and/or to be light diffusive by adjusting the type and amount of the poly(siloxane-carbonate) and the addition of light diffusive additives where light diffusivity is desired. Light-diffusive compositions can be used to manufacture articles that have good luminance, in which the article provides a high level of transmission of incident light (such as natural light through a window or skylight, or artificial light) with a minimum light loss by reflectance or scattering, where it is not desirable to either see the light source or other objects on the other side of the article. An article e.g., a sheet having a high degree of hiding power (i.e., luminance) allows a significant amount of light through, but is sufficiently diffusive so that a light source or image is not discernible through the panel. The terms "high clarity," "transparent," "medium clarity," and the like are simply for convenience, and refer to the level of transmission/haze before any light diffusive additives are added to the compositions.

Such thermoplastic compositions comprise an amount of bromine-containing polymer effective to provide 9 to 13 wt % of bromine, based on the total weight of the polymers in the thermoplastic composition. Specifically, these thermoplastic compositions comprise 35 to 50 wt % of the bromine-containing polymer based on the total weight of polymers in the thermoplastic composition; and 10 to 65 wt %, 20 to 65 wt %, 30 to 65 wt %, 40 to 65 wt %, or 50 to 65 wt % of the siloxane-containing copolymer based on the total weight of the polymers in the thermoplastic composition, wherein the siloxane-containing copolymer comprises siloxane blocks having from 5 to 200 siloxane units per block. In some embodiments a third, optional polymer is present, such that the weight percents of the bromine-containing polymer, the siloxane-containing polymer, and the optional third polymer total 100 wt %. In a specific embodiment, the siloxane-containing copolymer contains carbonate units derived from bisphenol A and poly(siloxane) block units derived from a polysiloxane bisphenol of formula (15), (16), or a combination thereof wherein E has an average value of 5 to 200; specifically E has an average value of 5 to 150, 5 to 65, or 5 to 20; or E has an average value of 25 to 200, 25 to 150, 25 to 65, or 35 to 55. One or both of the tube reactor processes described in U.S. Patent Application No. 2004/0039145A1 or the process described in U.S. Pat. No. 6,723,864 may be used to synthesize the poly(siloxane-carbonate) copolymers. In this embodiment, the optional third polymer is a polycarbonate, specifically bisphenol-A homopolycarbonate. An article molded from these thermoplastic compositions has an OSU integrated 2 minute heat release test value of less than 65 kW-min/m$^2$ and a peak heat release rate of less than 65 kW/m$^2$ as measured using the method of FAR F25.4, in accordance with Federal Aviation Regulation FAR 25.853 (d), and an E662 smoke test DsMax value of less than 200 when measured at a thickness of 1.6 mm. Solely for convenience herein, these compositions are referred to collectively herein as "light transmissive" thermoplastic compositions, which includes the light diffusive embodiments.

Medium clarity composition can be formulated from the light transmissive thermoplastic compositions that can optionally be made light diffusive by the addition of a light diffuser additive. For example, a sample molded or formed from a medium clarity composition can have a transmission of 70% to 87% or a haze of 2% to 10%, each measured using the color space CIE 1931 (Illuminant C and a 2° observer) at a thickness of 3.2 mm. Such compositions can have relatively higher siloxane levels, i.e., 0.2 to 6.5 wt %, or 0.2 to 5.3 wt %, based on the total weight of the polymers in the light transmissive thermoplastic compositions. A combination of first and second poly(carbonate-siloxane) copolymers can be used. For example, the first poly(carbonate-siloxane) copolymer can have average E value of 25 to 200, 25 to 150, or 25 to 65, for example 45, while the second poly(carbonate-siloxane) copolymer can have average E value of 5 to 150, 5 to 65, or 5 to 20, for example 10. For example, the siloxane-containing copolymer comprises a first siloxane-containing copolymer comprising an average siloxane block length from 25 to 65, and a siloxane content of 2 to 10 wt % based on the weight of the siloxane-containing copolymer, wherein the first siloxane-containing copolymer contributes 0.3 to 4.0 wt. % of the total siloxane units, and an optional second siloxane-containing copolymer comprising an average siloxane block length from 5 to 20, and a siloxane content of 0.5 to 2 wt %, based on the weight of the siloxane-containing copolymer, wherein the optional second siloxane-containing copolymer contributes 0 to 0.4 wt. % of the total siloxane units. For example, based on the total weight of the polymers in the thermoplastic polymer composition, 5 to 65 wt. % of the first siloxane-containing copolymer, wherein the first siloxane-containing copolymer has an average siloxane block length of 35 to 55; and 0 to 60 wt % of the optional second siloxane-containing copolymer, wherein the second siloxane-containing copolymer has an average siloxane block length from 5 to 15 are present. The foregoing poly(carbonate-siloxane) copolymers can have carbonate units derived from bisphenol A and poly(siloxane) block units derived from a polysiloxane bisphenol of formula (15), (16), or a combination thereof.

In another embodiment, the light transmissive thermoplastic compositions can be formulated to be of high clarity. Such compositions have less haze than medium clarity articles, and are transparent. For example, a sample molded or formed from a high clarity composition can have a transmission of 87% or more or a haze of 2% or less, each measured using the color space CIE 1931 (Illuminant C and a 2° observer) at a thickness of 3.2 mm. Such compositions often have relatively lower siloxane levels, i.e., 0.2 to 1.5 wt %, specifically 0.5 wt % siloxane, based on the total weight of the polymers in the thermoplastic compositions. A combination of poly(carbonate-siloxane) copolymers can be used. For example, a first poly(carbonate-siloxane) copolymer can have average E value of 25 to 200, specifically, 25 to 150, more specifically 25 to 65, for example 30, while the second poly(carbonate-siloxane) copolymer can have average E value of 5 to 150, specifically 5 to 65, more specifically, 5 to 20, for example 10. The foregoing poly(carbonate-siloxane) copolymers can have carbonate units derived from bisphenol A and poly(siloxane) block units derived from a polysiloxane bisphenol of formula (15), (16), or a combination thereof.

In still another embodiment, the foregoing light transmissive compositions can be formulated to be transparent. Such compositions have a transmission of 87% or more or a haze of 2% or less, each measured using the color space CIE 1931 (Illuminant C and a 2° observer) at a thickness of 3.2 mm. Further, such compositions have low siloxane levels, on the order of 0.2 to 1.5 wt %, specifically 0.5 wt %, of siloxane units based on the total weight of polymers in the composition. These compositions can be obtained using siloxane-containing copolymers wherein a molded plaque of the siloxane-containing copolymer has a % haze value of 3% or less measured using the color space CIE 1931 (Illuminant C and a 2° observer) at a thickness of 3.2 mm. Advantageously, a wide variety of different siloxane-containing copolymers and combinations thereof can be used, provided that a molded plaque of the siloxane-containing copolymer(s) have a % haze value of 3% or less measured using the color space CIE 1931 (Illuminant C and a 2° observer) at a thickness of 3.2 mm. In an embodiment the siloxane-containing copolymer is a poly (carbonate-siloxane) copolymer having an average E value of 2 to 200; or 25 to 200, 25 to 150, or 25 to 65, for example 30 or 45; or 5 to 150, 5 to 65, or 5 to 20, for example 10. The foregoing poly(carbonate-siloxane) copolymers can have carbonate units derived from bisphenol A and poly(siloxane) block units derived from a polysiloxane bisphenol of formula (15), (16), or a combination thereof.

The foregoing medium-clarity, high-clarity, and transparent compositions can be formulated to be light diffusive by the addition of a plurality of light diffuser additives as described above. For example, the light diffuser additives can comprise silicone, polymethylsilsesquioxane, crosslinked poly(methyl methacrylate), methyl methacrylate/ethyleneglycol dimethacrylate copolymer, $TiO_2$, or a combination comprising at least one of the foregoing additives. The additives, in the form of particles, can be present in an amount of 0.05 to 10 wt %, based on the total weight of polymers in the thermoplastic composition. Alternatively, or in addition, the medium-clarity or high-clarity formulations can include 0.00002 to 5.0 wt % of a colorant based on the total weight of the polymers in the light diffusive thermoplastic composition. For example, the high clarity formulation can comprise 0.0001 to 0.001 wt % of a blue colorant and 0.0001 to 0.001% of violet colorant; a phosphite heat stabilizer; and a UV absorber. The blue colorant can be Pigment Blue 60 and the violet colorant can be Solvent Violet 36. the UV absorber is 2,2'-(1,4-phenylene)bis-2,2'-(1,4-phenylene)bis(4H-3,1-benzoxazin-4-one); 2-(2'hydroxy-5-t-octylphenyl)-benzotriazole; 2-(2H-benzotriazol-2-yl)4,6-bis(1-ethyl-1-phenyl-ethylphenol; or a combination comprising at least one of the forgoing.

Other light diffusive compositions can be formulated from the light transmissive thermoplastic compositions comprise 0.05 to 10 wt %, based on the total weight of polymers in the thermoplastic composition, wherein a sample molded or formed from the light-diffusive composition can have a transmission of 20% to 90%, or a haze of 40% to 99.9%, each measured using the color space CIE 1931 (illuminant C and a 2° observer) at a thickness of 3.2 mm. Such compositions often have relatively higher siloxane levels, i.e., 0.2 to 6.5 wt %, or 0.2 to 5.3 wt %, based on the total weight of the polymers in the thermoplastic compositions. In an embodiment, the light diffusive composition can comprise a combination of two poly(carbonate-siloxane) copolymers, i.e., a first poly(carbonate-siloxane) copolymer that can have average E value of 25 to 200, specifically, 25 to 150, more specifically 25 to 65, for example 45, and a second poly(carbonate-siloxane) copolymer that can have average E value of 5 to 150, specifically 5 to 65, more specifically, 5 to 20, for example 10. The foregoing poly(carbonate-siloxane) copolymers can have carbonate units derived from bisphenol A and poly(siloxane) block units derived from a polysiloxane bisphenol of formula (15), (16), or a combination thereof.

The thermoplastic compositions can advantageously be formulated to have good impact, including high impact with good colorability and medium impact with good colorability. Compositions having good colorability generally show no or minimal flow lines, swirls or gate blush when injection molded. The color is visually uniform across the molded part. It is also advantageous for the base color (color of the composition without pigments) to have a low yellowness index (YI). Most useful compositions have a base color below a YI of 12, below 8, or most below 5. Compositions with a high base color mitigate the ability to bright white and other light colors. The impact and colorability properties of the compositions are obtained by adjusting the type and amount of the poly(siloxane-carbonate) and the addition of a colorant where color is desired. As used herein, the terms "high impact," "medium impact", and "good colorability" are simply for convenience.

Such thermoplastic compositions comprise an amount of bromine polymer effective to provide 9 to 13 wt % of bromine, based on the total weight of the polymers in the thermoplastic composition. Specifically, these thermoplastic compositions comprise 35 to 50 wt % of the bromine-containing polymer based on the total weight of polymers in the thermoplastic composition; and 10 to 65 wt %, 20 to 65 wt %, 30 to 65 wt %, 40 to 65 wt %, or 50 to 65 wt % of the siloxane-containing copolymer based on the total weight of the polymers in the thermoplastic composition, wherein the siloxane-containing copolymer comprises siloxane blocks having from 5 to 200 siloxane units per block. In some embodiments a third, optional polymer is present, such that the weight percents of the bromine-containing polymer, the siloxane-containing polymer, and the optional third polymer total 100 wt %. In a specific embodiment, the siloxane-containing copolymer contains carbonate units derived from bisphenol A and poly(siloxane) block units derived from a polysiloxane bisphenol of formula (15), (16), or a combination thereof wherein E has an average value of 5 to 200; specifically E has an average value of 5 to 150, 5 to 65, or 5 to 20; or E has an average value of 25 to 200, 25 to 150, 25 to 65, or 35 to 55. One or both of the tube reactor processes described in U.S. Patent Application No. 2004/0039145A1 or the process described in U.S. Pat. No. 6,723,864 can be used to synthesize the poly(siloxane-carbonate) copolymers.

In this embodiment, the optional third polymer is a polycarbonate, specifically bisphenol-A homopolycarbonate. An article molded from these thermoplastic compositions has an OSU integrated 2 minute heat release test value of less than 65 kW-min/m$^2$ and a peak heat release rate of less than 65 kW/m$^2$ as measured using the method of FAR F25.4, in accordance with Federal Aviation Regulation FAR 25.853 (d), and an E662 smoke test DsMax value of less than 200 when measured at a thickness of 1.6 mm. Solely for convenience herein, these compositions are referred to collectively herein as "impact" thermoplastic compositions, which includes the embodiments having high impact, optionally with good colorability and medium impact optionally with good colorability.

In an embodiment the impact thermoplastic composition can be formulated to be high impact. A sample molded or formed from a high impact composition has a notched Izod impact of greater than 480 J/m as measured on a 3.2 mm-thick molded article according to ASTM D 256-10 at 0° C. These high impact values can be obtained when average value of E in the poly(siloxane-carbonate) copolymers is higher, i.e., 25 to 200, 25 to 100, or 25 to 65. Such compositions often have relatively higher siloxane levels, i.e., at least 2.5 wt %, specifically 2.5 to 6.0 wt %, based on the total weight of the polymers in the thermoplastic compositions. A combination of poly(siloxane-carbonate) copolymers can be used, for example, a first poly(carbonate-siloxane) copolymer having an average E value of 25 to 200, 25 to 150, or 25 to 65, for example 45 and comprising 15 to 25 wt % siloxane, or 20 wt %; and a second poly(carbonate-siloxane) copolymer having an average E value of 25 to 200, 25 to 150, for example 45, and having 4.0 to 10% siloxane, for example 6.0%. The poly(carbonate-siloxane) copolymer can be one having carbonate units derived from bisphenol A and poly(siloxane) block units derived from a polysiloxane bisphenol of formula (15), (16), or a combination thereof.

In addition, the impact thermoplastic composition can be formulated to be high impact, together with good colorability. For example, a sample molded or formed from a high impact composition can have a notched Izod impact of greater than 400 J/m as measured on a 3.2 mm-thick molded article according to ASTM D 256-10 at 10° C. The thermoplastic compositions can be tinted or colored as needed, and have good color stability when exposed to UV light. These characteristics can be obtained at relatively higher siloxane levels, i.e., at least 2.5 wt %, specifically 2.5 to 5.3 wt % siloxane, based on the total weight of the polymers in the thermoplastic compositions. In addition, the average value of E in the poly(siloxane-carbonate) copolymers is higher, i.e., 25 to 200, 25 to 100, or 25 to 65. For example, a first poly(carbonate-siloxane) copolymer can have average E value of 25 to 200, 25 to 150, or 25 to 65, for example 45, and comprise 15 to 25% siloxane, for example, 20 wt % siloxane based on the weight of the copolymer; and a second poly(carbonate-siloxane) copolymer can have an average E value of 25 to 200, 25 to 100, or 25 to 65, for example 65, and comprise 4.0 to 10 wt % siloxane, for example 6 wt %, based on the weight of the copolymer. The foregoing poly(carbonate-siloxane) copolymers can have carbonate units derived from bisphenol A and poly(siloxane) block units derived from a polysiloxane bisphenol of formula (15), (16), or a combination thereof. The high impact, good colorability compositions can further comprise 0.00002 to 5.0 wt % of a colorant, based on the total weight of the polymers in the thermoplastic composition.

In yet another embodiment, the impact thermoplastic compositions can be formulated to be medium impact, together with good colorability. For example, a sample molded or formed from a medium impact composition can have a notched Izod impact of greater than or equal to 400 J/m as measured on a 3.2 mm-thick molded article according to ASTM D 256-10 at 23° C. Such compositions often have relatively higher siloxane levels, i.e., at least 2.5 wt %, specifically 2.5 to 5.3 wt %, based on the total weight of the polymers in the thermoplastic compositions. These impact values and good colorability can be obtained when the average value of E in the poly(siloxane-carbonate) copolymers is higher, i.e., 25 to 200, 25 to 100, or 25 to 65. For example, a first poly(carbonate-siloxane) copolymer can have average E value of 25 to 200, 25 to 150, or 25 to 65, for example 45 and comprise 15 to 25 wt % siloxane, for example, 20 wt %, based on based on the weight of the copolymer; and a second poly(carbonate-siloxane) copolymer can have average E value of 25 to 150, specifically 25 to 50, for example 45 and have 4.0 to 10% siloxane, for example 6.0 wt %, based on the weight of the copolymer. The foregoing poly(carbonate-siloxane) copolymers can have carbonate units derived from bisphenol A and poly(siloxane) block units derived from a polysiloxane bisphenol of formula (15), (16), or a combination thereof.

In still another embodiment, the impact compositions can be formulated to be high or medium impact, optionally with good colorability. These compositions can have a notched Izod impact of greater than or equal to a notched Izod impact of 2.0 ft-lb/in or greater, measured according to ASTM D 256-10 at a 3.2 mm thickness at room temperature (e.g., 23° C.). Such compositions have relatively higher siloxane levels, i.e., 2.5 to 6.0 wt %, based on the total weight of the polymers in the thermoplastic compositions and siloxane blocks having 10 to 200 siloxane units per block. Advantageously, a wide variety of different siloxane-containing copolymers and combinations thereof can be used. In an embodiment, the siloxane-containing copolymer is a poly(carbonate-siloxane) copolymer, specifically having an average E value of 2 to 200; or 25 to 200, 25 to 150, or 25 to 65, for example 30 or 45; or 5 to 150, 5 to 65, or 5 to 20, for example 10. The foregoing poly(carbonate-siloxane) copolymers can have carbonate units derived from bisphenol A and poly(siloxane) block units derived from a polysiloxane bisphenol of formula (15), (16), or a combination thereof.

As mentioned throughout, the poly(siloxane) copolymer compositions can be used in a wide variety of applications, particularly those requiring low smoke and low heat release values. Articles comprising the poly(siloxane) copolymer compositions can be manufactured by foaming, molding, thermoforming, extruding, or casting the poly(siloxane) copolymer compositions. Thus the poly(siloxane) copolymer compositions can be used to form a foamed article, a molded article, a thermoformed article, an extruded film, an extruded sheet, one or more layers of a multi-layer article, a substrate for a coated article, or a substrate for a metallized article.

The thermoplastic compositions can be used to form a sheet. A "sheet" (which includes a film, layer, and the like) can be a shaped or unshaped, and is a molded, formed, or extruded article of substantially uniform thickness (e.g., 0.001 to 10.0 cm) and which is unshaped or is further shaped. For example in an operation to make a sheet, the molten thermoplastic composition (e.g., a thermoplastic composition that has been heated to a temperature greater than a glass transition temperature (Tg) of the thermoplastic composition) can be extruded from a slot die. Twin or single screw extruders and be used. Single or multi-manifold dies can be used. The extrusion temperatures of 200 to 320° C., specifically 260 to 310° C., and more specifically 270 to 290° C. The molten thermoplastic composition can then be passed through a nip (e.g., a space formed between two calendaring rolls), which when cooled can form the sheet. The temperature for the cooling rolls can be the same or different, for example the temperature of the rolls can be from 80 to 175° C., specifically 100 to 160° C., and more specifically 105 to 150° C. After passing through the nip, the thermoplastic composition can be cooled (e.g., to a temperature less than the Tg of the thermoplastic composition), and can then be passed through pull rolls. A mask can optionally be applied to the cooled sheet to protect the sheet 60 from damage or contamination. The sheet can be cut into lengths suitable for handling.

In various embodiments, the calendaring roll(s) can comprise a polished roll (e.g., a chrome or chromium plated roll) or a textured roll (e.g., a roll comprising an elastomeric material (e.g., an EPDM (ethylene propylene diamine monomer) based rubber)). Suitable materials for the rolls include plastic, metal (e.g., chrome, stainless steel, aluminum, and the like), rubber (e.g., EPDM), ceramic materials, and the like. The size of the rolls, material of the rolls, number of rolls, the film wrap around the rolls, and the like, can vary with the system employed. Processing conditions (e.g., the temperature of the calendaring rolls, the line speed, nip pressure, and the like) can also be varied, depending on the properties of the thermoplastic compositions used.

The sheet can comprise a cap layer to provided additional properties desirable in the sheet. In an embodiment, the cap layer can be a hard coat, defined herein as a coating applied to the sheet to enhance scratch and abrasion resistance, chemical resistance, or other desirable surface properties. Cap layers can also include a UV blocking layer applied to provide optical properties such as enhanced weatherability for underlying layers.

In an embodiment, the sheet comprising the thermoplastic composition further comprises as a cap layer, a hard coat disposed on a surface of the sheet layer. In another embodiment, the sheet comprises as a cap layer, a UV blocking layer disposed on a surface of the sheet. Alternatively, a multilayer article comprises the sheet comprising the thermoplastic compositions, a first layer a UV blocking cap layer disposed on a first side of the sheet, and a second layer a UV blocking layer cap layer disposed on a second, opposite side of the sheet. In another embodiment, a multilayer article comprises the sheet comprising the thermoplastic compositions, a first hard coat cap layer disposed on a first side of the sheet, and a second hard coat cap layer disposed on a second, opposite side of the sheet. A first UV blocking layer can optionally further be disposed between the sheet and the first cap layer, and a second UV blocking layer can further be optionally disposed between the opposite side of the sheet and the second hard coat cap layer. Where more than one hard coat or UV blocking cap layer is disposed on the sheet, each layer can be the same or different from the cap layer on the opposing surface.

Figure 2:
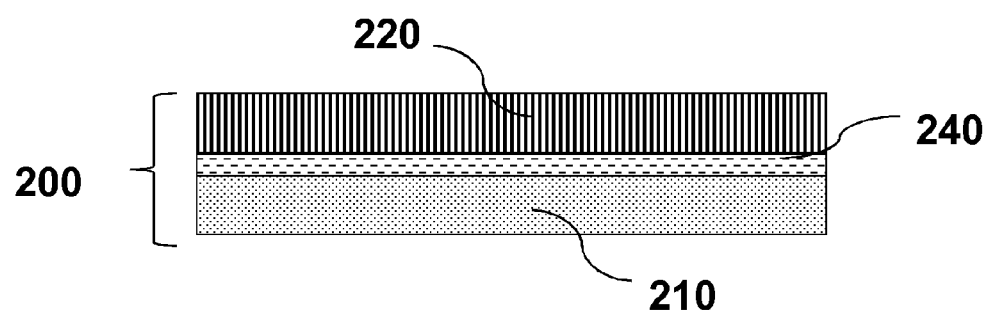
FIG. 2 is a diagram of a hard coated sheet.

Other layers can be present in the multilayer sheets. In an embodiment, in FIG. 1, a hard coated sheet 100 comprises a sheet layer 110 comprising the thermoplastic composition, and a layer 120 comprising a hard coat. In another embodiment, in FIG. 2, a hard coated sheet 200 comprises a sheet layer 210 comprising the thermoplastic composition, a hard coat layer 220, and a primer layer 240 disposed between the sheet layer 210 comprising the thermoplastic composition and the hard coat layer 220. As used herein, where a layer is disposed on another layer it will be understood that the layers are in at least partial contact with each other.

While any suitable method of forming a multilayer article comprising the thermoplastic composition can be used (e.g., thermoforming, vacuum forming, pressure forming, coextrusion, laminating, profile extrusion, blow molding, compression molding, injection molding, and the like), in an embodiment the multilayer articles can be formed by coextrusion or thermoforming. The term "thermoforming" refers to a method comprising the sequential or simultaneous heating and forming of a material onto a mold, wherein the material is originally in the form of a sheet, and can then be formed into a desired shape, for example a window. Once the desired shape has been obtained, the formed article (e.g., a component of a marine window) is cooled below its Tg. Thermoforming methods that can be used include mechanical forming (e.g., matched tool forming), membrane assisted pressure/vacuum forming, membrane assisted pressure/vacuum forming with a plug assist, and the like.

Hard coats are manufactured from a hard coat composition that has a hardness after cure that is harder than the hardness of the over-coated article. Desirably, hard coats are also transparent and colorless, and still more desirably, can protect the underlying coated article from exposure to ultraviolet radiation. In an embodiment, the hard coat provides scratch resistance. Hard coats are generally thermosetting, but can be thermoformable or non-thermoformable. A non-thermoformable hard coat can be applied after the article to be hard coated has been shaped to its final shape, whereas a thermoformable hard coat can be applied prior to shaping (e.g., thermoforming, etc.) by coextruding, coating, or other suitable methods, and is subsequently cured to its desired final hardness during or after shaping to form the article. Hard coats can be a single layer hard coat having sufficient scratch resistance. Hard coats comprise curable (i.e., cross-linkable) polymers, and can be based on hydroxy-containing organic polymers such as novolacs, organosilioxane polymers such as polysilsesquioxane copolymers, acrylates, or a combination comprising at least one of the foregoing. Additives can be included in the coating composition can be included to add or enhance the properties of the hard coat, for example a filler such as silica can be used to increase hardness. Other additives include methyl vinyl cycloalkyl cure retardants which bind the platinum at room temperature to prevent early cure, but release the platinum at higher temperatures to affect cure; ultraviolet absorbers (UVAs) such as benzotriazoles and hydroxybenzophenones, silylated UVAs such as 4,6-dibenzoyl-2-(trialkoxysilylalkyl)resorcinols and 4-(triethoxysilane)propoxy-2-hydroxybenzophenone.

In another embodiment, a coating composition is a UV absorbing layer comprising polycarbonate, and additional polymer such as PCCD. Additives, where used, can be present in an amount of 0.1 to 20 wt %, based on the total weight of the polymer. In an embodiment, the sheet or multilayer sheet can have a color shift of less than or equal to 4 yellowness index (YI) units when exposed to UV light, or in other words, the change in yellowness index dYI can be less than or equal to 4, as 40 measured according to ASTM DI 1925-70.

The hard coat composition further comprises a solvent, such as water, or a branched or straight chain $C_{1-12}$ alcohol, ether alcohol, diol, polyol, or ethyl acetate, or other $C_{1-12}$ organic solvent miscible with these alcohols. Once coated, the hard coat layer is dried to form the uncured hard coat, and can be cured thermally, or by photoinitiation, for example wherein the hard coat composition comprises a photolytic cure catalyst and curable groups reactive with the cure catalyst.

A primer layer can be disposed on the article to be coated prior to the hard coat layer. Useful primer layers include those based on copolymers comprising $C_{1-12}$ alkyl(meth)acrylates, (meth)acrylic acid, substituted methacrylates such as hydroxyalkyl(meth)acrylates, silane substituted methacrylates including alkoxysilane substituted methacrylates, epoxy-substituted methacrylates, and the like. Other non-(meth)acrylate monomers co-polymerizable with the (meth)acrylate monomers including styrenes, $C_{2-12}$ olefins, $C_{2-12}$ vinyl ethers, $C_{1-12}$ (meth)acrylamides, meth(acrylonitrile), and the like.

Multi-layered shaped articles can alternatively be formed by injection molding the thermoplastic composition onto a single or multi-layer film or sheet substrate as follows: (a) providing a single or multi-layer thermoplastic substrate optionally having a color on the surface, for instance, using screen printing or a transfer dye; (b) conforming the substrate to a mold configuration such as by forming and trimming the substrate into a three-dimensional shape and fitting the substrate into a mold having a surface which matches the three dimensional shape of the substrate; (c) injecting the thermoplastic composition into the mold cavity behind the substrate to produce a one-piece, permanently bonded three-dimensional product or (ii) to transfer a pattern or aesthetic effect from a printed substrate to the injected resin and (d) removing the printed substrate, thus imparting the aesthetic effect to the molded thermoplastic composition.

The article comprising the thermoplastic compositions can be a metallized article, for example a substrate comprising the thermoplastic compositions, having a first side and a second side opposite the first side, with a metal layer disposed on the first side of the substrate. The substrate can be of any shape, for example a film. Examples of metals that can be deposited on the substrate include aluminum, copper, silver, gold, steel, brass, tin or alloys comprising at least one of the foregoing. Metallizing typically involves a two-step process, comprising creating a metallized transfer layer, and applying metallized layer of the transfer layer to a side of the substrate. For example, a transfer layer can be coated with a protective layer. Metallic particles are then deposited onto the protective layer by vacuum deposition, for example, or other methods. In a second step, an adhesive coating is applied to the substrate comprising the thermoplastic compositions, whereupon the transfer layer coated with the metal, is adhered to the substrate, with the metallic layer adjacent the adhesive coating. After heating the various layers, the transfer layer is removed to provide a metallic-coated substrate comprising the thermoplastic compositions, and having a protective layer. The metal layer resulting from the metallizing process (e.g., by vapor deposition) can be broaden this range 0.001 to 50 micrometers (μm) thick. The metallized substrate can have a protective layer disposed on the second side of the substrate.

Those skilled in the art will also appreciate that common curing and surface modification processes including heat-setting, texturing, embossing, corona treatment, flame treatment, plasma treatment, and vacuum deposition can further be applied to the above articles to alter surface appearances and impart additional functionalities to the articles.

In an embodiment, the thermoplastic composition is used to prepare a window article for a marine vehicle, such as a window for a passenger ferry, comprising a frame and a sheet comprising the thermoplastic composition supported by the frame. "Supported by" means the window article is in contact with and is fixed or movable with respect to the frame, and where the frame can be fixed or movable with respect to a surrounding element (such as, for example, a cabin of a passenger ferry or cruise ship), such that the frame is intervening between the window article and surrounding element, and the sheet does not directly contact the surrounding element. In an embodiment, a window comprises the window article. In an embodiment, window article can be a component of a window for a marine vehicle, for example a window in a military ship, such as for a bridge window, or in windows for cabins or staterooms. Window articles can be transparent, translucent, or opaque, and can be fixed or movable relative to the window. In an embodiment, a window article can be a transparent or opaque interior covering for a vessel window. An exemplary transparent window article is a "dust cover," which is fixed relative to the window. In another embodiment, an opaque window article that is movable relative to the window is a window shade. In an embodiment, a transparent window article is an interior covering, also referred to herein as a "dust cover" for the interior section of a window. The dust cover can be used for windows for a commercial or non-commercial (i.e., military) marine vehicle, or for a cargo or freight vessel as desired.

Marine windows can comprise at least three elements: an outer window pane, an inner window pane, and the dust cover. In an embodiment, in FIG. 3, a window for a passenger vessel 300 comprises an outer window pane 310, an inner window pane 320, and a dust cover 330. The outer window pane 310 and inner window pane 320 are generally thicker than the dust cover 330 and are thus engineered to be load bearing where the outer window 310 and the inner window 320 may be structural members of the cabin of the vessel. The outer window pane 310 can be a part of the vehicle's structure. The dust cover 330 protects the inner window pane 320 and outer window pane 310 from damage.

Figure 3:
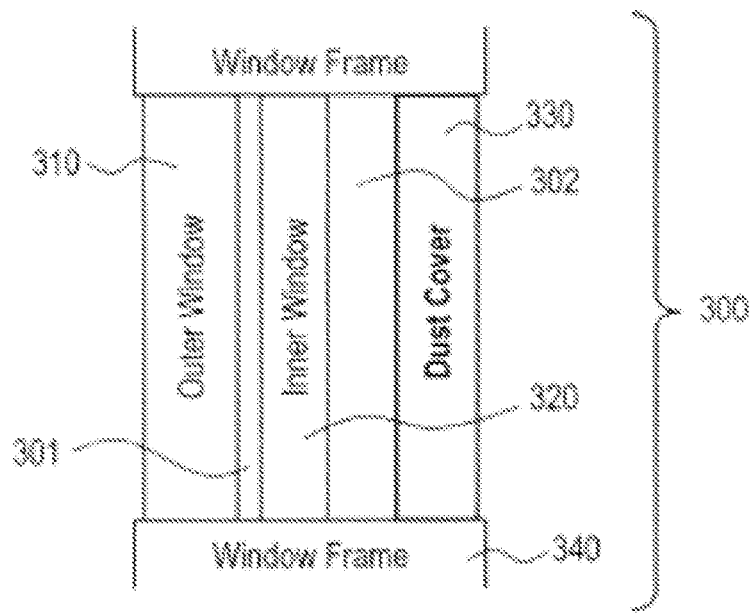
FIG. 3 is a diagram of a window article for a marine vehicle.

Also in FIG. 3, the inner window pane 320 and outer window pane 310 can be formed from the thermoplastic composition or another composition, for example an acrylic polymer composition. The dust cover 330 can be manufactured the thermoplastic composition described herein. It can be advantageous to hard coat the dust cover 330 to increase the scratch resistance of the dust cover 330, and to thereby increase the interior transparency, hardness, and smoke release capability of dust cover 330. Inner window pane 320 and outer window pane 310 are separated by a space 301, and inner window 320 and dust cover 330 are also separated by a space 302. The outer window pane 310, inner window pane 320, and dust cover 330 are each contacted by their edges to a frame 340, such that the frame 340 provides support for and holds in place the outer window pane 310, inner window pane 320, and dust cover 330. In another embodiment, windows structures for commercial marine vehicles can also further contain a moveable shade (not shown) that allows the passenger to block outside light.

Figure 4:
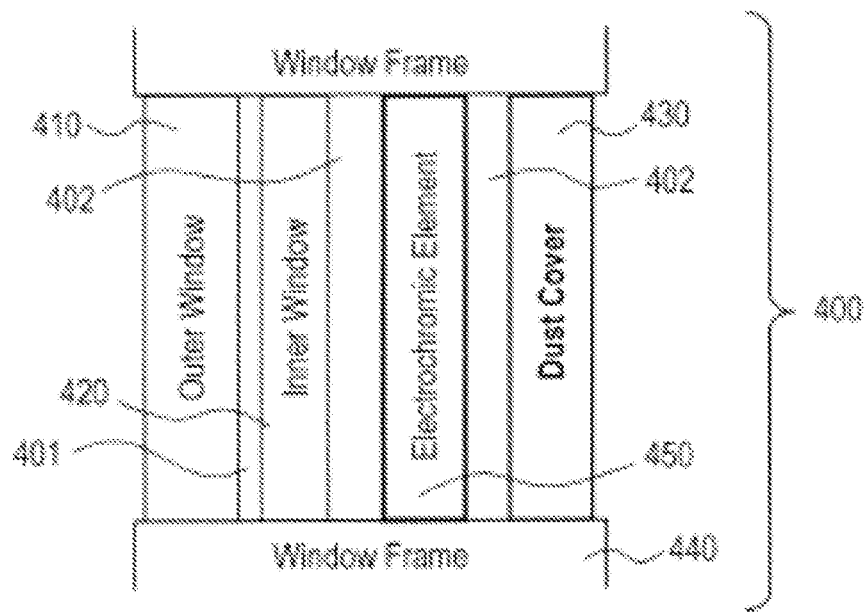
FIG. 4 is a diagram of a window article for a marine vehicle.

In another embodiment, a window for a commercial passenger marine vehicle can comprise at least four major elements as shown in FIG. 4. The window comprises an outer window pane 410 comprising a transparent material, an inner window pane 420 comprising a transparent material, and dust cover 430. The outer window pane 410 and inner window pane 420 are thicker and are engineered to be load bearing, where at least the outer window element a part of the structure of the cabin, for example. The dust cover 430 can be prepared from the thermoplastic composition. It can be advantageous to hard coat the dust cover 430 to increase the scratch resistance of the dust cover 430, and to thereby increase the interior transparency, hardness, and smoke release capability of the dust cover 430. Inner window 420 and outer window 410 are separated by a space 401, and inner window pane 420 and dust cover 430 are also separated by a space 402. The outer window pane 410, inner window pane 420, and dust cover 430 are each contacted by their edges to a frame 440, such that the frame 440 provides support for and holds in place the outer window pane 410, inner window pane 420, and dust cover 430. The frame 440 holding the outer window pane 410 and the inner window pane 420 can be the same as or different from the frame holding the dust cover 430. The dust cover protects the inner and outer element from damage. In lieu of a moveable shade to block the light, an electrochromic element 450 can be included. In an example, the electrochromic element 450 can be inserted between the inner window pane 420 and the dust cover 430, in space 402.

The thermoplastic composition for use in the window panes or dust covers can further be tinted using standard dyes and pigments. The thermoplastic composition can be formed into the window pane or dust cover by extrusion of a sheet (followed by optionally thermoforming) or injection molding. Optionally where needed the window pane or dust cover can be hard coated one or both sides using the hard coat and primer layers described above. The hard coats can be applied to the sheet after extrusion or to the formed window. The dust cover can have a thickness of about 1 to about 4 mm.

Figure 5:
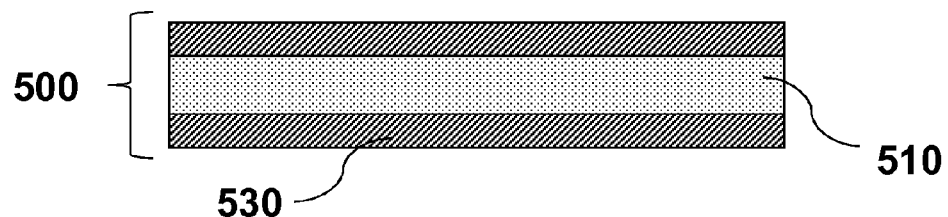
FIG. 5 is a diagram of a multilayer article.

In another embodiment, a multilayer article 500 comprises a sheet 510 comprising the thermoplastic composition and a UV blocking layer 530 disposed on a surface of the sheet 510 as shown in FIG. 5. UV blocking layer 530 is UV stable such that it does not substantially shift in color on exposure to UV light of a wavelength of 275 to 410 nm. In addition, the UV blocking layer 530 is of a sufficient thickness to provide the desired UV protection to substantially prevent the incident light from causing a photo degradation in the sheet layer 510 comprising the thermoplastic composition, but is present in a film thickness that does not cause the multilayer article 500 to fail the heat release or smoke testing requirements set forth herein. In a specific embodiment, a second UV blocking layer is optionally co-extruded on the side of the sheet comprising the thermoplastic composition opposite the first UV blocking layer. In another embodiment, the multilayer article can comprise an additional layer (not shown) on a side of the sheet layer comprising the thermoplastic composition 510 opposite UV blocking layer 530. In a specific embodiment, the additional layer is a UV blocking layer. In another embodiment, the article comprising the sheet layer comprising the thermoplastic composition 510 has a reflective layer disposed on a side opposite the UV blocking layer 530. In another embodiment, the sheet layer comprising the thermoplastic composition 510 has a reflective layer disposed between the sheet layer comprising the thermoplastic composition 510 and UV blocking layer 530.

In a specific embodiment, the multilayer article 500 of FIG. 5, is opaque. For the opaque sheet, pigments and colorants can be added to either the thermosetting composition or the UV blocking layer, or both. In addition, fillers such as, for example, glass and/or mica can be added to one or more of these layers. Addition of such fillers can also increase Young's modulus of the sheet layer comprising the thermoplastic composition 510 and thereby can increase Young's modulus of the article, whereas addition of fillers to the UV blocking layer can decrease the gloss of sheet.

In another specific embodiment, the multilayer article 500 is a transparent article having a high transparency by having either a high percent transmittance or a low haze, or both. For the transparent sheet, low levels of pigments and colorants can be added to either the thermosetting composition or the UV blocking layer, or both.

In another embodiment, the multilayer article 500 is a thermoformable, light-diffusive article having a high degree hiding power in combination with good luminance. For the diffusive article, low levels pigments and colorants can be added to either the sheet layer comprising the thermoplastic composition 510, the UV blocking layer 530 or both. To obtain the diffusive optical requirements the appropriate about of a diffusive agent can be added to sheet layer comprising the thermoplastic composition 510 or the UV blocking layer 530.

Figure 6:
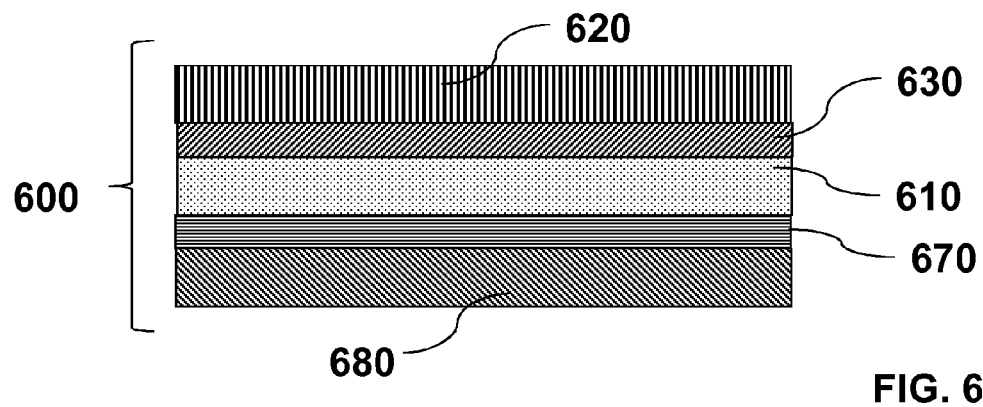
FIG. 6 is a diagram of a multilayer article.

In another embodiment, a multilayer article 600 shown in FIG. 6, comprises a sheet layer comprising the thermoplastic composition 610 (which meets at least the heat release criteria disclosed herein), a UV blocking layer 630 disposed on a surface of the sheet layer comprising the thermoplastic composition 610, and a hard coat layer 620 disposed on a surface of the UV blocking layer 630 opposite the sheet layer comprising the thermoplastic composition 610. The hard coat layer 620 can further comprise a primer layer (640, not shown) disposed between the hard coat 620 and the UV blocking layer 630. The UV blocking layer 630 is UV stable such that it does not substantially shift in color on exposure to UV light of a wavelength of 275 to 410 nm. In addition, the UV blocking layer 630 is of a sufficient thickness to provide the desired UV protection to substantially prevent incident light from causing a photo degradation in the sheet layer comprising the thermoplastic composition 610, but is present in a film thickness that does not cause the multilayer article 600 to fail the heat release or smoke testing requirements described herein. The UV blocking layer 630 can, in an embodiment, comprise the thermoplastic compositions, a polycarbonate homopolymer, polycarbonate copolymer, branched polycarbonate, or a blend comprising at least one of the foregoing polycarbonates. Optionally, the UV blocking layer 630 can contain an effective amount of a UV absorber for example, as a cap layer. The UV absorber levels for cap layers can be present at 0.5 to 15 wt % and preferable 4.0 to 8.0 wt %. The UV absorbers can be selected from the class of benzotriazoles, benzophenones, triazines, benzoxazinones and cyanoacrylates. Some nonlimiting examples include CYASORB™ UV-3638 (Cytec), CYASORB™ UV-1164 (Cytec), CYASORB™ 5411 (Cytec), TINUVIN™ 1577 (Ciba), TINUVIN™ 360 (Ciba), TINUVIN™ 234 (Ciba), UVINUL™ 3030 (BASF) and 4,6-dibenzoylresorcinol. Optionally, the UV blocking layer can contain an effective amount of a flame retardant. In a specific embodiment, where improved chemical resistance is needed, the UV blocking layer comprises a blend with a polyester, such as poly(1,4-cyclohexylene dimethylenel, 4cyclohexanedicarboxylate) (PCCD). Hard coat layer 620 is added to provide a scratch and mar resistance to the sheet or film, and can be applied to one or both sides. In an exemplary embodiment, suitable hard coats include AS4000 or AS4007 silicone hard coats, both available from GE Silicones.

In another specific embodiment, a multilayer article 600 is a scratch and mar resistant opaque article with substantially the same properties as the above opaque article 500, except that the article comprises a hard coat. The hard coat layer 620, can be applied to one or both exposed sides of the sheet layer 610 comprising the thermoplastic composition, and desirably does not significantly adversely affect the properties of the sheet layer 610 comprising the thermoplastic composition. In another specific embodiment, a multilayer article 600 is an opaque article having a hard coat 620, wherein the hard coat is thermoformable.

In another specific embodiment, the multilayer sheet 600 is a scratch and mar resistant, transparent article comprising a thermally cured hard coat. In applications in which UV is expected from both sides of the article, the UV absorbing layer 630 can be applied to both sides of the article. This is also useful to prevent the installation of the incorrect side of the sheet layer 610 comprising the thermoplastic composition, towards the UV light. In another specific embodiment, a multilayer article 600 is a scratch and mar resistant formable transparent article comprising a thermoformable hard coat layer 620.

In another embodiment, a multilayer article 600 is a scratch and mar resistant, diffusive article comprising a hard coat layer 620 that is thermally curable. In another specific embodiment, a multilayer sheet comprises a scratch and mar resistant formable, diffusive sheet comprising a hard coat layer 620 that is thermoformable.

The multilayer article 600 can be prepared by coextrusion, laminating, calendaring, or injection molding, or other method suitable for preparing a multilayer article. In a specific embodiment, the multilayer article is prepared by coextrusion. Further, the hard coat layer 620 as disposed on the UV blocking layer 630 can also be coextruded, spray coated, dip coated, curtain coated, and the like, or otherwise coating using a suitable coating method for providing a hard coat. The hard coat layer, when applied using an application method such as spray coating dip coating, curtain coating, or the like, can be subsequently dried by air drying, oven drying, vacuum drying, or a combination of these to form a pre-cured layer. The pre-cured layer is then cured to form the hard coat layer using thermal cure, radiation cure, or a combination comprising at least one of these, to affect the cure of the hard coat layer 620. The multilayer article 600 can be thermoformed. In an embodiment, the hard coat layer 620 is partially cured prior to thermoforming the sheet or film, and the hard coat layer is fully cured during or after thermoforming. In another embodiment, the hard coat layer 620, is applied to a partial sheet or film comprising sheet layer comprising the thermoplastic composition 610 and UV blocking layer 630. In another embodiment, the multilayer article 600 can optionally comprise an additional layer 670 on a side of sheet layer 610 comprising the thermoplastic composition, opposite UV blocking layer 630. In an embodiment, the additional layer 670 is a UV blocking layer (e.g., 630). In another embodiment, the multilayer article can further optionally comprise a second additional layer 680. In another embodiment, the second additional layer 680 is a hard coat (e.g. 620).

Figure 7:
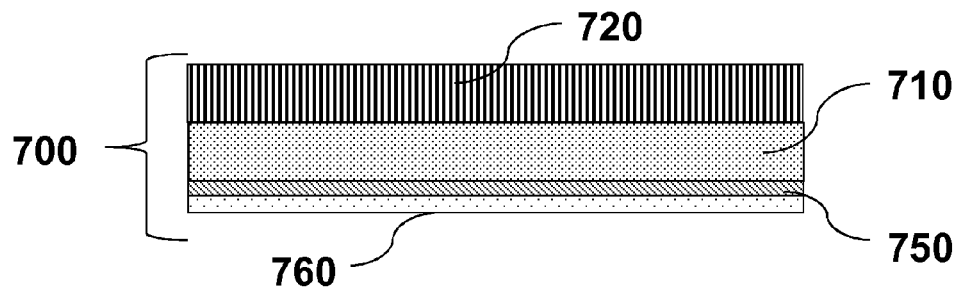
FIG. 7 is a diagram of a plastic mirror.

In another embodiment as shown in FIG. 7, a plastic mirror comprising the thermoplastic composition is also provided. The mirror 700 comprises a sheet layer 710 comprising the thermoplastic composition, a hard coat 720 disposed on a surface of the sheet, and an opacifying layer 750, e.g., a metal layer disposed on a surface of the sheet layer 710 comprising the thermoplastic composition, opposite the hard coat layer 720. The hard coat layer 720 can further comprise a primer layer (740, not shown) disposed between the hard coat layer 720 and the sheet layer 710 comprising the thermoplastic composition. Optionally, a UV layer (730, not shown) is disposed between the hard coat layer 720 and the sheet layer 710 comprising the thermoplastic composition. In an embodiment, the opacifying layer 750 is a metal layer, comprising aluminum, wherein the aluminum is applied to the sheet layer 710 comprising the thermoplastic composition, using a method designed to provide a high optical quality such as sputtering or vapor deposition under high vacuum. The opacifying layer 750, for example, the metal layer, can have a thickness of 2 to 50 nm. A protective layer 760 can optionally be applied a surface of the opacifying layer 750 opposite the sheet layer 710 comprising the thermoplastic composition, to protect the opacifying, e.g., metal layer 750 from abrasion.

Illustrative articles include access panels, access doors, air flow regulators air gaspers, air grilles, arm rests, baggage storage doors, balcony components, cabinet walls, ceiling panels, door pulls, door handles, duct housing, enclosures for electronic devices, equipment housings, equipment panels, floor panels, food carts, food trays, galley surfaces, grilles, handles, housings for TVs and displays, light panels, magazine racks, telephone housings, partitions, parts for trolley carts, seat backs, seat components, railing components, seat housings, shelves, side walls, speaker housings, storage compartments, storage housings, toilet seats, tray tables, trays, trim panel, window moldings, window slides, windows, and the like. The poly(siloxane) copolymer compositions are particularly useful in marine applications, specifically a variety of marine compartment interior applications. The articles manufactured from the compositions described herein can thus be a component of a boat, such as a sailboat or a motor boat, or a ship, such as a passenger ferry, cruise ship, container ship, or bulk freighter. Marine applications can be, for example exterior or interior component for a boat or item of marine equipment, including hulls, trim, an enclosure, or housing; an outboard motor housing; depth finder housing, personal water-craft; jet-ski; pool; spa; hot-tub; step; step covering and the like. In a specific embodiment the articles are interior components for marine vehicles, including access panels, access doors, air flow regulators baggage storage doors, display panels, display units, door handles, door pulls, enclosures for electronic devices, food carts, food trays, grilles, handles, magazine racks, seat components, partitions, refrigerator doors, seat backs, side walls, tray tables, trim panels, and the like. The poly(siloxane) copolymer compositions can be formed (e.g., molded) into sheets that can be used for any of the above mentioned components. It is generally noted that the overall size, shape, thickness, optical properties, and the like of the polycarbonate sheet can vary depending upon the desired application.

The marine components can be hard coated, light-diffusive, medium clarity, or high clarity as defined above. Examples of light-diffusive marine components include partitions (which includes dividers), including bulkhead partitions, and light covers (which includes light domes).

Examples of medium clarity marine components include trolley sidewalls, access doors, and access panels.

Examples of high clarity marine components include window panes, window dust covers, partitions (which included dividers), light covers (which includes light domes), and glass replacements, for example electronics screens (e.g., a screen for an in-flight entertainment device) and covers for display panels, gauges and plastic mirrors, i.e., transparent sheets that have been rendered opaque on one side, for example by metallization.

The marine components can be high impact or medium impact as defined above. In either embodiment the articles can be of good colorability. Examples of high-impact marine components include panels for access doors and components of trolley carts.

Examples of high-impact marine components where good colorability is desired include interior marine parts such as stow bin components, magazine racks, seat back components, components of trolley carts, and access door panels.

Examples of medium-impact marine components where good colorability is desired include call buttons, light bezels, door pulls, door handles, arm rests, seat components, and foot rests.

In some applications, it can be desirable to have a transparent flame retardant article, such as a sheet. With regard to the transparency of the sheet, end user specifications (e.g., commercial airline specifications) generally specify that the component satisfy a particular predetermined threshold. Haze values, as measured using the color space CIE1931 (Illuminant C and a 2° observer), or by ANSI/ASTM D1003-00, Procedure A, illuminant C, can be a useful determination of the optical properties of the transparent flame retardant polycarbonate articles such as a sheet. The lower the haze levels, the better the transparency of the finished article.

The transparent poly(siloxane) copolymer compositions have special utility in applications requiring clarity, for example any of the above articles or components can be manufactured using the transparent thermoplastic compositions disclosed herein. In an embodiment, the transparent thermoplastic compositions are used for the manufacture of balcony components, balusters for stairs and balconies, ceiling panels, covers for life vests, covers for storage bins, dust covers for windows, layers of an electrochromic device, lenses for televisions, electronic displays, gauges, or instrument panels, light covers, light diffusers, light tubes and light pipes, mirrors, partitions, railings, refrigerator doors, shower doors, sink bowls, trolley cart containers, trolley cart side panels, windows, or the like, particularly in marine transports.

Any of the foregoing articles, but in particular the transparent articles, can further have a hardcoat disposed on a surface of the article to enhance abrasion and scratch resistance, chemical resistance, and the like. Hardcoats are known in the art, and include, for example, various polyacrylates such as hyperbranched polyacrylates, silicones, polyfluoroacrylates, urethane-acrylates, phenolics, perfluorpolyethers, and the like.

The light transmissive polycarbonate and impact thermoplastic compositions are particularly useful for the manufacture of specific marine components having specific properties, including light diffusivity, high clarity, medium clarity, transparency, high impact, high impact with good colorability, medium impact, and medium impact with good colorability. As described above, such thermoplastic compositions comprise an amount of bromine-containing polymer effective to provide 9 to 13 wt % of bromine, based on the total weight of the polymers in the thermoplastic composition. Specifically, these thermoplastic compositions comprise 35 to 50 wt % of the bromine-containing polymer based on the total weight of polymers in the thermoplastic composition; and 10 to 65 wt %, 20 to 65 wt %, 30 to 65 wt %, 40 to 65 wt %, or 50 to 65 wt % of the siloxane-containing copolymer based on the total weight of the polymers in the thermoplastic composition, wherein the siloxane-containing copolymer comprises siloxane blocks having from 5 to 200 siloxane units per block. In some embodiments a third, optional polymer is present, such that the weight percents of the bromine-containing polymer, the siloxane-containing polymer, and the optional third polymer totals 100 wt %.

A light-diffusive marine vehicle component selected from a partition and a light cover, wherein the marine vehicle component can be molded or formed from a thermoplastic polymer composition comprises a siloxane-containing copolymer in an amount effective to provide a total of 0.2 to 6.5 wt % of siloxane units based on the total weight of the polymers in the thermoplastic polymer composition, a bromine-containing polymer in an amount effective to provide 9 to 13 wt % of bromine, based on the total weight of the polymers in the thermoplastic polymer composition; and 0.05 to 10 wt % of a plurality of light diffuser additives, based on the total weight of polymers in the thermoplastic polymer composition, wherein a molded or formed sample of the thermoplastic polymer composition has a transmission of 20% to 90% or a haze of 70% to 99.9%, each measured using the color space CIE1931 (Illuminant C and a 2° observer) at a thickness of 3.2 mm, an OSU integrated 2 minute heat release test value of less than 65 kW-min/m$^2$ and a peak heat release rate of less than 65 kW/m$^2$, each measured using the method of FAR F25.4, in accordance with Federal Aviation Regulation FAR 25.853 (d), and an E662 smoke test DsMax value of less than 200 when measured at a thickness of 1.6 mm. In a specific embodiment, the siloxane-containing copolymer contains carbonate units derived from bisphenol A and poly(siloxane) block units derived from a polysiloxane bisphenol of formula (15), (16), or a combination thereof wherein E has an average value of 5 to 200; specifically, E has an average value of 5 to 150, 5 to 65, or 5 to 20; or E has an average value of 25 to 200, 25 to 150, 25 to 65, or 35 to 55.

In an embodiment the siloxane-containing copolymer comprises a first siloxane-containing copolymer having an average siloxane block length from 5 to 20, and a siloxane content of 0.5 to 2 wt % based on the weight of the siloxane-containing copolymer, wherein the first siloxane-containing copolymer contributes 0.2 to 6.5 wt. % of the total siloxane units, and an optional second siloxane-containing copolymer having an average siloxane block length from 25 to 65, and a siloxane content of 0.5 to 10 wt % based on the weight of the siloxane-containing copolymer, wherein the optional second siloxane-containing copolymer contributes 0 to 6.3 wt. % of the total siloxane units. In particular the thermoplastic polymer composition comprise 10 to 65 wt. % of the first siloxane-containing copolymer, wherein the first siloxane-containing copolymer has an average siloxane block length from 5 to 15; and 0 to 55 wt % of the optional second siloxane-containing copolymer, wherein the second siloxane-containing copolymer has an average siloxane block length from 35 to 55. In a specific embodiment, the siloxane-containing copolymer contains carbonate units derived from bisphenol A and poly(siloxane) block units derived from a polysiloxane bisphenol of formula (15), (16), or a combination thereof.

In another embodiment, the siloxane-containing copolymer comprises a first siloxane-containing copolymer having an average siloxane block length from 20 to 200, and a siloxane content of 0.5 to 10 wt % based on the weight of the siloxane-containing copolymer, wherein the first siloxane-containing copolymer contributes 0.2 to 6.5 wt. % of the total siloxane units, and an optional second siloxane-containing copolymer having an average siloxane block length from 5 to 20, and a siloxane content of 0.5 to 2 wt % based on the weight of the siloxane-containing copolymer, wherein the optional second siloxane-containing copolymer contributes 0 to 1.5 wt. % of the total siloxane units. For example, based on the total weight of the polymers in the thermoplastic polymer composition, the thermoplastic composition comprises 10 to 65 wt. % of the first siloxane-containing copolymer, wherein the first siloxane-containing copolymer has an average siloxane block length of 35 to 55; and 0 to 55 wt % of the optional second siloxane-containing copolymer, wherein the second siloxane-containing copolymer has an average siloxane block length from 5 to 15. In a specific embodiment, the siloxane-containing copolymer contains carbonate units derived from bisphenol A and poly(siloxane) block units derived from a polysiloxane bisphenol of formula (15), (16), or a combination thereof.

In still another embodiment, marine vehicle component selected from a window, window dust cover, partition, light cover, electronics screen, display cover, or plastic mirror, wherein the marine vehicle component is molded or formed from a thermoplastic polymer composition comprising a siloxane-containing copolymer in an amount effective to provide a total of 0.2 to 1.5 wt % of siloxane units based on the total weight of polymers in the thermoplastic polymer composition, wherein a molded plaque of the siloxane-containing copolymer has a % haze value of 3% or less measured using the color space CIE 1931 (Illuminant C and a 2° observer) at a thickness of 3.2 mm, a bromine-containing polymer in an amount effective to provide 9 to 13 wt % of bromine, based on the total weight of the polymers in the thermoplastic polymer composition, and an optional third polymer, such that the total weight percent of the polymers is 100 wt %; wherein a molded or formed sample of the thermoplastic polymer composition has a transmission of 87% or more or a haze of 2% or less, each measured using the color space CIE 1931 (Illuminant C and a 2° observer) at a thickness of 3.2 mm, an OSU integrated 2 minute heat release test value of less than 65 kW-min/m2 and a peak heat release rate of less than 65 kW/m2, each measured using the method of FAR F25.4, in accordance with Federal Aviation Regulation FAR 25.853 (d), and an E662 smoke test DsMax value of less than 200 when measured at a thickness of 1.6 mm. In an embodiment the siloxane-containing copolymer is a poly(carbonate-siloxane) copolymer having an average E value of 2 to 200; or 25 to 200, 25 to 150, or 25 to 65, for example 30 or 45; or 5 to 150, 5 to 65, or 5 to 20, for example 10. The foregoing poly(carbonate-siloxane) copolymers can have carbonate units derived from bisphenol A and poly(siloxane) block units derived from a polysiloxane bisphenol of formula (15), (16), or a combination thereof.

In any of the embodiments of the foregoing light-diffusive marine vehicle components, the light diffuser additive can comprise silicone, polymethylsilsesquioxane, crosslinked poly(methyl methacrylate), methyl methacrylate/ethyleneglycol dimethacrylate copolymer, $TiO_2$, or a combination comprising at least one of the foregoing. Further in any of the embodiments of the foregoing light-diffusive marine vehicle components, the siloxane-containing copolymer is a poly(carbonate-siloxane) comprising carbonate units derived from bisphenol A; and poly(siloxane) block units derived from a polysiloxane bisphenol (15), (16), or a combination thereof, wherein E is the average number of units in the poly(siloxane) blocks. Still further in any of the embodiments 0.00002 to 5.0 wt % of a colorant based on the total weight of the polymers in the thermoplastic polymer composition can be present.

A medium-clarity marine vehicle component selected from a trolley sidewall, an access door, and an access panel wherein the marine vehicle component can molded or formed from a thermoplastic polymer composition comprising a siloxane-containing copolymer in an amount effective to provide a total of 0.2 to 6.5 wt % of siloxane units based on the total weight of polymers in the thermoplastic polymer composition, and a bromine-containing polymer in an amount effective to provide 9 to 13 wt % of bromine based on the total weight of the polymers in the thermoplastic polymer composition; wherein a molded or formed sample of the thermoplastic polymer composition has a transmission of 70% to 87% or a haze of 2% to 10%, each measured using the color space CIE 1931 (Illuminant C and a 2° observer) at a thickness of 3.2 mm, an OSU integrated 2 minute heat release test value of less than 65 kW-min/m$^2$ and a peak heat release rate of less than 65 kW/m$^2$, each measured using the method of FAR F25.4, in accordance with Federal Aviation Regulation FAR 25.853 (d), and an E662 smoke test DsMax value of less than 200 when measured at a thickness of 1.6 mm. In an embodiment a poly(carbonate-siloxane) copolymer having an average E value of 2 to 200; or 25 to 200, 25 to 150, or 25 to 65, for example 30 or 45; or 5 to 150, 5 to 65, or 5 to 20, for example 10.

In the medium-clarity marine vehicle component, the siloxane-containing copolymer comprises a first siloxane-containing copolymer having an average siloxane block length from 5 to 20, and a siloxane content of 0.5 to 2 wt % based on the weight of the siloxane-containing copolymer, wherein the first siloxane-containing copolymer contributes 0.2 to 6.5 wt. % of the total siloxane units, and an optional second siloxane-containing copolymer having an average siloxane block length from 25 to 65, and a siloxane content of 0.5 to 10 wt % based on the weight of the siloxane-containing copolymer, wherein the optional second siloxane-containing copolymer contributes 0 to 6.2 wt. % of the total siloxane units. For example, based on the total weight of the polymers in the thermoplastic polymer composition, 5 to 65 wt. % of the first siloxane-containing copolymer, wherein the first siloxane-containing copolymer has an average siloxane block length from 5 to 15; and 0 to 60 wt % of the optional second siloxane-containing copolymer, wherein the second siloxane-containing copolymer has an average siloxane block length from 35 to 55 is present.

In another embodiment of the medium-clarity marine vehicle component the siloxane-containing copolymer comprises a first siloxane-containing copolymer comprising an average siloxane block length from 25 to 65, and a siloxane content of 2 to 10 wt % based on the weight of the siloxane-containing copolymer, wherein the first siloxane-containing copolymer contributes 0.3 to 4.0 wt. % of the total siloxane units, and an optional second siloxane-containing copolymer comprising an average siloxane block length from 5 to 20, and a siloxane content of 0.5 to 2 wt %, based on the weight of the siloxane-containing copolymer, wherein the optional second siloxane-containing copolymer contributes 0 to 0.4 wt. % of the total siloxane units. For example, based on the total weight of the polymers in the thermoplastic polymer composition, 5 to 65 wt. % of the first siloxane-containing copolymer, wherein the first siloxane-containing copolymer has an average siloxane block length of 35 to 55; and 0 to 60 wt % of the optional second siloxane-containing copolymer, wherein the second siloxane-containing copolymer has an average siloxane block length from 5 to 15 are present.

In any of the foregoing embodiments of the medium-clarity marine vehicle components, the siloxane-containing copolymer is a poly(carbonate-siloxane) comprises carbonate units derived from bisphenol A; and poly(siloxane) block units derived from a polysiloxane bisphenol (15), (16), or a combination thereof, wherein E is the average number of units in the poly(siloxane) blocks. Further, the thermoplastic composition can comprise 0.00002 to 5.0 wt % of a colorant based on the total weight of the polymers in the thermoplastic polymer composition.

A light-diffusive marine vehicle component selected from a partition and a light cover, wherein the marine vehicle component is molded or formed from the medium-clarity thermoplastic polymer composition as described above, further comprises 0.2 to 3.0 wt % of light diffuser additives based on the total weight of the polymers in the thermoplastic composition. The light diffuser additive can be selected from silicone, polymethylsilsesquioxane, crosslinked poly(methyl methacrylate), methyl methacrylate/ethyleneglycol dimethacrylate copolymer, $TiO_2$, and a combination comprising at least one of the foregoing. In an embodiment, the light-diffusive thermoplastic composition comprises 0.2 to 3.0, specifically 0.2 to 2.0, wt % of the polymethylsilsesquioxane light diffuser additives; in another embodiment, 0.4 to 1.5 wt % of the crosslinked poly(methyl methacrylate) light diffuser additives, 0.4 to 1.5 wt % of the polymethylsilsesquioxane light diffuser additives, or a combination thereof.

In still another embodiment, a high-clarity marine vehicle component selected from a window, window dust cover, partition, light cover, electronics screen, display cover, or plastic mirror, wherein the marine vehicle component can be molded or formed from a thermoplastic polymer composition comprising a siloxane-containing copolymer in an amount effective to provide a total of 0.2 to 1.5 wt % of siloxane units based on the total weight of polymers in the thermoplastic polymer composition, and a bromine-containing polymer in an amount effective to provide 9 to 13 wt % of bromine, based on the total weight of the polymers in the thermoplastic polymer composition; wherein a molded or formed sample of the thermoplastic polymer composition has a transmission of 87% or more or a haze of 2% or less, each measured using the color space CIE 1931 (Illuminant C and a 2° observer) at a thickness of 3.2 mm, an OSU integrated 2 minute heat release test value of less than 65 kW-min/m$^2$ and a peak heat release rate of less than 65 kW/m$^2$, each measured using the method of FAR F25.4, in accordance with Federal Aviation Regulation FAR 25.853 (d), and an E662 smoke test DsMax value of less than 200 when measured at a thickness of 1.6 mm. In an embodiment the siloxane-containing copolymer is a poly(carbonate-siloxane) copolymer having an average E value of 2 to 200; or 25 to 200, 25 to 150, or 25 to 65, for example 30 or 45; or 5 to 150, 5 to 65, or 5 to 20, for example 10.

In the high-clarity marine vehicle component, the siloxane-containing copolymer comprises a first siloxane-containing copolymer comprising an average siloxane block length from 5 to 20, and a siloxane content of 0.5 to 2 wt % based on the weight of the siloxane-containing copolymer, wherein the first siloxane-containing copolymer contributes 0.2 to 1.5 wt. % of the total siloxane units, and an optional second siloxane-containing copolymer comprising an average siloxane block length from 25 to 65, and a siloxane content of 0.5 to 10 wt %, based on the weight of the siloxane-containing copolymer, wherein the optional second siloxane-containing copolymer contributes 0 to 1.3 wt. % of the total siloxane units. For example, based on the total weight of the polymers in the thermoplastic polymer composition, 20 to 65 wt. % of the first siloxane-containing copolymer, wherein the first siloxane-containing copolymer has an average siloxane block length from 5 to 20; and 0 to 30 wt % of the optional second siloxane-containing copolymer, wherein the second siloxane-containing copolymer has an average siloxane block length from 20 to 40 can be present.

In any of the foregoing embodiments of the high-clarity marine vehicle component the siloxane-containing copolymer is a poly(carbonate-siloxane) comprising carbonate units derived from bisphenol A; and poly(siloxane) block units derived from a polysiloxane bisphenol (15), (16), or a combination thereof, wherein E is the average number of units in the poly(siloxane) blocks and is 5-80. Also in any of the foregoing embodiment, 0.00002 to 5.0 wt % of a colorant, based on the total weight of the polymers in the thermoplastic polymer composition, is present. For example, the thermoplastic composition can comprise 0.0001 to 0.001 wt % of a blue colorant and 0.0001 to 0.001% of violet colorant; a phosphite heat stabilizer; and a UV absorber. The blue colorant can be Pigment Blue 60 and the violet colorant can be Solvent Violet 36. The UV absorber can be 2,2'-(1,4-phenylene)bis-2,2'-(1,4-phenylene)bis(4H-3,1-benzoxazin-4-one); 2-(2'hydroxy-5-t-octylphenyl)-benzotriazole; 2-(2H-benzotriazol-2-yl)4,6-bis(1-ethyl-1-phenylethylphenol; or a combination comprising at least one of the forgoing.

Light-diffusive marine vehicle component selected from a partition and a light cover, wherein the marine vehicle component is molded or formed from the high-clarity thermoplastic polymer composition further comprise 0.2 to 3.0, specifically 0.2 to 2.0, wt % of light diffuser additives based on the total weight of the polymers in the thermoplastic polymer composition. The light diffuser additive can comprise silicone, polymethylsilsesquioxane, crosslinked poly(methyl methacrylate) particles, methyl methacrylate/ethyleneglycol dimethacrylate copolymer, TiO$_2$, or a combination comprising at least one of the foregoing=, for example, 0.2 to 3.0, specifically 0.2 to 2.0, wt % of the polymethylsilsesquioxane light diffuser additives; or 0.4 to 1.5 wt % of the crosslinked poly(methyl methacrylate) light diffuser additives, 0.4 to 1.5 wt % of the polymethylsilsesquioxane light diffuser additives, or a combination thereof, provided that the total amount of light diffuser additives is 3.0 wt % or less can be used.

The high-clarity thermoplastic compositions can be used in the manufacture of marine vehicle component wherein the component is a window article comprising a sheet supported by a frame, wherein the sheet is molded or formed from the thermoplastic polymer composition. The sheet can have a first side and a second opposite side, and the window article can further comprises a first hard coat layer disposed on the first side and a second hard coat layer disposed on the second side. A first ultraviolet light-blocking layer can be disposed between the first hard coat layer and the first side of the sheet, and a second ultraviolet light-blocking layer can be disposed between the second hard coat layer and the second side of the sheet. For example, the component is a dust cover for a window, the window comprising an outer window and an inner window separated by a space; the dust cover separated from the inner window by a space, and a frame, wherein the outer window, inner window, and dust cover are secured in the frame such that the inner window is disposed between and is substantially coplanar with each of the dust cover and the outer window.

The high-clarity thermoplastic compositions can be used in the manufacture of marine vehicle component wherein the component is a is a mirror, comprising: a layer molded or formed from the thermoplastic polymer composition, a hard coat disposed on a surface of a first side of the layer, and an opacifying layer disposed on a surface of a second side of the layer opposite the first side. The opacifying layer can be a metal layer. A protective coat can be disposed on a surface of the opacifying layer opposite the layer molded or formed from the thermoplastic polymer composition.

In another embodiment, a high-impact marine vehicle component selected from an access door panel, a seat back component and a component of a trolley cart, wherein the marine vehicle component is molded or formed from a thermoplastic polymer composition comprising a siloxane-containing copolymer in an amount effective to provide a total of 2.5 to 6.0 wt % of siloxane units based on the total weight of polymers in the thermoplastic polymer composition, and a bromine-containing polymer in an amount effective to provide 9 to 13 wt % of bromine, based on the total weight of the polymers in the thermoplastic polymer composition; and wherein a molded or formed sample of the thermoplastic polymer composition has a notched Izod impact of 480 J/m or greater, measured according to ASTM D 256-10 at a 3.2 mm thickness at 0° C., an OSU integrated 2 minute heat release test value of less than 65 kW-min/m$^2$ and a peak heat release rate of less than 65 kW/m$^2$, each measured using the method of FAR F25.4, in accordance with Federal Aviation Regulation FAR 25.853 (d), and an E662 smoke test DsMax value of less than 200 when measured at a thickness of 1.6 mm.

In the high-impact marine vehicle component the siloxane-containing copolymer comprises a first siloxane-containing copolymer having an average siloxane block length from 25 to 65, and a siloxane content of 15 to 25 wt % based on the weight of the siloxane-containing copolymer, wherein the optional second siloxane-containing copolymer contributes 2.5 to 6.0 wt. % of the total siloxane units; and a second, optional siloxane-containing copolymer having an average siloxane block length from 25 to 65, and a siloxane content of 4 to 10 wt % based on the weight of the siloxane-containing copolymer, wherein the first siloxane-containing copolymer contributes 0 to 3.0 wt. % of the total siloxane units. For example, based on the total weight of the polymers in the composition, 13 to 50 wt. % of the first siloxane-containing copolymer, wherein the first siloxane-containing copolymer has an average siloxane block length from 40 to 50; and 0 to 37 wt % of the optional second siloxane-containing copolymer, wherein the second siloxane-containing copolymer has an average siloxane block length from 40 to 50 can be present.

In any of the foregoing embodiments of the high-impact marine vehicle component the siloxane-containing copolymer can be a poly(carbonate-siloxane) comprising carbonate units derived from bisphenol A; and poly(siloxane) block units derived from a polysiloxane bisphenol (15), (16), or a combination thereof, wherein E is the average number of units in the poly(siloxane) blocks.

In still another embodiment, a high impact, colored marine vehicle component selected from a stow bin component, a magazine rack, a seat back component, a component of a trolley cart, and an access door panel, wherein the marine vehicle component is molded or formed from a thermoplastic polymer composition comprising a siloxane-containing copolymer in an amount effective to provide a total of 2.5 to 5.3 wt % of siloxane units based on the total weight of polymers in the thermoplastic polymer composition; a bromine-containing polymer in an amount effective to provide 9 to 13 wt % of bromine, based on the total weight of the polymers in the thermoplastic polymer composition; and 0.00002 to 5.0 wt % of a colorant based on the total weight of the polymers in the thermoplastic polymer composition, wherein a molded or formed sample of the thermoplastic polymer composition has a notched Izod impact of 400 J/m or greater, measured at 10° C. according to ASTM D 256-10 at a 3.2 mm thickness, an OSU integrated 2 minute heat release test value of less than 65 kW-min/m$^2$ and a peak heat release rate of less than 65 kW/m$^2$, each measured using the method of FAR F25.4, in accordance with Federal Aviation Regulation FAR 25.853 (d), and an E662 smoke test DsMax value of less than 200 when measured at a thickness of 1.6 mm.

In the high impact, colored marine vehicle component the siloxane-containing copolymer can comprise a first siloxane-containing copolymer comprising an average siloxane block length from 25 to 65, and a siloxane content of 15 to 25 wt % based on the weight of the siloxane-containing copolymer, wherein the first siloxane-containing copolymer contributes 1.0 to 2.5 wt. % of the total siloxane units, and a second siloxane-containing copolymer comprising an average siloxane block length from 25 to 65, and a siloxane content of 4 to 10 wt %, based on the weight of the siloxane-containing copolymer, wherein the second siloxane-containing copolymer contributes 0.3 to 3 wt. % of the total siloxane units with the proviso that the composition comprises a total of 2.5 to 5.3 wt % of siloxane units, based on the total weight of polymers in the thermoplastic polymer composition. For example, based on the total weight of the polymers in the thermoplastic polymer composition, 5 to 12 wt. % of the first siloxane-containing copolymer, wherein the first siloxane-containing copolymer has an average siloxane block length from 35 to 55; and 38 to 55 wt % of the optional second siloxane-containing copolymer, wherein the second siloxane-containing copolymer has an average siloxane block length from 35 to 55 can be present.

In any of the foregoing high-impact, colored marine vehicle components the siloxane-containing copolymer is a poly(carbonate-siloxane) can comprising carbonate units derived from bisphenol A; and poly(siloxane) block units derived from a polysiloxane bisphenol (15), (16), or a combination thereof, wherein E is the average number of units in the poly(siloxane) blocks.

In still another embodiment, a medium-impact, colored marine vehicle component selected from a call button, a light bezel, a door pull, a door handles, an arm rest, a seat component, and a foot rest, wherein the marine vehicle component is molded or formed from a thermoplastic polymer composition comprises a siloxane-containing copolymer in an amount effective to provide a total of 2.4 to 5.5 wt % of siloxane units based on the total weight of polymers in the thermoplastic polymer composition; a bromine-containing polymer in an amount effective to provide 9 to 13 wt % of bromine, based on the total weight of the polymers in the thermoplastic polymer composition; and 0.00002 to 5.0 wt % of a colorant based on the total weight of polymers in the thermoplastic polymer composition, wherein a molded or formed sample of the thermoplastic polymer composition has a notched Izod impact greater than or equal to 400 J/m, measured at 23° C. according to ASTM D 256-10 at a 3.2 mm thickness, an OSU integrated 2 minute heat release test value of less than 65 kW-min/m$^2$ and a peak heat release rate of less than 65 kW/m$^2$, each measured using the method of FAR F25.4, in accordance with Federal Aviation Regulation FAR 25.853 (d), and an E662 smoke test DsMax value of less than 200 when measured at a thickness of 1.6 mm.

In the medium-impact, colored marine components, the siloxane-containing copolymer can comprise an optional first siloxane-containing copolymer comprising an average siloxane block length from 25 to 65, and a siloxane content of 15 to 25 wt % based on the weight of the siloxane-containing copolymer, wherein the first siloxane-containing copolymer contributes 0.0 to 0.9 wt. % of the total siloxane units, and a second siloxane-containing copolymer having an average siloxane block length from 25 to 65, and a siloxane content of 4 to 10 wt % based on the weight of the siloxane-containing copolymer, wherein the second siloxane-containing copolymer contributes 2.4 to 5.5 wt. % of the total siloxane units. For example based on the total weight of the polymers in the thermoplastic polymer composition, 0 to 5 wt. % of the optional first siloxane-containing copolymer, wherein first siloxane-containing copolymer has an average siloxane block length from 35 to 55; and 45 to 65 wt % of the second siloxane-containing copolymer, wherein the second siloxane-containing copolymer has an average siloxane block length from 35 to 55 can be present.

In any of the foregoing embodiments of the medium-impact, colored marine vehicle component, the siloxane-containing copolymer can be a poly(carbonate-siloxane) comprising carbonate units derived from bisphenol A; and poly(siloxane) block units derived from a polysiloxane bisphenol (15), (16), or a combination thereof, wherein E is the average number of units in the poly(siloxane) blocks. Further in any of the foregoing embodiments of the medium-impact, colored marine vehicle components, 0.025 to 5 wt % TiO$_2$, based on the total weight of the polymers in the composition can be present. Or, 0.00002 wt % to 0.02 wt % of a red dye selected from Solvent Red 135 or Solvent Red 52 and 0.00002 to 0.02% of a blue colorant selected from Pigment Blue 28 or Pigment Blue 29:77007 can be present. Or, 0.0001 to 0.1 wt % of carbon black can be present.

In another embodiment, a marine vehicle component selected from an access door panel, a seat component, a component of a stow bin component, a magazine rack, a seat component, a component of a trolley cart, an access door panel call button, a light bezel, a door pull, a door handle, an arm rest, a foot rest and a trolley cart, wherein the marine vehicle component is molded or formed from a thermoplastic polymer composition comprises a siloxane-containing copolymer in an amount effective to provide a total of 2.5 to 6.0 wt % of siloxane units based on the total weight of polymers in the thermoplastic polymer composition, and wherein the siloxane-containing copolymer comprises siloxane blocks having 10-200 siloxane units per block; and a bromine-containing polymer in an amount effective to provide 9 to 13 wt % of bromine, based on the total weight of the polymers in the thermoplastic polymer composition; and wherein a molded or formed sample of the thermoplastic polymer composition has a Notched Izod impact of 2.0 ft-lb/in or greater, measured according to ASTM D 256-10 at a 3.2 mm thickness at room temperature (e.g., 23° C.), an OSU integrated 2 minute heat release test value of less than 65 kW-min/m$^2$ and a peak heat release rate of less than 65 kW/m$^2$, each measured using the method of FAR F25.4, in accordance with Federal Aviation Regulation FAR 25.853 (d), and an E662 smoke test DsMax value of less than 200 when measured at a thickness of 1.6 mm.

Still further, in any of the high impact, or high impact colorable, medium impact, or medium impact colorable components, at least a portion of a surface of the component is painted.

The disclosure is further illustrated by the following Examples. It should be understood that the non-limiting examples are merely given for the purpose of illustration. Unless otherwise indicated, parts and percentages are by weight based upon the total weight of the poly(siloxane) copolymer, brominated polymer, and optional one or more third polymers in the poly(siloxane) copolymer compositions. The amount of additives is thus given in parts by weight per hundred parts by weight of the resins (PHR).

EXAMPLES

Materials

The descriptions of the polycarbonates and polycarbonate copolymers used in the Examples are described in Table 1. Methods for preparing the brominated polycarbonates and the poly(siloxane-carbonate) copolymers are described after Table 1.

In Table 1, a reference to D10, D30, or D45 means a dimethylsiloxane block having an average length of 10.5+/−2.5, with two additional terminal silicon group (with silicon hydride levels of less than 20 ppm, volatiles of less than 0.4%), 30+/−4 with two additional terminal silicon groups (with silicon hydride levels of less than 20 ppm, volatiles of less than 0.4%, and D3 and D4 levels of less than 10 and 1000 ppm respectively), or 45+/−5 with two additional terminal silicon groups (with silicon hydride levels of less than 20 ppm, volatiles of less than 0.4%, and D3 and D4 levels of less than 10 and 1000 ppm respectively). The values of D and wt % siloxane for the copolymers in Table 1 were as charged to the reactor.

The weight average molecular weights (Mw) of the polymers and copolymers in Table 1 were measured by gel permeation chromatography using polycarbonate standards. The endcap was PCP (p-cumyl phenol) or phenol. The percent of siloxane and bromine is weight percent based on the weight of the copolymer.

TABLE 1

| Acronym | Description | Mw | PDI | Endcap | Wt % Siloxane | Avg. Siloxane Length | Wt % Br |
|---|---|---|---|---|---|---|---|
| TBBPA-BPA | TetrabromoBPA/BPA Copolymer | 23,660 | 2.6 | PCP | — | — | 26 |
| BC52 | Tetrabromo BPA Oligomer | 2,638 | 1.7 | Phenol | — | — | 52 |
| SiPC 1 | D10 siloxane block co-polycarbonate | 30,000 | — | PCP | 1 | 10 | — |
| SiPC 1B | D10 siloxane block co-polycarbonate | 22,200 | — | PCP | 1 | 10 | — |
| SiPC 2 | D10 siloxane block co-polycarbonate | 23,600 | 3.0 | PCP | 5 | 10 | — |
| SiPC 3 | D30 siloxane block co-polycarbonate | 23,472 | 2.2 | PCP | 6 | 30 | — |
| SiPC 4 | D45 siloxane block co-polycarbonate | 23,013 | 2.2 | PCP | 6 | 45 | — |
| SiPC 5 | D45 siloxane block co-polycarbonate | 29,852 | 2.6 | PCP | 20 | 45 | — |
| PC 1 | PCP Capped BPA Polycarbonate | 21,900 | 2.5 | PCP | — | — | — |
| PC 2 | PCP Capped BPA Polycarbonate | 29,830 | 2.5 | PCP | — | — | — |

TBBPA-BPA Copolymer.

A representative reaction description for a 26 wt % bromine copolycarbonate batch is as follows.

To the formulation tank was added dichloromethane (16 L), DI water (12 L), bisphenol A (2250 g, 9.9 moles), tetrabromobisphenol A (2250 g, 4.1 moles), p-cumylphenol (102 g, 0.48 mole), triethylamine (75 g, 0.74 mole) and sodium gluconate (10 g). The mixture was transferred to the batch reactor. The reactor agitator was started and circulation flow was set at 80 L/min. Phosgene flow to the reactor was initiated (80 g/min rate). A pH target of 10.0 was maintained throughout the batch by the addition of 33% aqueous sodium hydroxide. The total phosgene addition amount was 2500 g (25.3 moles). After the phosgene addition was complete, a sample from the reactor was obtained and verified to be substantially free of unreacted monomers and chloroformates. Mw of the reaction sample was determined by GPC (Mw=23660, PDI=2.6). The reactor was purged with nitrogen then the batch was transferred to the centrifuge feed tank. To the batch in the feed tank was added dilution dichloromethane (10 L) then the mixture was purified using a train of liquid-liquid centrifuges. Centrifuge one removed the brine phase. Centrifuge two removed the catalyst by extracting the polymer solution with aqueous hydrochloric acid (pH 1). Centrifuges three through eight substantially removed residual ions by extracting the polymer solution with DI water. A sample of the polymer solution was tested and verified less than 5 ppm each of ionic chloride and residual triethylamine.

The polymer solution was transferred to the precipitation feed tank. The polymer was isolated as a white powder by steam precipitation followed by drying in a cone shaped dryer using heated nitrogen (210° F.). Mw=23532. A pressed film of a sample of the polymer was transparent and tough.

SiPC 1 (1D10 Copolymer): A representative reaction description for a 1% siloxane D10 poly(siloxane-carbonate) is as follows. To the formulation tank was added dichloromethane (15 L), DI water (12 L), bisphenol A (4410 g, 19.3 moles), D10 eugenol-capped siloxane (90 g, 0.07 moles), p-cumylphenol (174 g, 0.82 mole), triethylamine (30 g, 0.30 mole) and sodium gluconate (10 g). The mixture was transferred to the batch reactor. The reactor agitator was started and circulation flow was set at 80 L/min Phosgene flow to the reactor was initiated (80 g/min rate). A pH target of 10.0 was maintained throughout the batch by the addition of 33% aqueous sodium hydroxide. The total phosgene addition amount was 2300 g (23.3 moles). After the phosgene addition was complete, a sample from the reactor was obtained and verified to be substantially free of unreacted BPA and chloroformates. Mw of the reaction sample was determined by GPC (Mw=22370 Daltons, PDI=2.4). The reactor was purged with nitrogen then the batch was transferred to the centrifuge feed tank.

To the batch in the feed tank was added dilution dichloromethane (10 L) then the mixture was purified using a train of liquid-liquid centrifuges. Centrifuge one removed the brine phase. Centrifuge two removed the catalyst by extracting the polymer solution with aqueous hydrochloric acid (pH 1). Centrifuges three through eight substantially removed residual ions by extracting the polymer solution with DI water. A sample of the polymer solution was tested and verified less than 5 ppm each of ionic chloride and residual triethylamine.

The polymer solution was transferred to the precipitation feed tank. The polymer was isolated as a white powder by steam precipitation followed by drying in a cone shaped dryer using heated nitrogen (99° C. (210° F.)).

SiPC 2 (5D10 Copolymer).

A representative reaction description for a 5 wt % siloxane D10 poly(siloxane-carbonate) batch is as follows:

To the formulation tank was added dichloromethane (15 L), DI water (12 L), bisphenol A (4125 g, 18.1 moles), D10 eugenol capped siloxane (375 g, 0.30 moles), p-cumylphenol (166 g, 0.78 mole), triethylamine (30 g, 0.30 mole) and sodium gluconate (10 g). The mixture was transferred to the batch reactor. The reactor agitator was started and circulation flow was set at 80 L/min. Phosgene flow to the reactor was initiated (80 g/min rate). A pH target of 10.0 was maintained throughout the batch by the addition of 33% aqueous sodium hydroxide. The total phosgene addition amount was 2300 g (23.3 moles). After the phosgene addition was complete, a sample of the reactor was obtained and verified to be substantially free of unreacted BPA and chloroformates. Mw of the reaction sample was determined by GPC (Mw=21991 Daltons, PDI=2.6). The reactor was purged with nitrogen then the batch was transferred to the centrifuge feed tank.

To the batch in the feed tank was added dilution dichloromethane (10 L) then the mixture was purified using a train of liquid-liquid centrifuges. Centrifuge one removed the brine phase. Centrifuge two removed the catalyst by extracting the polymer solution with aqueous hydrochloric acid (pH 1). Centrifuges three through eight substantially removed residual ions by extracting the polymer solution with DI water. A sample of the polymer solution was tested and verified less than 5 ppm each of ionic chloride and residual triethylamine.

The polymer solution was transferred to the precipitation feed tank. The polymer was isolated as a white powder by steam precipitation followed by drying in a cone shaped dryer using heated nitrogen (210° F.). Mw=21589 Daltons.

SiPC 3 (6D30 Copolymer).

The 6D30 copolymer (6 wt % siloxane D30 poly(siloxane-carbonate)) was made in similar fashion to Examples 14 and 15 in U.S. Pat. No. 6,870,013 using a D30 eugenol-capped siloxane fluid. The polymer contains about 6 wt % siloxane. The Mw is about 23,500 Daltons.

SiPC 4 (6D45 Copolymer).

The 6D45 polymer (6 wt % siloxane D45 poly(siloxane-carbonate)) was made in similar fashion to Examples 14 and 15 in U.S. Pat. No. 6,870,013 using D45 eugenol-capped siloxane fluid. The polymer contains about 6% siloxane. The Mw is about 23,000 Daltons.

SiPC 5 (20D45 Copolymer):

The 20D45 polymer (20 wt % siloxane D45 poly(siloxane-carbonate)) was made in a like manner to the 5D10 poly (siloxane-carbonate) except that a D45 eugenol-capped siloxane fluid was used. The polymer contains about 20% siloxane. The Mw is about 30,000 Daltons.

The additive types and details that were used in the compositions of the Examples are shown in Table 2.

TABLE 2

| Component | Chemical Name | Supplier | Grade |
|---|---|---|---|
| Phosphite | Tris (2,4-di-tert-butylphenyl) phosphite | various | |
| DF1040 | Methylhydrogen siloxane fluid | Momentive Performance Materials | DF 1040 |
| OPTS | Octaphenylcyclotetrasiloxane | Shin-Etsu Chemical Co. | — |
| D4 | Octamethyltetrasiloxane | Aldrich Chemical Co. | — |
| KSS | Potassium diphenylsulfone sulfonato | Arichem LLC | KSS |
| Rimar salt | Potassium perfluorobutane sulfonato | Lanxess | Bayowet C4 |
| STB | Sodium trichlorobenzene sulfonato sesquihydrate | Arichem LLC | STB |
| TSAN | SAN encapsulated PTFE | Sabic Innovative Plastics | TSAN |
| $TiO_2$ Type 1 | Titanium dioxide, (organic coating) | Kronos | Kronos 2233 |
| $TiO_2$ Type 2 | Titanium dioxide, (organic coating) | Kronos | KRONOS 2450 |
| Phosphorus acid | Phosphorus acid solution (0.15%) | | |
| Tinuvin 1577 | 2-(4,6-Diphenyl-1,3,5-triazin-2-yl)-5-hexyloxyphenol | Ciba Specialty Company Corp. | Tinuvin 1577 FF |
| UVA 234 | 2-(2-hydroxy-3,5-di-cumyl)benzotriazole | Ciba Specialty Company Corp. | Tinuvin 234 |
| Cyasorb 3638 | 2,2'-(1,4-Phenylene)bis[4H-3,1-benzoxazin-4-one] | CYTEC Industries | CYASORB UV-3638 |

Extrusion and Molding Conditions.

Extrusions were performed either on a single screw extruder or a twin-screw extruder. Typically the D10 poly (siloxane-carbonate)-containing compositions and corresponding controls were performed on a single or a twin screw extruder. The D30 and D40 poly(siloxane-carbonate)-containing compositions and corresponding controls were performed on a twin screw extruder.

The compositions prepared with a single screw extruder were made as follows. All ingredients were dry blended for about 4 minutes using a paint shaker. The single screw extruder was a Sterling 1¾ inch (44.5 mm) extruder (Length/Diameter (L/D) ratio=24/1, with a vacuum port located near die face, with barrel and die temperature set points of 270, 275, 288, 288° C.).

The compositions prepared on the 30 mm WP twin screw extruder were made as follows. All ingredients were dry blended for about 4 minutes using a paint shaker or a drum tumbler. The twin screw extruder contained a vacuum port located near die face. Typically the compositions were compounded with an applied vacuum of 20+ inches of Hg.

The compositions prepared on a W&P 50 mm Mega twin screw were made as follows. All additives (stabilizers and/or colorants) were dry blended off-line as concentrates using one of the primary polymer powders as a carrier and starve-fed via gravimetric feeder(s) into the feed throat of the extruder. The remaining polymer(s) were starve-fed via gravimetric feeder(s) into the feed throat of the extruder as well. The compositions were compounded with an applied vacuum of 20+ inches of Hg. The extruder was a nine-barrel machine (approx. Length/Diameter (L/D) ratio=36:1) with a vacuum port located in barrel 7.

The compositions were molded after drying at 121° C. for 4 hrs on a 260-ton (236 metric ton) Van Dorn or an 85 Ton Van Dorn molding machine operating at about 300 to 320° C. with a mold temperature of about 80° C. It will be recognized by one skilled in the art that the method is not limited to these temperatures or processing equipment.

Testing Methods.

Standard ASTM testing was performed at 50% relative humidity (RH) and unless otherwise indicated at room temperature (RT).

Notched Izod (NI-125) testing was conducted according to ASTM D 256-10 on a molded sample having a 0.125 inch (3.2 mm) thickness.

Multiaxial impact (MAI) was measured at a speed of 3.3 m/s on a 3.2×102 mm disc using a plunger with a hemispherical end and a diameter 12.70 mm in accordance with ASTM D3763.

Heat deflection temperature was measured on an annealed 3.2 mm sample in accordance with ASTM D 648 using a stress of 0.455 or 1.82 MPa.

The tensile properties were measured in accordance with ASTM D638 at 50 mm/min.

The flexural properties were measured in accordance with ASTM D 790 at 1.27 mm/min.

In most cases melt volume ratio (MVR) was run at 300° C./1.2 Kg at 360 second dwell.

Molecular weight was measured via GPC using polycarbonate standards.

The reported transmission data (% T) was measured at the indicated thickness on a Gretagmacbeth Color-Eye 7000A (Propalette Optiview Gold version 5.2.1.7) using the color space CIE1931 (Illuminant C and a 2° observer) and is equivalent to the "Y" tristimulus value.

The reported the yellowness Index (YI) data was measured at the indicated thickness on a Gretagmacbeth Color-Eye 7000A (Propalette Optiview Gold version 5.2.1.7) in accordance with ASTM E313-73 (D1925) using Illuminant C and a 2° observer.

Heat release testing was performed on 15.2×15.2 cm plaques 1.5 mm thick using the Ohio State University (OSU) rate-of-heat release apparatus, in accordance with the method shown in FAR 25.853 (d), and in Appendix F, section IV (FAR F25.4). Total heat release was measured at the two-minute mark in kW-min/m2 (kilowatt minutes per square meter). Peak heat release was measured as kW/m2 (kilowatts per square meter). The heat release test method is also described in the "Aircraft Materials Fire Test Handbook" DOT/FAA/AR-00/12, Chapter 5 "Heat Release Test for Cabin Materials."

Smoke density testing (ASTM E-662-83, ASTM F-814-83, Airbus ABD0031, Boeing BSS 7239) was performed on 7.5×7.5 cm plaques of 1.5 mm thickness according to the method shown in FAR 25.853 (d), and in Appendix F, section V (FAR F25.5). Smoke density was measured under flaming mode. Smoke density (Ds) at 4.0 min, and the max level (DsMax) were reported.

Low Heat Release and Low Smoke Density Compositions.

1. 1D10 (SiPC 1) Blends with TBBPA-BPA Copolymer.

Table 3 illustrates that a combination of a poly(siloxane-carbonate) having an average siloxane block length (D) of about 10 units and 1 wt % siloxane in the copolymer and a bromine-containing copolycarbonate can produce a blend composition with excellent flame and smoke performance (EX 1-4) compared with compositions having only the brominated copolycarbonate (CEX 2-6), only the poly(siloxane-carbonate) (CEX 1) or only a polycarbonate without either the poly(siloxane-carbonate) or the brominated polycarbonate present (CEX 2).

Specifically a composition having poly(siloxane-carbonate) in combination with a polycarbonate (CEX 1) passes the smoke testing (DsMax) target of less than 200 with a value of 109 but fails the 2-minute OSU test target of less than 65 kW-min/m$^2$ with a value of 68 and also fails the peak OSU test target of less than 65 with a value of 98. As brominated copolycarbonate is added to the composition the 2-minute OSU performance and the peak OSU performance improves (EX 1-EX 4) and both the target values for the 2-minute and peak OSU target values are achieved (values below 65) while the smoke performance (DsMax) is maintained at passing levels (values less than 200). This improvement in flame test performance was achieved with as little as 5.2 wt % bromine in the composition (EX 1). In addition EX 1-EX 4 all have densities below the targeted maximum density of 1.320 for certain marine applications. A thermoplastic composition without the poly(siloxane-carbonate) or the brominated copolycarbonate (CEX 2) also fails both the 2-minute and peak OSU performance tests with values of 73 and 137 although it too passes the smoke test (DsMax) with a value of 139.

The benefit of the presence of siloxane in the composition is illustrated by compositions that only contain the brominated copolycarbonate only (CEX 3-6). They pass the OSU flame testing with 2-minute values of less than 65 and the OSU peak testing with values of less than 65 but perform very poorly in the smoke test exceeding the target of less than 200 with values of 561, 382 and 457.

Furthermore the clarity as measured by % transmission and % haze is excellent for the poly(siloxane-carbonate) compositions with the brominated copolycarbonate (EX 1-4) with transmission values of 88% or greater and haze values of 1.2% or less. These values are as good or better than the polycarbonate control (CEX 2) with a transmission of 89 and a % haze of 2.4. The yellowness index value, a measure of how yellow the part appears, for EX 1 and EX 2 at 2.7 and 2.9 is also very close to the value for the polycarbonate control 2.4. As the brominated copolycarbonate content increases the yellowness index increases significantly from 2.5 (EX 1) at 5.2% bromine content to 5.2 at 13% bromine content (EX 4). High clarity, low yellowness, and low density values in combination with excellent flame and smoke performance are critical for use of these compositions in airplane window applications and so higher bromine content compositions are expected to have limited utility in window applications.

Notched Izod impact values at or near 2 ft-lbs/in (1.00 J/cm) or greater can also provide sufficient ductility for preparation of polycarbonate sheet for use in window applications and EX 1-3 possess the targeted ductility performance for window applications as well. As the bromine contents of the compositions increase the notched Izod ductility decreases to values less than 2 (EX 4 and CEX 5-6) and so high bromine contents in the compositions at 11% or greater would likely not be useful in window applications.

TABLE 3

| Components and Properties | | CEX 1 | EX 1 | EX 2 | EX 3 | EX 4 | CEX 2 | CEX 3 | CEX 4 | CEX 5 | CEX 6 |
|---|---|---|---|---|---|---|---|---|---|---|---|
| TBBPA-BPA | | 0 | 20 | 30 | 40 | 50 | 0 | 20 | 30 | 40 | 80 |
| SiPC 1 | | 40 | 40 | 40 | 40 | 40 | | | | | |
| PC 2 | | 60 | 40 | 30 | 20 | 10 | 100 | 80 | 70 | 60 | 50 |
| IRGAPHOS 168 | | 0.0 | 0.0 | 0.0 | 0.0 | 0.0 | 0.0 | 0.0 | 0.0 | 0.0 | 0.0 |
| Formulated | Total wt % Siloxane | 0.4 | 0.4 | 0.4 | 0.4 | 0.4 | 0 | 0 | 0 | 0 | 0 |
| Composition | Total wt % Bromine | 0 | 5.2 | 7.8 | 10.4 | 13 | 0 | 5.2 | 7.8 | 10.4 | 13 |
| | ~Siloxane D Length | 10 | 10 | 10 | 10 | 10 | — | — | — | — | — |
| MVR | | 6.5 | 6.0 | 5.6 | 5.6 | 5.3 | 6.4 | 6.6 | 6.8 | 6.8 | 6.4 |
| NI-125, RT | Ductility | 100 | 100 | 0 | 0 | 0 | 100 | 100 | 0 | 0 | 0 |
| | J/m | 949 | 867 | 128 | 109 | 92 | 887 | 850 | 130 | 91 | 87 |
| | Ft-lbs/in | 17.8 | 16.2 | 2.4 | 2.0 | 1.7 | 16.6 | 15.9 | 2.4 | 1.7 | 1.6 |
| MAI-RT | Ductility | 100.0 | 100.0 | 100.0 | 100.0 | 100.0 | 100.0 | 100.0 | 100.0 | 100.0 | 100.0 |
| Energy to max load-Avg | J | 79 | 78 | 76 | 75 | 81 | 75 | 75 | 76 | 78 | 78 |
| Energy to failure-Avg | J | 91 | 90 | 89 | 88 | 89 | 81 | 81 | 82 | 84 | 83 |
| Energy, Total-Avg | J | 91 | 90 | 89 | 88 | 89 | 81 | 81 | 84 | 84 | 83 |
| Density-Avg | g/cc | 1.194 | 1.239 | 1.268 | 1.288 | 1.314 | 1.198 | 1.242 | 1.265 | 1.289 | 1.315 |
| Specific Gravity-Avg | | 1.197 | 1.242 | 1.271 | 1.291 | 1.317 | 1.198 | 1.243 | 1.266 | 1.290 | 1.316 |
| HDT | 1.8 MPa | 128 | 132 | 137 | 137 | 142 | 132 | 137 | 139 | 142 | 143 |
| OSU Test FAR 25.853 (d) Appendix F, Part IV | | | | | | | | | | | |
| 2 Min OSU | Average | 68 | 35 | 30 | 25 | 11 | 73 | 24 | 26 | 30 | 17 |
| | Standard deviation | 14 | 7 | 1 | 4 | 10 | 19 | 4 | 5 | 3 | 2 |
| Peak OSU | Average | 98 | 63 | 54 | 48 | 43 | 139 | 70 | 57 | 66 | 56 |
| | Standard deviation | 8 | 4 | 3 | 2 | 1 | 14 | 11 | 5 | 8 | 14 |
| NBS Smoke Density (ASTM F814/E662, Flaming Mode) | | | | | | | | | | | |
| DsMax | Ave | 109 | 139 | 68 | 97 | 59 | 137 | 561 | 382 | 457 | 304 |
| | Standard deviation | 28 | 44 | 32 | 18 | 23 | 19 | 164 | 69 | 243 | 181 |
| Optical Properties | | | | | | | | | | | |
| Optical Properties | % T at 62 mil (1.58 mm) | 89 | 89 | 89 | 88 | 88 | 89 | 89 | 89 | 88 | 88 |
| | YI | 2.7 | 2.7 | 2.9 | 5.1 | 5.2 | 2.4 | 3.3 | 4.1 | 5.0 | 5.0 |
| | % Haze | 1.0 | 0.6 | 0.7 | 0.8 | 1.2 | 2.4 | 1.7 | 1.4 | 1.8 | 1.7 |

2. 5D10 Compositions (SiPC 2) with TBBPA-BPA Copolymer

The results in Table 4 using a poly(siloxane-carbonate) having an average siloxane block length of 10 units and 5 wt % siloxane in the copolycarbonate further illustrates that a combination of polysiloxane block copolycarbonates and a brominated copolycarbonate outperforms either polysiloxane block co thermoplastic compositions or the brominated thermoplastic compositions in OSU flame and smoke density testing.

TABLE 4

| Components and Properties | | CEX 7 | EX 5 | EX 6 | EX 7 | EX 8 | CEX 8 |
|---|---|---|---|---|---|---|---|
| TBBPA-BPA | | 0 | 50 | 70 | 80 | 90 | 100 |
| SiPC 2 | | 100 | 50 | 30 | 20 | 10 | 0 |
| IRGAPHOS 168 | | 0.06 | 0.06 | 0.06 | 0.06 | 0.06 | 0.06 |
| Formulated | Total wt % Siloxane | 5.0 | 2.5 | 1.5 | 1.0 | 0.5 | 0.0 |
| Composition | Total wt % Bromine | 0.0 | 13.0 | 18.2 | 20.8 | 23.4 | 26.0 |
| | ~Siloxane D Length | 10 | 10 | 10 | 10 | 10 | 10 |
| MVR-6 min | Cc/10 min. | 18.4 | 10.1 | 7.9 | 7.6 | 5.6 | 4.6 |
| Tg | ° C. | 141 | 161 | 168 | 170 | 178 | 182 |
| NI-125 RT | Ductility | 100 | 0 | 0 | 0 | 0 | 0 |
| | J/m | 721 | 127 | 78 | 68 | 57 | 50 |
| | ft-lbs/in | 13.5 | 2.4 | 1.5 | 1.3 | 1.1 | 0.9 |
| MAI-RT | Ductility | 100 | 100 | 100 | 100 | 100 | 60 |
| Energy to max load-Avg | J | 65 | 66 | 76 | 76 | 77 | 77 |
| Energy to failure-Avg | J | 73 | 72 | 82 | 82 | 82 | 83 |
| Energy, Total-Avg | | 73 | 72 | 82 | 83 | 82 | 83 |
| Modulus of Elasticity-Avg | MPa | 2220 | 2410 | 2500 | 2620 | 2660 | |
| Stress at Yield-Avg | MPa | 58 | 68 | 72 | 74 | 77 | |
| Stress at Break-Avg | MPa | 50 | 60 | 61 | 61 | 65 | |
| Elongation at Yield-Avg | % | 6 | 7 | 7 | 7 | 7 | |
| Elongation at Break-Avg | % | 87 | 105 | 95 | 92 | 102 | |
| Flexural Modulus-Avg | MPa | 2100 | 2280 | 2480 | 2420 | 2450 | |
| Flex Stress at 5% Strain-Avg | MPa | 84 | 93 | 99 | 98 | 101 | |
| Flexural Stress at Yield-Avg | MPa | 92 | 106 | 114 | 113 | 118 | |
| Density-Avg | g/cc | 1.183 | 1.307 | 1.363 | 1.385 | 1.422 | 1.450 |
| Specific Gravity-Avg | | 1.186 | 1.310 | 1.367 | 1.388 | 1.426 | 1.454 |
| HDT | 1.8 MPa | 117 | 134 | 136 | 146 | 150 | 156 |
| HDT | 0.455 MPa | 130 | 147 | 154 | 159 | 165 | 171 |
| OSU Test FAR 25.853 (d) Appendix F, Part IV | | | | | | | |
| OSU 2 Min. | Average | 102 | 40 | 27 | 34 | 28 | 26 |
| | Standard deviation | 11 | 3 | 6 | 3 | 6 | 5 |

TABLE 4-continued

| Components and Properties | | CEX 7 | EX 5 | EX 6 | EX 7 | EX 8 | CEX 8 |
|---|---|---|---|---|---|---|---|
| OSU Peak | Average | 93 | 45 | 37 | 36 | 37 | 47 |
|  | Standard deviation | 13 | 2 | 3 | 3 | 3 | 12 |
| | NBS Smoke Density (ASTM F814/E662, Flaming Mode) | | | | | | |
| DsMax | Ave | 80.7 | 14.7 | 12.0 | 9.0 | 12.7 | 60.7 |
|  | Standard deviation | 33.6 | 0.6 | 4.4 | 2.6 | 2.1 | 20.5 |
| | Optical Properties | | | | | | |
| % T at 62 mil (1.58 mm) | | 88.6 | 85.8 | 86.0 | 86.5 | 88.2 | 89.0 |
| YI | | 2.8 | 13.4 | 13.1 | 6.4 | 3.8 | 2.9 |
| % Haze | | 12.2 | 5.5 | 4.1 | 2.4 | 0.9 | 1.1 |

CEX 7 contains no bromine and fails both the OSU 2 min total and peak heat release tests with values greater than 65. CEX 7 in this test passed the DsMax flame test. CEX 8 has no siloxane present and it passes the OSU flame and peak heat release test with values below 65 but the DsMax values while passing with a value below 200, However, CEX 8 is extremely brittle which would make it difficult to machine and form into parts, and has a high density, which would by deleterious to weight savings needed to manufacture lightweight marine vehicles. By contrast compositions having poly(siloxane-carbonate) and brominated copolycarbonate passed OSU flame and peak heat test with values below 65 and exhibited DsMax smoke results of less than 15 with standard deviations below 4.4 units.

3. 6D30 (SiPC 2), 6D45 (SiPC 3) and 20D45 (SiPC 3) Compositions with TBBPA-BPA Copolymer The flame and smoke performances of a series of compositions using a bromine copolycarbonate having 26 wt % bromine atoms with siloxane block co-polycarbonates having average siloxane chain lengths of 45 and 30 and siloxane contents of 6 wt % in the copolymer and with a poly(siloxane-carbonate) having an average of 45 polysiloxane units and 20 wt % siloxane in the copolymer are shown in Table 5.

Examples EX 9-22 illustrate that the OSU flame and heat performance as well as smoke performance is maintained in compositions of polysiloxane block copolycarbonates and brominated polycarbonate copolymers with siloxane change lengths of 30 and 45 polysiloxane units and siloxane wt % as low as 5 wt % and as high as 20 wt % in the copolymers. Comparative example CEX 9 (Table 5) and CEX 5 (Table 3) that have no poly(siloxane-carbonate) in the compositions either fail the DsMax smoke test with a value of 195 and 457 or inconsistently pass as a result of high values and a high standard deviation of 78 and 243 units, respectively. This result illustrates once again that the presence of siloxane in the blend is necessary to achieve consistent smoke performance pass values.

EX 16 (without heat stabilizer), when compared with EX 17 (contain similar siloxane and bromine content as EX 16 but with heat stabilizer), demonstrates that the heat stabilizer IRGAPHOS 168 has no significant effect on the flame or smoke performance in the compositions.

High Impact Compositions.

Formulations passing both the OSU flame and smoke tests and having excellent room temperature ductility performance and high flow properties can also be achieved by some of the combinations of brominated polycarbonate copolymers and polysiloxane block copolycarbonates. For Example EX 9, 12 and 22 in Table 5 passed the 2-min flame and heat release tests with flame and heat release values less than 65 and smoke values below 200 and showed excellent room temperature ductility with 100% ductility and with impact energies of greater than 500 J/m at high melt flow values (MVR values of 9.6-12 cc/10 min.). The results from Table 5 shows that compositions with polysiloxane content greater than 1% achieve high room temperature impact (both EX 14 and EX 15 have identical bromine content but EX 14 has 1% polysiloxane content while EX 15 has 2 wt % polysiloxane content and EX 14 has no ductility and room temperature while EX 15 shows partial room temperature ductility). Furthermore it is also desirable for the compositions to have less than 13 wt % brominated copolycarbonate content in order to achieve high ductility (EX 9 and EX 10 both have 2 wt % polysiloxane in their compositions but EX 9 has 10.4 wt % bromine content from the brominated copolymer while EX 10 has 13 wt % bromine content and EX 9 has excellent room temperature impact while EX 10 has low room temperature impact). The examples show that the polysiloxane block copolycarbonates that have 20 wt % polysiloxane content are somewhat more efficient in providing high ductility and room temperature impact strength than the copolymers with 6 wt % content. EX 9 was made from a poly(siloxane-carbonate) having 20 wt % polysiloxane in the copolymer and EX 15 was made from a poly(siloxane-carbonate) having 6 wt % polysiloxane in the copolymer, and both have identical bromine and polysiloxane contents, but EX 9 has a higher impact and ductility value than EX 15. In addition the data in Table 5 show that high impact values could be achieved using both the polysiloxane block copolycarbonates having average siloxane chain lengths of 45 and 30 repeating units. Furthermore the high ductility can be achieved with copolymers having either 20% polysiloxane content or 6% polysiloxane content. In the case of the polysiloxane block copolycarbonates that have 6% polysiloxane content, it is also possible to achieve transparency. One particular benefit of the use of long siloxane chain lengths (chain lengths greater than 10 repeating units) and with about 6 wt % siloxane in the poly(siloxane-carbonate) copolymer is that a combination of high impact and transparency can be achieved in addition to maintaining excellent OSU flame and smoke performance in the compositions. Specifically EX 12 with 2 wt % siloxane and 7.8 wt % bromine content and that is formulated from a poly(siloxane-carbonate) having an average chain length of 45 siloxane and about 6 wt % siloxane in the copolymer has 100% room temperature ductility during notched Izod testing, excellent haze with a value of 3.3% and an excellent % transmission with of value of 88% while having an OSU flame value of 46, a peak heat release value of 55 and a DsMax

TABLE 5

| Components, Properties | | | EX 9 | EX 10 | EX 11 | EX 12 | EX 13 | EX 14 | EX 15 | EX 16 |
|---|---|---|---|---|---|---|---|---|---|---|
| TBBPA-BPA | | | 40 | 50 | 60 | 30 | 40 | 40 | 40 | 40 |
| 20D45 SiPC 5 | | | 10 | 10 | 10 | | | | | |
| 6D45 SiPC 4 | | | | | | 34 | 9 | 17 | 34 | 34 |
| 6D30 SiPC 3 | | | | | | | | | | |
| PC1 | | | 50 | 40 | 30 | 36 | 51 | 43 | 26 | 26 |
| PC 2 | | | | | | | | | | |
| IRGAPHOS 168 | | | 0.06 | 0.06 | 0.06 | 0.06 | 0.06 | 0.06 | 0.06 | 0.00 |
| Total | Wt % Siloxane | | 2.0 | 2.0 | 2.0 | 2.0 | 0.5 | 1.0 | 2.0 | 2.0 |
| Formulation | Wt % Bromine | | 10.4 | 13.0 | 15.6 | 7.8 | 10.4 | 10.4 | 10.4 | 10.4 |
| | ~Siloxane D Length | | 45 | 45 | 45 | 45 | 45 | 45 | 45 | 45 |
| MVR-6 min | Cc/10 min. | | 11.1 | 9.7 | 7.5 | 13.6 | 15.8 | 13.7 | 11.4 | 11.4 |
| Tg | ° C. | | 160 | 162 | 168 | 156 | 160 | 160 | 160 | 160 |
| NI-125 RT | Ductility | | 100 | 0 | 0 | 100 | 0 | 0 | 60 | 40 |
| | J/m | | 579.0 | 154.0 | 136.0 | 646 | 105 | 122 | 371 | 304 |
| | ft-lbs/in | | 10.8 | 2.9 | 2.5 | 12.1 | 2.0 | 2.3 | 6.9 | 5.7 |
| MAI-RT | Ductility | | 100 | 100 | 100 | 100 | 100 | 100 | 100 | 100 |
| Energy to max load-Avg | | J | 71 | 74 | 76 | 75 | 73 | 77 | 75 | 75 |
| Energy to failure-Avg | | J | 75 | 77 | 81 | 82 | 77 | 82 | 83 | 81 |
| Energy, Total-Avg | | J | 75 | 77 | 81 | 82 | 77 | 82 | 83 | 81 |
| Density-Avg | | g/cc | 1.281 | 1.306 | 1.330 | 1.254 | 1.284 | 1.281 | 1.277 | 1.276 |
| Specific Gravity-Avg | | | 1.284 | 1.309 | 1.333 | 1.257 | 1.287 | 1.284 | 1.280 | 1.279 |
| HDT | 1.8 MPa | | 139 | 141 | 144 | 128 | 134 | 133 | 132 | 132 |
| 2 Min OSU | Average | | 32 | 23 | 19 | 46 | 39 | 41 | 45 | 35 |
| | Std. dev. | | 3.2 | 1.9 | 4.7 | 5.7 | 3.6 | 6.0 | 4.5 | 2.7 |
| Peak OSU | Average | | 50 | 42 | 41 | 55 | 49 | 48 | 55 | 46 |
| | Std. dev. | | 3.8 | 2.3 | 3.1 | 3.0 | 3.4 | 3.3 | 2.2 | 4.1 |
| DsMax | Ave | | 45 | 48 | 61 | 30 | 15 | 14 | 18 | 29 |
| | Std. dev. | | 13 | 9 | 35 | 8 | 6 | 7 | 10 | 12 |
| % T at 62 mil (1.58 mm) | | | | | | | | | | |
| YI | | | | | | | | | | |
| % Haze | | | | | | | | | | |
| YI at 125 mil (3.2 mm) | | | 39 | 43 | 47 | 12 | 6 | 9 | 15 | 14 |
| % T at 125 mil (3.2 mm) | | | 29.6 | 27.3 | 24.1 | 83.1 | 86.7 | 84.8 | 80.8 | 81.6 |
| % Haze at 125 mil (3.2 mm) | | | 99.2 | 99.2 | 99.9 | 3.3 | 1.6 | 2.2 | 4.9 | 3.9 |

| Components, Properties | | | EX 17 | EX 18 | EX 19 | EX 20 | EX 21 | EX 22 | CEX 9 |
|---|---|---|---|---|---|---|---|---|---|
| TBBPA-BPA | | | 40 | 50 | 60 | 70 | 50 | 40 | 40 |
| 20D45 SiPC 5 | | | | | | | | | |
| 6D45 SiPC 4 | | | 34 | 34 | 34 | 25 | | | |
| 6D30 SiPC 3 | | | | | | | 42 | 50 | |
| PC1 | | | 26 | 16 | 6 | | | | |
| PC 2 | | | | | | 5 | 8 | 10 | 60 |
| IRGAPHOS 168 | | | 0.06 | 0.06 | 0.060 | 0.060 | 0.06 | 0.06 | 0.06 |
| Total | Wt % Siloxane | | 2.0 | 2.0 | 2.0 | 1.5 | 2.5 | 3.0 | 0.0 |
| Formulation | Wt % Bromine | | 10.4 | 13.0 | 15.6 | 18.2 | 13.0 | 10.4 | 10.4 |
| | Siloxane D Length | | 45 | 45 | 45 | 45 | 30 | 30 | — |
| MVR-6 min | Cc/10 min. | | 10.5 | 9.0 | 7.0 | 6.0 | 7.3 | 7.7 | 15.4 |
| Tg | ° C. | | 159 | 163 | 167 | 171 | 164 | 161 | 158 |
| NI-125 RT | Ductility | | 0 | 0 | 0 | 0 | 0 | 100 | 0 |
| | J/m | | 160.0 | 129.0 | 102.0 | 83.8 | 139 | 513.0 | 83.2 |
| | ft-lbs/in | | 3.0 | 2.4 | 1.9 | 1.6 | 2.6 | 9.6 | 1.6 |
| MAI-RT | Ductility | | 100 | 100 | 100 | 100 | 100 | 100 | 100 |
| Energy to max load-Avg | | J | 73 | 73 | 71 | 73 | 58 | 72 | 69 |
| Energy to failure-Avg | | J | 79 | 79 | 76 | 79 | 63 | 77 | 73 |
| Energy, Total-Avg | | J | 79 | 79 | 76 | 79 | 63 | 77 | 73 |
| Density-Avg | | g/cc | 1.281 | 1.307 | 1.329 | 1.360 | 1.305 | 1.277 | 1.291 |
| Specific Gravity-Avg | | | 1.285 | 1.311 | 1.333 | 1.364 | 1.308 | 1.280 | 1.294 |
| HDT | 1.8 MPa | | 136 | 140 | 142 | 143 | 136 | 131 | 139 |
| 2 Min OSU | Average | | 27 | 23 | 20 | 34 | 32 | 40 | 28 |
| | Std. dev. | | 6.7 | 3.1 | 0.6 | 2.3 | 2 | 2 | 10.1 |
| Peak OSU | Average | | 47 | 45 | 42 | 38 | 33 | 42 | 54 |
| | Std. dev. | | 2.5 | 3.1 | 3.5 | 3.5 | 2 | 1 | 8.1 |
| DsMax | Ave | | 53 | 61 | 43 | 20 | 76 | 58 | 195 |
| | Std. dev. | | 22 | 10 | 12 | 4 | 55 | 15 | 78 |
| % T at 62 mil (1.58 mm) | | | | | | 75 | 79 | 87 | |
| YI | | | | | | 22.5 | 12.0 | 5.1 | |
| % Haze | | | | | | 14.6 | 12.1 | 6.6 | |
| YI at 125 mil (3.2 mm) | | | 16 | 23 | 28 | | | | 2 |
| % T at 125 mil (3.2 mm) | | | 79.9 | 72.9 | 63.9 | | | | 89.3 |
| % Haze at 125 mil (3.2 mm) | | | 4.4 | 10.7 | 23.6 | | | | 0.6 | smoke value of 30. EX 22 with 3.0 wt % siloxane and 10.4 wt % bromine that is formulated from a poly(siloxane-carbonate) having an average chain length of 30 polysiloxane units and about 6 wt % siloxane in the copolymer also shows excellent impact performance, transparency, haze and flame and smoke performance.

Transparent Compositions.

Formulations that pass the OSU and smoke testing and that have very high percent transmission values (greater than 85%), very low haze values (less than 2.5%) and low yellowness values (less than 6) are also possible to obtain using compositions of polysiloxane block copolycarbonates and brominated polycarbonate copolymers. Formulations with high transmission, low haze and low yellowness index values that pass OSU flame and smoke tests are particularly useful in window articles, gauge and dashboard covers and in window dust covers on marine vehicles. Formulations that meet the OSU flame and smoke and requirements and that have high percent transmissions, low haze and low yellowness index values can be obtained from a variety of polysiloxane block copolycarbonates with the brominated polycarbonate copolymer. Examples include EX 1, EX 2, EX 3 and EX 4 from Table 3 above prepared from a poly(siloxane-carbonate) having 10 polysiloxane repeating units and 1 wt % polysiloxane content in the copolymer; EX 5, EX 6, EX 7, and EX 8 from Table 4 above prepared from a poly(siloxane-carbonate) have 10 polysiloxane repeating units and 5 wt % polysiloxane content in the copolymer; EX 13 and EX 14 from Table 5 above prepared from a poly(siloxane-carbonate) have 45 polysiloxane repeating units and 6 wt % polysiloxane content in the copolymer and EX 22 from Table 5 above prepared from a poly(siloxane-carbonate) have 30 polysiloxane repeating units and 6 wt % polysiloxane content in the copolymer. The yellowness index generally increases as the wt % of brominated copolycarbonate in the compositions increases, the percent haze generally increases as the wt % polysiloxane in the composition increases and the chain length of the polysiloxane increases (30 and 45 polysiloxane chain lengths are worse than 10 polysiloxane chain lengths) and the % polysiloxane in the copolymer increases (20 wt % polysiloxane in the copolymer is much worse than 6 wt % polysiloxane) The results further suggest that the poly(siloxane-carbonate) providing the best transparency, haze and YI values and yellowness index values for use in window applications is the poly(siloxane-carbonate) having approximately 10 polysiloxane repeating units and 1 wt % polysiloxane content in the copolymer.

Low OSU Heat Release, Low Smoke, $TiO_2$-Containing Compositions.

Titanium dioxide is a common additive used to increase the whiteness of polymer compositions. Compositions having poly(siloxane-carbonate) and brominated copolycarbonate were prepared that also contained various amounts of titanium dioxide in order to determine its effect on density and stability of the thermoplastic compositions. The results are shown in Table 6.

The data in Table 6 illustrate that melt stability decreases as the $TiO_2$ content increases (EX 24-EX 29) compared to a control that has no $TiO_2$ present (EX 23) as measured by the change in the MVR values after 6 and 18 minute heating at 300° C. To achieve 20% or less melt change, then 4 PHR or less $TiO_2$ can be used in the thermoplastic compositions (EX 24-EX 26 vs. EX 27-EX 29).

The data in Table 7 shows the effect of $TiO_2$ on the smoke density performance of a composition with and without poly(siloxane-carbonate) present.

TABLE 7

| Component, Properties | | CEX 10 | EX 30 |
|---|---|---|---|
| TBBPA-BPA Copolymer | | 40.0 | 40.0 |
| SiPC 4 | | 0.00 | 50.0 |
| PC 1 | | 60.0 | 10.0 |
| $TiO_2$ | | 2.0 | 2.0 |
| IRGAPHOS 168 | | 0.060 | 0.060 |
| Formulated Blend Composition | Total wt % Siloxane | 0 | 3 |
| | Total wt % Bromine | 10.4 | 10.4 |
| MVR-6 min | | 17.7 | 9.5 |
| MVR-18 min | | 18.6 | 10.4 |
| MVR, % Change | | 5.1 | 9.6 |
| Tg | | 160 | 161 |
| NI-125 RT | Ductility | 0.0 | 100.0 |
| | J/m | 87.7 | 467.0 |
| | ft-lbs/in | 1.6 | 8.7 |
| MAI-RT | Ductility | 100 | 100 |
| Energy to max load-Average | J | 72 | 70 |
| Energy to failure-Average | J | 76 | 76 |
| Energy, Total-Average | J | 76 | 76 |
| Density-Avg | g/cc | 1.304 | 1.293 |
| Specific Gravity-Average | | 1.308 | 1.296 |
| FAA Smoke Density | Average | 231.0 | 72.0 |
| Ds at 4 min | Standard deviation | 78.2 | 43.6 |

The results in Table 7 show that the ability of poly(siloxane-carbonate)s in the compositions to reduce smoke is not diminished by the presence of $TiO_2$ in the compositions, even though it is known in the art that $TiO_2$ can improve polycarbonate flame performance. Even with 2 PHR $TiO_2$ present, without any poly(siloxane-carbonate), CEX 10 does not pass the DsMax smoke target of less than 200, having a value of 231. By contrast EX 30 (with poly(siloxane-carbonate) present) passes the DsMax test target value of less than 200 with a value of only 72.

Furthermore the impact performance of molded parts from compositions containing $TiO_2$ is improved by the presence of a poly(siloxane-carbonate) as illustrated by Ex 24-29 in Table 6 and EX 30 in Table 7 (which show 100% ductility perfor-

TABLE 6

| Blend Composition Components | | EX 23 | EX 24 | EX 25 | EX 26 | EX 27 | EX 28 | EX 29 |
|---|---|---|---|---|---|---|---|---|
| TBBPA-BPA | | 40.0 | 40.0 | 40.0 | 40.0 | 40.0 | 40.0 | 40.0 |
| SiPC 4 | | 50.00 | 50.00 | 50.00 | 50.00 | 50.00 | 50.0 | 50.00 |
| PC 1 | | 10.0 | 10.0 | 10.00 | 10.00 | 10.00 | 10.0 | 10.0 |
| $TiO_2$ | | 0.0 | 1.0 | 2.0 | 3.0 | 4.0 | 5.0 | 7.0 |
| IRGAPHOS 168 | | 0.06 | 0.06 | 0.06 | 0.06 | 0.06 | 0.06 | 0.06 |
| Total | Total wt % Siloxane | 3.00 | 3.00 | 3.0 | 3.00 | 3.00 | 3.00 | 3.00 |
| Formulation | Total wt % Bromine | 10.4 | 10.4 | 10.4 | 10.4 | 10.4 | 10.4 | 10.4 |
| MVR-6 min | | 8.2 | 8.7 | 8.86 | 8.69 | 8.44 | 8.52 | 8.46 |
| MVR-18 min | | 8.8 | 9.3 | 9.73 | 9.73 | 9.90 | 10.40 | 10.00 |
| % MVR Change 6 min to 18 min | | 7.0 | 12.9 | 18.1 | 18.1 | 20.1 | 26.2 | 21.4 |
| NI-125 RT | Ductility | 100 | 100 | 100 | 100 | 100 | 100 | 100 |
| | J/m | 577 | 608 | 592 | 544 | 515 | 520 | 487 |
| | ft-lbs/in | 10.8 | 11.4 | 11.1 | 10.2 | 9.6 | 9.7 | 9.1 |
| Density-Avg | g/cc | 1.278 | 1.282 | 1.287 | 1.305 | 1.316 | 1.319 | 1.340 |
| Specific Gravity-Avg | | 1.281 | 1.286 | 1.290 | 1.308 | 1.319 | 1.322 | 1.343 | mance at room temperature) while CEX 10 has 0% ductility performance at room temperature.

Density of Low OSU Heat Release, Low Smoke Thermoplastic Compositions.

The density results in Tables 3-5 illustrate the factors that most strongly affect the density of the compositions that do not contain titanium dioxide. The strongest influence on density is the wt % of bromine in the thermoplastic compositions. For example in CEX 2, 3, 4, 5, and 6 in Table 3 the wt % bromine increases from 0 to 13 wt % and the density increases from 1.198 to 1.315 g/cc. A similar trend is shown in Table 4 where the wt % bromine increases from 0 to 26 wt % and the density increases from 1.183 to 1.450 g/cc. The results in Table 5 above also illustrate that increasing the amount of siloxane in the compositions does slightly decrease the density in the compositions. For example, the wt % bromine is the same in CEX 10 and EX 13-EX 15 at 10.4 wt %, but the wt % siloxane increases from 0 to 2.0 wt % and the density decreases from 1.291 to 1.277 g/cc. The chain length of siloxane or the wt % siloxane in the poly(siloxane-carbonate) does not show a large influence in the density based on the results in Table 5. In order to obtain a density below the targeted maximum density of 1.320 g/cc for certain marine applications, it appears that less than 15 wt % bromine can be used.

The presence of titanium dioxide further increases the density of the compositions as illustrated in Table 6. In Table 6, compositions are shown having 3.0 wt % siloxane and 10.4 wt % bromine contents and increasing amounts of titanium dioxide. In EX 23-29 the wt % titanium dioxide increases from 0 wt % to 7 wt % and the density increases from 1.278 to 1.340 g/cc. Therefore in order to achieve a maximum density of less than 1.320, less than 5 wt % titanium dioxide can be used in the compositions shown in Table 6.

Combining the results from the various Tables shows achieving the targeted density maximum of 1.320 g/cc for certain marine applications can be accomplished by balancing the amount of titanium dioxide with the amount of brominated copolycarbonate. Bromine contents of less than 13 wt % and titanium contents of less than 5 wt % can be used to meet the marine density targets for white product compositions (EX 24-EX 27 vs. EX 28-EX 29).

Alternative Bromine Sources.

Property comparisons were made between thermoplastic compositions having similar wt % polysiloxane and similar wt % bromine in the compositions using three different bromine-containing additives, in particular a brominated epoxy oligomer (F3100 from ICL Industrial Products, EX 30), a brominated polycarbonate oligomer (BC52, EX 31) and a brominated copolycarbonate (TBBPA-BPA copolymer, EX 32). The results are shown in Table 8.

TABLE 8

| Components | | | EX 31 | EX 32 | EX 33 |
|---|---|---|---|---|---|
| SiPC 4 | | | 50.0 | 50.0 | 50.0 |
| PC 2 | | | 30.70 | 30.00 | 20.00 |
| F-3100 | | | 19.300 | — | — |
| BC52 | | | — | 20.0 | — |
| TBBPA-BPA Copolymer | | | — | — | 40.000 |
| Phosphite | | | 0.060 | 0.060 | 0.060 |
| Mw of Br compound | | | 15,000 | 2,665 | 22,500 |
| | Softening Temp C. | | 200 | 171 | 182 |
| Total Formulation | % Siloxane | | 3 | 3 | 2.7 |
| | % Bromine | | 10.4 | 10.4 | 9.5 |
| | D length | | 45.0 | 45.0 | 45.0 |
| Properties | | | | | |
| MVR-6 | | | 15.7 | 11.8 | 8.3 |
| % Change | | | 17.5 | 4.9 | 11.9 |
| Tg | | | 146.5 | 151.4 | 159.8 |
| NI-125 RT | Ductility | | 100.00 | 0.0 | 100.0 |
| | J/m | | 773.0 | 123.0 | 744.0 |
| | ft-lbs/in | | 14.5 | 2.3 | 13.9 |
| MAI-RT | Ductility | | 100.0 | 100.0 | 100.0 |
| | Energy to max load-Avg | J | 68.1 | 75.1 | 78.4 |
| | Energy to failure-Avg | J | 72.6 | 79.8 | 85.0 |
| | Energy, Total-Avg | J | 72.6 | 79.8 | 85.1 |
| Density-Avg | g/cc | | 1.282 | 1.273 | 1.268 |
| Specific Gravity-Avg | | | 1.285 | 1.276 | 1.271 |
| HDT-ASTM-G | 1.8 MPa | | 123.8 | 127.7 | 135.2 |
| HDT-ASTM-G | 0.455 MPa | | | | |
| OSU 2 min. | TTF | | 42.4 | 30.1 | 36.4 |
| | | | 45.8 | 24.0 | 26.2 |
| | | | 33.8 | 21.8 | 18.2 |
| | Average | | 40.7 | 25.3 | 26.9 |
| | Standard deviation | | 6.2 | 4.3 | 9.1 |
| OSU Peak | | | 50.5 | 50.5 | 60.3 |
| | | | 50.8 | 43.1 | 49.5 |
| | | | 59.5 | 60.2 | 54.6 |
| | Average | | 53.6 | 51.3 | 54.8 |
| | Standard deviation | | 5.1 | 8.6 | 5.4 |
| FAA Smoke Density | | | | | |
| Ds at 4 min | | | 96.6 | 23.81 | 20.5 |
| | | | 66.3 | 35.3 | 18.2 |
| | | | 88.6 | 16.6 | 42.7 |
| | Average | | 83.8 | 26.0 | 27.1 |
| | Standard deviation | | 15.7 | 13.2 | 13.5 |

TABLE 8-continued

| Components | | EX 31 | EX 32 | EX 33 |
|---|---|---|---|---|
| DsMax | | | | |
| | | 96.8 | 23.81 | 20.5 |
| | | 66.3 | 35.3 | 18.2 |
| | | 88.6 | 16.6 | 42.7 |
| | Ave | 83.9 | 26.0 | 27.1 |
| | Standard deviation | 15.7 | 13.2 | 13.5 |
| Optical Properties | | | | |
| % T at 125 mil (3.2 mm) | | 22.0 | 78.7 | 77.3 |
| YI | | 62.7 | 19.1 | 19.8 |
| % Haze | | 102.6 | 7.3 | 6.5 |

The results in Table 8 show that the targeted flame and smoke properties (2-min total heat release and peak heat values of less than 65 and a smoke DsMax value of less than 200) were achieved in thermoplastic compositions containing siloxane using the different sources of bromine as flame retardants. The high impact values in EX 31 (100% ductility in the notched Izod test) as compared to EX 32, illustrates the importance of selecting a bromine composition with an $M_W$ of at least approximately 15,000 when formulations of high toughness are needed. High transparency (greater than 75%) and low haze (less than 10%) were also found with EX 32. In addition, all three of the compositions showed density values below the 1.320 g/cc upper limit.

Other Additives

The effect of additives often used as flame retardants in polycarbonate, on the smoke density properties of compositions made from combinations of the poly(siloxane-carbonate) and brominated copolycarbonate, were also investigated and the results are shown in Table 9.

When used at levels commonly employed to improve flame performance, improve the color stability, or reduce haze in polycarbonates, the additives showed no effect on the flame retardant performance of the thermoplastic compositions. EX 34 (with TiO$_2$) possessed a similar DsMax value to EX 35-39 (with the flame retardant, color stabilization, or haze reducing additives) (EX 34 had a DsMax of 21, whereas the highest DsMax values measured for the compositions of Table 9 was 29).

Other Silicone-Containing Additives.

The impact of replacing the polysiloxane block copolycarbonate with other silicone-containing additives was also investigated and the results shown in Table 10.

TABLE 10

| Components | | CEX 11 | CEX 12 | CEX 13 | CEX 14 |
|---|---|---|---|---|---|
| TBBPA-BPA | | 30.00 | 30.00 | 30.00 | 30.00 |
| PC 2 | | 70.00 | 69.50 | 69.50 | 69.50 |
| DF1040 | | | 0.50 | | |
| OPTS | | | | 0.50 | |
| D4 | | | | | 0.500 |
| Phosphite | | 0.060 | 0.060 | 0.060 | 0.060 |
| Total Formulation | Wt % Siloxane | 0 | 0.5 | 0.5 | 0.5 |
| | Wt % Bromine | 7.8 | 7.8 | 7.8 | 7.8 |
| Properties | | | | | |
| MVR-6 | | 5.5 | 5.9 | 5.5 | 5.6 |
| NI-125 RT | Ductility | 0.0 | 0.0 | 0.0 | 0.0 |
| | J/m | 139 | 148 | 132 | 135 |
| | ft-lbs/in | 2.6 | 2.8 | 2.5 | 2.5 |
| Density-Avg | g/cc | 1.262 | 1.263 | 1.264 | 1.264 |
| Specific Gravity-Avg | | 1.265 | 1.267 | 1.267 | 1.267 |
| HDT-ASTM-G | 1.8 MPa | 136 | 135 | 136 | 135 |
| OSU Test FAR 25.853 (d) Appendix F, Part IV | | | | | |
| 2 Min OSU | Average | 17 | 59 | 19 | 28 |
| | Standard deviation | 9.7 | 2.6 | 20.2 | 15.9 |
| Peak OSU | Average | 60 | 75 | 65 | 65 |

TABLE 9

| Name | | EX 34 | EX 35 | EX 36 | EX 37 | EX 38 | EX 39 |
|---|---|---|---|---|---|---|---|
| TBBPA-BPA | | 40.0 | 40.0 | 40.0 | 40.0 | 40.0 | 40.0 |
| SiPC 4 | | 50.00 | 50.00 | 50.00 | 50.00 | 50.00 | 50.00 |
| PC 1 | | 10.0 | 10.0 | 10.0 | 10.0 | 10.0 | 10.0 |
| KSS | | — | 0.30 | — | — | — | — |
| KSS | | — | 0.30 | — | — | — | — |
| Rimar salt | | — | — | 0.08 | 0.08 | — | — |
| Octaphenylcyclotetrasiloxane | | — | — | — | 0.10 | — | — |
| STB | | — | — | — | — | 0.75 | — |
| Phosphorus acid solution (0.15%) | | — | — | — | — | — | 0.10 |
| TiO$_2$ | | 2.00 | 2.00 | 2.00 | 2.00 | 2.00 | 2.00 |
| Phosphite | | 0.06 | 0.06 | 0.06 | 0.06 | 0.06 | 0.06 |
| Total Formulation | Wt % Siloxane | 3.0 | 3.0 | 3.0 | 3.0 | 3.0 | 3.0 |
| | Wt % Bromine | 10.4 | 10.4 | 10.4 | 10.4 | 10.4 | 10.4 |
| Properties | | | | | | | |
| MVR-6 | Cc/10 min | 9.6 | 10.0 | 12.4 | 13.6 | 10.4 | 9.9 |
| Tg | ° C. | 159 | 157 | 160 | 159 | 160 | 160 |
| NI-125 RT | Ductility | 100 | 100 | 100 | 100 | 0 | 100 |
| | J/m | 588.0 | 544.0 | 534.0 | 596.0 | 143.0 | 498.0 |
| | ft-lbs/in | 11.0 | 10.2 | 10.0. | 11.2 | 2.7 | 9.3 |
| Density-Avg | g/cc | 1.287 | 1.291 | 1.291 | 1.288 | 1.293 | 1.291 |
| Specific Gravity-Avg | | 1.290 | 1.294 | 1.294 | 1.291 | 1.296 | 1.294 |
| HDT-ASTM-G | 1.8 MPa | 134 | 134 | 134 | 134 | 134 | 135 |

TABLE 10-continued

| Components | | CEX 11 | CEX 12 | CEX 13 | CEX 14 |
|---|---|---|---|---|---|
| | Standard deviation | 4.5 | 4.0 | 3.8 | 8.7 |
| NBS Smoke Density (ASTM F814/E662, Flaming Mode) | | | | | |
| DS Max | Ave | 529 | 306 | 521 | 406 |
| | Standard deviation | 84 | 197 | 219 | 199 |

The results in Table 10 show that none of the siloxane sources performed as well as the poly(siloxane-carbonate) of the invention. The results for EX 3 and EX 4 from Table 3 (with 0.4 wt % polysiloxane content and either 7.8 or 10 wt % bromine) show that both pass the OSU heat release and smoke tests, with values less than 65 for the OSU tests and less than 200 for the smoke tests. In contrast CEX 12, 13, and 14 have slightly higher amounts of siloxane (0.5 wt %) and the same amount of bromine (7.8 wt %) and fail the smoke tests with DsMax values of 300 or greater. These other sources of silicone are therefore much less effective at suppressing smoke in the smoke tests than poly(siloxane-carbonate) described herein. While not wishing to be bound by any specific theory, it is believed that providing the siloxane in a less volatile, less mobile (higher Tg), high molecular weight polymer could help to maintain the siloxane in the composition longer and keep the siloxane better dispersed during burning.

Color Stability and Weathering Performance.

Materials used in the transportation industry, especially those that pass the OSU and DsMax smoke requirements, often have poor stability when exposed to outdoors light. Thus manufactures must either paint the finished part or risk the yellowing or other discoloration of the parts. In order to demonstrate the improved color stability performance of the poly(siloxane-carbonate) and brominated thermoplastic compositions over those found in art, the compositions were formulated with and without UV stabilization additives in a bright white color package. These compositions and results are shown in Table 11.

TABLE 11

| Component | | EX 40 | EX 41 | EX 42 | EX 43 |
|---|---|---|---|---|---|
| TBBPA-BPA | | 40.0 | 40.0 | 40.0 | 40.0 |
| SiPC 4 | | 50.00 | 50.00 | 50.00 | 50.00 |
| PC 1 | | 10.0 | 10.0 | 10.0 | 10.0 |
| Tinuvin 1577 | | 0 | 0.3 | — | — |
| UVA 234 | | — | — | 0.300 | — |
| Cyasorb 3638 | | — | — | — | 0.3 |
| TiO₂ | | 2.0 | 2.0 | 2.0 | 2.0 |
| IRGAPHOS 168 | | 0.060 | 0.060 | 0.060 | 0.060 |
| Total Formulation | Total wt % Siloxane | 3.00 | 3.00 | 3.00 | 3.00 |
| | Total wt % Bromine | 10.4 | 10.4 | 10.4 | 10.4 |
| Properties | | | | | |
| MVR-6 minutes | | 8.9 | 8.7 | 9.4 | 9.0 |
| MVR-18 minutes | | 8.9 | 11.2 | 10.6 | 9.0 |
| NI-125 RT | Ductility | 100 | 100 | 100 | 100 |
| | J/m | 566 | 542 | 539 | 525 |
| | ft-lbs/in | 10.6 | 10.1 | 10.1 | 9.8 |
| OSU 2 min. | TTF | 26.0 | 21.3 | 23.0 | 18.3 |
| | 60 mil | 19.0 | 17.6 | 25.1 | 21.6 |
| | | 21.0 | 23.8 | 25.7 | 23.4 |
| | Average | 22.0 | 20.9 | 24.6 | 21.1 |
| | Standard Deviation | 3.6 | 3.1 | 1.4 | 2.6 |
| OSU | TTF | 44.0 | 44.7 | 45.1 | 38.4 |
| | 60 mil | 43.2 | 41.8 | 47.3 | 49.4 |

TABLE 11-continued

| Component | | EX 40 | EX 41 | EX 42 | EX 43 |
|---|---|---|---|---|---|
| | | 44.5 | 43.0 | 44.3 | 48.3 |
| | Average | 43.9 | 43.2 | 45.6 | 45.3 |
| | Standard Deviation | 0.7 | 1.5 | 1.5 | 6.0 |
| FAA Smoke De Ds at 4 minutes | TTF | 11.5 | 16.4 | 21.1 | 25.00 |
| | 60 mil | 10.7 | 16.8 | 22.0 | 22.5 |
| | | 11.5 | 27.3 | 23.5 | 20.8 |
| | Ave | 11.2 | 20.2 | 22.2 | 22.8 |
| | Standard Deviation | 0.4 | 6.2 | 1.2 | 2.1 |
| DsMax | TTF | 11.5 | 16.4 | 21.3 | 25.0 |
| | 60 mil | 10.7 | 16.8 | 22.0 | 22.5 |
| | | 11.5 | 27.3 | 23.5 | 20.8 |
| | Ave | 11.2 | 20.2 | 22.3 | 22.8 |
| | Standard Deviation | 0.4 | 6.2 | 1.1 | 2.1 |

All of the compositions were 100% ductile in notched Izod testing, have a density requirement of less than 1.320 g/cc (data not shown), and all showed passing values in the OSU heat release and smoke testing, with OSU values below 65 and smoke DsMax values below 200.

Bright white sample plaques were placed on a 45 degree angle south facing rack exposed to an unobstructed sunlight light exposure for 466 hours and then tested for a color shift by measuring the reflected light of the light-exposed plaques using a spectrophotometer. The color stability/weathering results are shown in Table 12.

TABLE 12

| Outdoor Exposure, Hrs | Comparative(a) No UVA DE | EX 40 No UVA DE | EX 41 Tinuvin 1577 DE | EX 42 UVA234 DE | EX 43 Cyasorb 3638 DE |
|---|---|---|---|---|---|
| 0 | — | — | — | — | — |
| 110 | 5.9 | 0.3 | 0.3 | 0.5 | 0.5 |
| 466 | 7.9 | 0.7 | 0.6 | 0.4 | 0.3 |

(a)White LEXAN* FST9705 plaque.
*Trademark of SABIC Innovative Plastics IP BV

All four of the samples (EX 40-43) of the present invention have better color stability than the existing commercial OSU comparative resin. All three of the samples containing UV stabilizing additives showed even lower tendency to yellow as determined by lower DE values than the sample or the sample with no UV stabilizers, even after 466 hours. The benefits in color stability of the compositions of the present invention compared to a composition that has comparable OSU smoke and flame performance but employs polyarylate poly(siloxane-carbonate)s in the composition (LEXAN* FST 9705 polymer) is also illustrated by comparing the DE values of EX 40 with FST 9705 after 466 hours of weathering (neither sample contained UV stabilization additive). The FST 9705 showed much higher DE values than CEX 15 (DE 7.9 vs. 0.7).

Materials used in the following examples of the poly(siloxane-etherimide) compositions are listed Table 13. Amounts in these Examples are in parts by weight per hundred parts by weight of the total amount of polymer otherwise noted.

TABLE 13

| Component | Description | Source |
|---|---|---|
| PC | LEXAN 100 grade | Sabic Innovative Plastics |

TABLE 13-continued

| Component | Description | Source |
|---|---|---|
| PEI-Siloxane | A random poly(etherimide-dimethylsiloxane) copolymer comprising structural units derived from m-phenylene diamine, BPADA, and an aminopropyl terminated polydimethylsiloxane containing on average 10 silicon atoms, with 37 ± 2 wt. % siloxane content; Mw about 38,500 amu determined by GPC relative to PC standards (SILTEM ® D9000) | Sabic Innovative Plastics |
| TBBPA-BPA | BPA and tetrabromo-BPA (50/50 wt %) was used, Mw = 23,100 | |

The examples were prepared on 30 mm Werner Pfleiderer twin extruders as follows. All components were dry blended for about 4 minutes using a paint shaker or a drum tumbler. The twin screw extruder contained a vacuum port located near die face. The compositions were compounded with an applied vacuum of 20+ inches of Hg, and chopped into pellets after cooling in a water bath.

The compositions are molded after drying at 121° C. for 4 hrs on a 260-ton (236 metric ton) Van Dorn or an 85 Ton Van Dorn molding machine operating at 300 to 320° C. with a mold temperature of 80° C. It will be recognized by one skilled in the art that the method is not limited to these temperatures or processing equipment.

All the performance tests were conducted as described above.

Comparative Examples 44 and 45

Comparative examples 1 and 2 show that synergy between siloxane containing-resins and bromine-containing resins to achieve low heat release and low smoke density is not known in the art. In accordance with U.S. Pat. No. 7,790,292, (from EX2-15), a siloxane-containing poly(ester-carbonate) copolymer was compared to a commercial composition containing the siloxane-containing poly(ester-carbonate) copolymer and 12 wt % of a bromine-containing polycarbonate copolymer. Results are shown in Table 14.

TABLE 14

| Component | CEX44 | CEX45 |
|---|---|---|
| Poly(ester-carbonate) copolymer | 100 | 88 |
| TBBPA-BPA Copolymer | 0 | 12.0 |
| Total Formulation Total wt % Siloxane | 1 | 0.88 |
| Total wt % Bromine | 0 | 3.1 |
| NBS Smoke Density ASTM F814/E662 | | |
| Ds at 1.5 min | 1 | n/a |
| Ds at 4.0 min | 23 | 25 |
| DsMax | 23 | 25 |
| DsMax time | 3.98 | 4 |

The data shows that the addition of the bromine copolymer to the siloxane containing poly(ester-carbonate) does not yield improved smoke performance, as in general, the results are no better or worse than the siloxane-containing poly(ester-carbonate) without the brominated polymer.

Further according to U.S. Pat. No. 7,790,292, high arylate ester levels and low polycarbonate levels are needed to pass the OSU test. In contrast, the data below shows that when using the composition of this invention, no arylates are needed to obtain good OSU heat release values.

Examples 46-49

These Examples show the synergistic effect of siloxane from a poly(etherimide-siloxane) and a brominated polymer on heat release and smoke density in thermoplastic compositions. Results are shown in Table 15.

TABLE 15

| Components | | EX 46 | EX 47 | EX 48 | CEX 49 |
|---|---|---|---|---|---|
| TBBPA-BPA | | 40.00 | 40.00 | 40.00 | 40.00 |
| SILTEM | | 7.00 | 5.00 | 2.50 | 0.00 |
| PC | | 53.0 | 55.0 | 57.5 | 60.0 |
| Additive | | 0.06 | 0.06 | 0.06 | 0.0 |
| Total Formulation | Wt % Siloxane | 2.6 | 1.9 | 0.9 | 0.0 |
| | Wt % Bromine | 10.4 | 10.4 | 10.4 | 10.4 |
| Properties | | | | | |
| MVR 6 minutes | | 5.5 | 5.6 | 5.7 | 6.8 |
| NI-125, RT | Ductility | 0.0 | 0.0 | 0.0 | 0.0 |
| | J/m | 130 | 119 | 117 | 90.8 |
| | ft-lbs/in | 2.4 | 2.2 | 2.2 | 1.7 |
| MAI, RT | Ductility | 100 | 100 | 100 | 100 |
| Energy to max | J | 75.0 | 75.8 | 78.2 | 78.1 |
| Energy to failure | J | 81.6 | 81.8 | 83.6 | 84.3 |
| Energy, Total-A | J | 81.7 | 81.9 | 83.7 | 84.3 |
| Density, average | | 1.285 | 1.286 | 1.287 | 1.289 |
| HDT-ASTM-G | 1.8 MPa | 138.4 | 139.7 | 139.7 | 141.5 |
| OSU Test FAR 25.853 (d) Appendix F, Part IV | | | | | |
| 2 Min OSU | Average | 17 | 21 | 25 | 30 |
| | Standard deviation | 9.74 | 6 | 7 | 3 |
| Peak OSU | Average, TTF | 46 | 41 | 45 | 66 |
| | Standard deviation | 11 | 6 | 3 | 8 |
| NBS Smoke Density (ASTM F814/E662, Flaming Mode) | | | | | |
| DsMax | Average, TTF | 10 | 13 | 22 | 457 |
| | Standard deviation | 1 | 6 | 8 | 243 |
| Optical properties | | | | | |
| YI | | 9.8 | 8.2 | 5.6 | 7.1 |
| % T at 125 mil | | 67.6 | 70.6 | 79.7 | 86.5 |
| % Haze | | 48.5 | 34.0 | 10.9 | 0.7 |

A series of blends using a poly(etherimide-siloxane) block copolymer, a brominated polymer, and polycarbonate (EX 46-EX 48) were made and compared to the control with no siloxane (CEX 49). Without the poly(etherimide-siloxane) block copolymer, the smoke levels are above the FAA's acceptable limit of 200 for DsMax and have a high standard deviation in the E662 test (Table 14). The peak heat release rate in the OSU test is also above the FAA's acceptable limit of 65. With the addition of the poly(etherimide-siloxane), the smoke levels drop dramatically and are consistently below 25 with a low standard deviation (Table 14). Again with the addition of the poly(etherimide-siloxane), the peak OSU values drop and are consistently 20 points below the FAA standard of 65.

In addition, the compositions have improved toughness over the control (CEX 49). The control has an impact values of less than 2 ft-lbs/in; whereas EX 46-EX 48 have impacts over 2 ft-lbs/in. All compositions are 100% ductile in MAI testing at room temperature.
1. At 60 mil.
2. Substantially opaque.

Examples 50-54

The target transparency or haze of the thermoplastic compositions can be achieved by adjusting the total amount of bromine and siloxane units in the thermoplastic compositions. Combinations of different poly(carbonate-siloxane)

copolymers can be used. The siloxane-containing copolymers can have first repeating units that are a carbonate unit, an ester unit, an arylene ether unit, an arylene sulfone unit, an arylene ether sulfone unit, an arylene ether ketone unit, or a combination comprising at least one of the foregoing units. A poly(carbonate-siloxane) copolymer can be specifically mentioned. The brominated polymer can be, for example, TBBPA-BPA, BC-52, or a brominated epoxy. Prospective ranges and specific prospective examples are shown in Table 16. Where the total amount of polymers shown is less than 100 wt %, an optional third polymer is present, such that the weight of the polymers totals 100 wt %.

nation comprising at least one of the foregoing units, specifically a poly(carbonate-siloxane) block copolymer, more specifically a derived from bisphenol A and poly(siloxane) block units derived from a polysiloxane bisphenol of formula (15), (16), or a combination thereof and a brominated polymer (TBBPA-BPA, BC-52, or a brominated epoxy) are made. Clarity measured as transmission and haze are measured in accordance with CIE 1931. By controlling the siloxane block size, the amount of siloxane in each copolymer, and the total amount of siloxane in the final formulation, combined optionally with the addition of a plurality of diffuser particles,

TABLE 16

| Components | | EX 50-Light Diffusing | | | EX 51-Light Diffusing | | | EX 52-Med. Clarity | | |
|---|---|---|---|---|---|---|---|---|---|---|
| | | Range-1 | Range-2 | EX 50A | Range-1 | Range-2 | EX 51A | Range-1 | Range-2 | EX 52A |
| Brominated polymer, wt %** | | 35-50 | 45-50 | 49.5 | 35-50 | 45-50 | 49.5 | 35-50 | 45-50 | 49.5 |
| Siloxane copolymer-1 (D10) | Wt %** | 0-65 | 20-65 | 50 | 0-55 | 0-40 | 50 | 0-65 | 20-65 | 50 |
| | Block Length | 5-20 | 5-15 | 10 | 0-20 | 5-15 | 10 | 5-20 | 5-15 | 10 |
| | % Siloxane* | 0.5-2.0 | 0.3-1.5 | 1.0 | 0.5-2.0 | 0.3-1.5 | 1.0 | 0.5-2.0 | 0.3-1.5 | 1.0 |
| | % Siloxane** | 0-1.5 | 0.1-1.0 | 0.5 | 0-1.5 | 0.1-1.0 | 0.5 | 0-1.5 | 0.1-1.0 | 0.5 |
| Siloxane copolymer-2 (D45) | Wt % copolymer | 0-65 | 0-20 | 0.5 | 10-65 | 0-20 | 0.5 | 0-65 | 1-25 | 0.5 |
| | Block Length | 20-65 | 35-55 | 45 | 35-55 | 35-55 | 45 | 20-65 | 35-55 | 45 |
| | % Siloxane* | 0.5-10 | 4.0-8.0 | 6.0 | 0.5-10 | 4.0-8.0 | 6 | 0.5-10 | 4.0-8.0 | 6 |
| | % Siloxane** | 0-6.5 | 0-3.5 | 0.5 | 0-6.5 | 0-3.5 | 0.5 | 0-1.5 | 0.1-1.0 | 0.5 |
| Siloxane copolymer-3 (D30) | Wt % | | | | | | | | | |
| | Block Length | | | | | | | | | |
| | % Siloxane* | | | | | | | | | |
| | % Siloxane** | | | | | | | | | |
| Light Diffuser Additive | | 0.2-10 | 0.2-3.0 | 0.2-3.0 | 02-10 | 0.2-3.0 | 0.2-3.0 | | | |
| Total Formulation | Wt % Bromine** | | 9-13 | | | 9-13 | | | 9-13 | |
| | Wt % Siloxane** | 0.2-6.5 | 0.2-3.0 | 0.5 | 0.2-6.5 | 0.2-3.0 | 0.5 | 0.2-6.5 | 0.2-3.0 | 0.5 |
| Properties | | | | | | | | | | |
| 2 Min OSU [FAR 25.853 (d)] | | | ≤65 kW/m$^2$ | | | ≤65 kW/m$^2$ | | | ≤65 kW/m$^2$ | |
| MAHRE [FAR 25.853 (d)] | | | ≤65 kW/m$^2$ | | | ≤65 kW/m$^2$ | | | ≤65 kW/m$^2$ | |
| Dmax [ASTM E662] | | | ≤200 | | | ≤200 | | | ≤200 | |
| % T at 3.2 mm [CIE1931] | | | 20-90 | | | 20-90 | | | 70-87 | |
| % Haze 3.2 mm [CIE1931] | | | 70-99 | | | 70-99 | | | 2.0-10 | |

| Components | | EX 53-Med. Clarity | | | EX 54-High Clarity | | | EX 55-Transparent | | |
|---|---|---|---|---|---|---|---|---|---|---|
| | | Range-1 | Range-2 | EX 53A | Range-1 | Range-2 | EX 54A | Range-1 | Range-2 | EX 55A |
| Brominated polymer, wt %** | | 35-50 | 45-50 | 49 | 35-50 | 45-50 | 50 | 35-50 | 45-50 | 49.5 |
| Siloxane copolymer-1 (D10) | Wt %** | 0-60 | 20-65 | 50 | 0-65 | 1-50 | 50 | | | |
| | Block Length | 5-20 | 5-15 | 10 | 5-20 | 5-15 | 10 | | | |
| | % Siloxane* | 0.5-2.0 | 0.3-1.5 | 1.0 | 0.5-2.0 | 0.3-1.5 | 1.0 | | | |
| | % Siloxane** | 0-1.5 | 0.1-1.0 | 0.5 | 0.2-1.5 | 0.1-1.0 | 0.5 | | | |
| Siloxane copolymer-2 (D45) | Wt % copolymer | 5-65 | 1-25 | 0.5 | | | | | | |
| | Block Length | 20-65 | 35-55 | 45 | | | | | | |
| | % Siloxane* | 0.5-10 | 4.0-8.0 | 6 | | | | | | |
| | % Siloxane** | 0-1.5 | 0.1-1.0 | 0.5 | | | | | | |
| Siloxane copolymer-3 (D30) | Wt % | | | | 0-65 | 0-20 | 0 | | | |
| | Block Length | | | | 15-65 | 20-50 | 30 | | | |
| | % Siloxane* | | | | 0.5-10 | 4.0-8.0 | 6 | | | |
| | % Siloxane** | | | | 0-1.5 | 0-1.0 | 0 | | | |
| Light Diffuser Additive | | | | | | | | | | |
| Total Formulation | Wt % Bromine** | | 9-13 | | | 9-13 | | | 9-13 | |
| | Wt % Siloxane** | 0.2-6.5 | 0.2-3.0 | 0.5 | 0.2-1.5 | 0.2-1.0 | 0.5 | 0.2-1.5 | 0.2-1.0 | 0.5 |
| Properties | | | | | | | | | | |
| 2 Min OSU [FAR 25.853 (d)] | | | ≤65 kW/m$^2$ | | | ≤65 kW/m$^2$ | | | ≤65 kW/m$^2$ | |
| MAHRE [FAR 25.853 (d)] | | | ≤65 kW/m$^2$ | | | ≤65 kW/m$^2$ | | | ≤65 kW/m$^2$ | |
| Dmax [ASTM E662] | | | ≤200 | | | ≤200 | | | ≤200 | |
| % T at 3.2 mm [CIE1931] | | | 70-87 | | | ≥87 | | | ≥87 | |
| % Haze 3.2 mm [CIE1931] | | | 2.0-10 | | | <2.0 | | | <2.0 | |

*Based on the weight of the siloxane-containing copolymer
**Based on the total weight of the polymers in the composition A series of blends using a siloxane-containing copolymer having first repeating units that are a carbonate unit, an ester unit, an arylene ether unit, an arylene sulfone unit, an arylene ether sulfone unit, an arylene ether ketone unit, or a combisample formed of the compositions have the indicated properties, including low smoke density and maximum heat release rate are kept within limits required by FAR 25.853 (d)].

As stated above, the transparent compositions, for example the transparent compositions of EX 55 can be obtained using a wide variety of different siloxane-containing copolymers and combinations thereof, provided that a molded plaque of the siloxane-containing copolymer(s) have a % haze value of 3% or less measured using the color space CIE 1931 (Illuminant C and a 2° observer) at a thickness of 3.2 mm. Examples of bromine-containing polymers and siloxane-containing copolymers that can be used to manufacture the transparent compositions are set forth in Table 17.

TABLE 17

| Acronym | Description | Mw | PDI | Endcap | Wt % Siloxane | Avg. Siloxane Length | % Haze (125 mil) |
|---|---|---|---|---|---|---|---|
| TBBPA-BPA | TetrabromoBPA/BPA Copolymer | 23,660 | 2.6 | PCP | — | — | <2 |
| BC52 | Tetrabromo BPA Oligomer | 2,638 | 1.7 | Phenol | — | — | — |
| SiPC A | D10 siloxane block co-polycarbonate | 30,000 | — | PCP | 1 | 10 | <2 |
| SiPC A1 | D10 siloxane block co-polycarbonate | 22,200 | — | PCP | 1 | 10 | <2 |
| SiPC B | D10 siloxane block co-polycarbonate | 23,600 | 3.0 | PCP | 5 | 10 | 5[(1)] |
| SiPC C | D30 siloxane block co-polycarbonate | 23,472 | 2.2 | PCP | 6 | 30 | <2.5 |
| SiPC D | D45 siloxane block co-polycarbonate | 23,013 | 2.2 | PCP | 6 | 45 | <2.5 |
| SiPC E | D45 siloxane block co-polycarbonate | 29,852 | 2.6 | PCP | 20 | 45 | Opaque[(2)] |

[(1)]At 60 mil (1.5 mm).
[(2)]Substantially opaque.

Examples 56-59

These Examples show the effect of various poly(carbonate-siloxane) copolymers and a brominated polymer or oligomer on impact strength and colorability for high impact and medium impact thermoplastic compositions. Results are shown in Table 17.

TABLE 18

| Components | | EX 56 - High Impact | | | Ex 57- High Impact, Colorability | | |
|---|---|---|---|---|---|---|---|
| | | Range-1 | Range-2 | EX 56A | Range-1 | Range-2 | EX 57A |
| Brominated polymer, wt % ** | | 35-50 | 45-50 | 50 | 35-50 | 45-50 | 50 |
| Siloxane copolymer 4 (D45) | Wt % ** | 0.0-50 | 0.0-37 | 30 | 5.0-55 | | 40 |
| | Block Length | 25-50 | 40-50 | 45 | 25-50 | | 45 |
| | % Siloxane * | 4.0-10 | 4.0-10 | 6.0 | 4.0-10 | | 6.0 |
| | % Siloxane *** | 0.0-3.0 | 0.0-3.0 | 1.5 | 0.2-3.0 | | 2.4 |
| Siloxane copolymer 5 (D45) | Wt % | 13-25 | 13-40 | 20 | 5.0-12 | | 10 |
| | Block Length | 40-65 | 40-50 | 45 | 40-65 | | 45 |
| | % Siloxane * | 15-25 | 15-25 | 20 | 15-25 | | 20 |
| | % Siloxane ** | 2.55-6.0 | 2.5-6.0 | 4.0 | 1.0-2.5 | | 2.0 |
| Colorant wt % | | | | | 00002-5.0 | 0.00006.-0.002 | |
| Total | Wt % Bromine | | 9-13 | | | 9-13 | |
| Formulation | Wt % Siloxane | 2.55-6.0 | 4.0-6.0 | 5.5 | 2.5-5.3 | 3.9-5.1 | 4.4 |
| Properties | | | | | | | |
| 2 Min OSU [FAR 25.853 (d)] | | | ≤65 kW/m² | | | ≤65 kW/m² | |
| MAHRE [FAR 25.853 (d)] | | | ≤65 kW/m² | | | ≤65 kW/m² | |
| Dmax [ASTM E662] | | | ≤200 | | | ≤200 | |
| Notched Izod [ASTM D 256-10] | | | 480 J/m | | | 400 J/m | |

| Components | | EX-58 -Med. Impact, Good Colorability | | | EX-59 High or medium impact | | |
|---|---|---|---|---|---|---|---|
| | | Range-1 | Range-2 | EX 58A | Range-1 | Range-2 | EX 59A |
| Brominated polymer, wt % ** | | 35-50 | 45-50 | 50 | 35-50 | 45-50 | 50 |
| Siloxane copolymer 4 (D45) | Wt % ** | 10-65 | | 50 | | | |
| | Block Length | 25-50 | | 45 | | | |
| | % Siloxane * | 4.0-10 | | 6.0 | | | |
| | % Siloxane *** | 2.4-5.5 | | ??? | | | |
| Siloxane copolymer 5 (D45) | Wt % | 0-5.0 | | 0 | | | |
| | Block Length | 20-65 | | 45 | | | |
| | % Siloxane * | 15-25 | | 20 | | | |
| | % Siloxane ** | 0-0.9 | | 0 | | | |
| Colorant wt % | | 00002-5.0 | 0.00006.-0.002 | | | | |
| Total | Wt % Bromine | | 9-13 | | | 9-13 | |
| Formulation | Wt % Siloxane | 2.4-5.5 | 3.9-5.1 | | 2.5-6.0 | 4.0-6.0 | 5.5 |

***

TABLE 18-continued

| Properties | | |
|---|---|---|
| 2 Min OSU [FAR 25.853 (d)] | ≤65 kW/m² | ≤65 kW/m² |
| MAHRE [FAR 25.853 (d)] | ≤65 kW/m² | ≤65 kW/m² |
| Dmax [ASTM E662] | ≤200 | ≤200 |
| Notched Izod [ASTM D 256-10] | 400 J/m | ≥2.0 ft-lb/in |

\* Based on the weight of the siloxane-containing copolymer
\*\* Based on the total weight of the polymers in the composition
\*\*\* 10-200 siloxane units per block A series of blends using a siloxane-containing copolymer having first repeating units that are a carbonate unit, an ester unit, an arylene ether unit, an arylene sulfone unit, an arylene ether sulfone unit, an arylene ether ketone unit, or a combination comprising at least one of the foregoing units, specifically a poly(carbonate-siloxane) block copolymer, more specifically a derived from bisphenol A and poly(siloxane) block units derived from a polysiloxane bisphenol of formula (15), (16), or a combination thereof and a brominated polymer (TBBPA-BPA, BC-52, or a brominated epoxy) are made. Impact strength is measured in accordance with ASTM D 256-10. Good colorability is considered when samples show no, or minimal flow lines, swirls or gate blush when injection molded. The color is visually uniform across the molded part. Additionally, the base color (color of the blend without colorants of the blend has a low YI, e.g., below a YI of 12, specifically below 8, more specifically below 5. By controlling the siloxane block size, the amount of siloxane in each copolymer and the total amount of siloxane in the final formulation, optionally combined with a colorant, samples formed of the compositions have controllable impact strength. Likewise, low smoke density and maximum heat release rate are kept within limits required by FAR 25.853 (d)].

Ranges disclosed herein are inclusive and combinable (e.g., ranges of "up to 25 wt %, or, more specifically, 5 wt % to 20 wt %," is inclusive of the endpoints and all intermediate values of the ranges of "5 wt % to 25 wt %," etc.). "Combination" is inclusive of compositions, blends, mixtures, alloys, reaction products, and the like. Furthermore, the terms "first," "second," and the like do not denote any order, quantity, or importance, but rather are used to distinguish one element from another, and the terms "a" and "an" herein do not denote a limitation of quantity, but rather denote the presence of at least one of the referenced item. Reference throughout the specification to "an embodiment", "another embodiment", "an embodiment," and so forth, means that a particular element (e.g., feature, structure, and/or characteristic) described in connection with the embodiment is included in at least an embodiment described herein, and can or cannot be present in other embodiments. In addition, it is to be understood that the described elements can be combined in any suitable manner in the various embodiments. The suffix "(s)" as used herein is intended to include both the singular and the plural of the term that it modifies, thereby including at least one of that term (e.g., the colorant(s) includes at least one colorants).

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. The term "alkyl" includes both $C_{1-30}$ branched and straight chain, unsaturated aliphatic hydrocarbon groups having the specified number of carbon atoms. Examples of alkyl include, but are not limited to, methyl, ethyl, n-propyl, i-propyl, n-butyl, s-butyl, t-butyl, n-pentyl, s-pentyl, n- and s-hexyl, n- and s-heptyl, and, n- and s-octyl. The term "aryl" means an aromatic moiety containing the specified number of carbon atoms, such as to phenyl, tropone, indanyl, or naphthyl. The term "hydrocarbon group" encompasses groups containing the specified number of carbon atoms and having carbon, hydrogen, and optionally one to three heteroatoms selected from O, S, P, and N. Hydrocarbon groups can contain saturated, unsaturated, or aromatic moieties, or a combination comprising any of the foregoing, e.g., an alkyl moiety and an aromatic moiety. Hydrocarbon groups can be halogenated, specifically chlorinated, brominated, or fluorinated, including perfluorinated. The term "aromatic group" includes groups having an aromatic moiety, optionally together with a saturated or unsaturated moiety.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While the invention has been described with reference to embodiments, it will be understood by those skilled in the art that various changes can be made and equivalents can be substituted for elements thereof without departing from the scope of the invention. In addition, many modifications can be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A marine vehicle component wherein the component is a partition or a light cover, and wherein the marine vehicle component is molded or formed from a thermoplastic polymer composition comprising:
   a siloxane-containing copolymer in an amount effective to provide a total of 0.2 to 6.5 wt % of siloxane units based on the total weight of the polymers in the thermoplastic polymer composition,
   a bromine-containing polymer in an amount effective to provide 9 to 13 wt % of bromine, based on the total weight of the polymers in the thermoplastic polymer composition, and
   optionally a third polymer comprising carbonate units, imide units, etherimide units, arylene ether sulfone units, arylene ether units, or a combination thereof, wherein the wt % of the siloxane-containing copolymer, the bromine-containing polymer, and the optional third polymer, sum to 100 wt %, and 0.05 to 10 wt % of a light diffuser additive, based on the total weight of polymers in the thermoplastic polymer composition;

wherein the thermoplastic polymer composition is free of polyarylester-polycarbonate copolymers comprising carbonate units and arylate ester units and the thermoplastic polymer composition is free of polyalkylene esters; and wherein a molded or formed sample of the thermoplastic polymer composition has
a transmission of 20% to 90% or a haze of 70% to 99.9%, each measured using the color space CIE1931 (Illuminant C and a 2° observer) at a thickness of 3.2 mm,
an OSU integrated 2 minute heat release test value of less than 65 kW-min/m² and a peak heat release rate of less than 65 kW/m², each measured using the method of FAR F25.4, in accordance with Federal Aviation Regulation FAR 25.853 (d), and
an E662 smoke test Dmax value of less than 200 when measured at a thickness of 1.6 mm.

2. A marine vehicle component wherein the component is a partition or a light cover, and wherein the component is molded or formed from a thermoplastic polymer composition comprising:

35 to 50 wt % of a bromine-containing polymer based on the total weight of polymers in the thermoplastic polymer composition, wherein the bromine-containing polymer is effective to provide 9 to 13 wt % of bromine, based on the total weight of the polymers in the thermoplastic polymer composition; and 20 to 65 wt % of a siloxane-containing copolymer based on the total weight of the polymers in the thermoplastic polymer composition, wherein the siloxane-containing copolymer comprises a first repeating unit, and a poly(siloxane) unit having the formula:

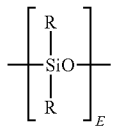

wherein R is each independently a $C_1$-$C_{30}$ hydrocarbon group, and E has an average value of 5 to 200, and wherein the siloxane-containing copolymer is effective to provide a total of 0.2 to 6.5 wt % of siloxane units based on the total weight of the polymers in the thermoplastic polymer composition; and wherein the first repeating unit of the siloxane-containing copolymer comprises a carbonate unit, an ester unit, an arylene sulfone unit, an arylene ether sulfone unit, an arylene ether ketone unit, or a combination comprising at least one of the foregoing units; and optionally a third polymer, wherein the wt % of the siloxane-containing copolymer, the bromine-containing polymer, and the optional third polymer, sum to 100 wt %, and 0.05 to 10 wt % of a light diffuser additive, based on the total weight of polymers in the thermoplastic polymer composition;

wherein a molded or formed sample of the thermoplastic polymer composition has
a transmission of 20% to 90% or a haze of 70% to 99.9%, each measured using the color space CIE1931 (Illuminant C and a 2° observer) at a thickness of 3.2 mm,
an OSU integrated 2 minute heat release test value of less than 65 kW-min/m² and a peak heat release rate of less than 65 kW/m², each measured using the method of FAR F25.4, in accordance with Federal Aviation Regulation FAR 25.853 (d), and
an E662 smoke test DsMax value of less than 200 when measured at a thickness of 1.6 mm.

3. The marine vehicle component of claim 2, wherein the siloxane-containing copolymer comprises
a first siloxane-containing copolymer having an average siloxane block length from 5 to 20, and a siloxane content of 0.5 to 2 wt % based on the weight of the siloxane-containing copolymer, wherein the first siloxane-containing copolymer contributes 0.2 to 6.5 wt. % of siloxane units, based on the total weight of the polymers in the thermoplastic polymer composition, and
an optional second siloxane-containing copolymer having an average siloxane block length from 25 to 65, and a siloxane content of 0.5 to 10 wt % based on the weight of the siloxane-containing copolymer, wherein the optional second siloxane-containing copolymer contributes 0 to 6.3 wt. % of siloxane units, based on the total weight of the polymers in the thermoplastic composition.

4. The marine vehicle component of claim 3, comprising, based on the total weight of the polymers in the thermoplastic polymer composition,
20 to 65 wt. % of the first siloxane-containing copolymer, wherein the first siloxane-containing copolymer has an average siloxane block length from 5 to 15; and
0 to 55 wt % of the optional second siloxane-containing copolymer, wherein the second siloxane-containing copolymer has an average siloxane block length from 35 to 55.

5. The marine vehicle component of claim 2, wherein the siloxane-containing copolymer comprises:
a first siloxane-containing copolymer having an average siloxane block length from 25 to 65, and a siloxane content of 0.5 to 10 wt % based on the weight of the siloxane-containing copolymer, wherein the first siloxane-containing copolymer contributes 0.2 to 6.5 wt. % of siloxane units, based on the total weight of the polymers in the thermoplastic polymer composition, and
an optional second siloxane-containing copolymer having an average siloxane block length from 5 to 20, and a siloxane content of 0.5 to 2 wt % based on the weight of the siloxane-containing copolymer, wherein the optional second siloxane-containing copolymer contributes 0 to 1.5 wt. % siloxane units based on the total weight of the polymers in the thermoplastic polymer composition.

6. The marine vehicle component of claim 5, comprising, based on the total weight of the polymers in the thermoplastic polymer composition,
20 to 65 wt. % of the first siloxane-containing copolymer, wherein the first siloxane-containing copolymer has an average siloxane block length of 35 to 55; and
0 to 55 wt % of the optional second siloxane-containing copolymer, wherein the second siloxane-containing copolymer has an average siloxane block length from 5 to 15.

7. The marine vehicle component of claim 2, wherein the siloxane-containing copolymer is a poly(carbonate-siloxane) derived from at least one dihydroxy aromatic containing polycarbonate unit, and at least one polysiloxane bisphenol of formula (1), formula (2), or a combination thereof:

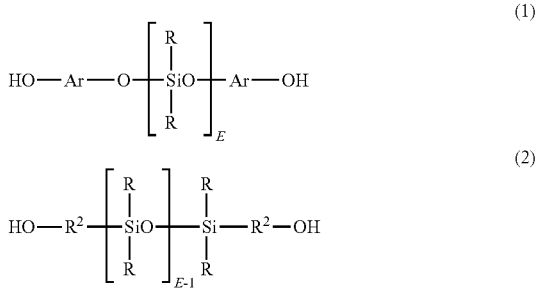

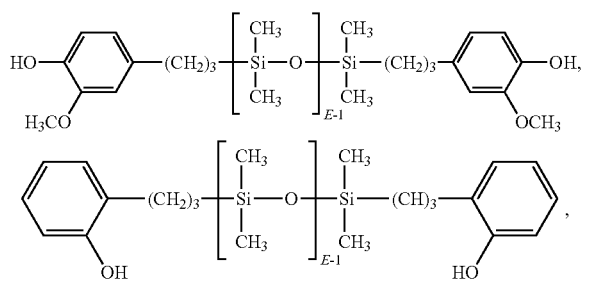

wherein
R is each independently a $C_1$-$C_{30}$ hydrocarbon group,
$R^2$ is each independently a $C_7$-$C_{30}$ hydrocarbon group,
Ar is a $C_6$-$C_{30}$ aromatic group and
E is the average number of siloxane units in each block.

8. The marine vehicle component of claim 7, wherein the siloxane-containing copolymer is a poly(carbonate-siloxane) comprising carbonate units derived from bisphenol A and poly(siloxane) units derived from a polysiloxane bisphenol of the formula

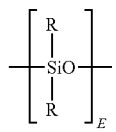

or a combination thereof and wherein E is the average number of siloxane units in each block;
the bromine-containing polymer is a brominated epoxy polymer, a polycarbonate copolymer comprising first carbonate repeating units derived from bisphenol-A and second repeating brominated carbonate units derived from 2,2',6,6'-tetrabromo-4,4'-isopropylidenediphenol, a tetrabromo-bisphenol-A homopolymer, or a combination comprising at least one of the foregoing; and
the optional third polymer is a Bisphenol-A homopolymer.

9. The marine vehicle component of claim 2, wherein the light diffuser additive comprises silicone, polymethylsilsesquioxane, crosslinked poly(methyl methacrylate), methyl methacrylate/ethyleneglycol dimethacrylate copolymer, $TiO_2$, or a combination comprising at least one of the foregoing.

10. The marine vehicle component of claim 2, further comprising 0.00002 to 5.0 wt % of a colorant based on the total weight of the polymers in the thermoplastic polymer composition.

11. A marine vehicle component, wherein the component is a trolley sidewall, an access door, or an access panel, and wherein the component is molded or formed from a thermoplastic polymer composition comprising:
35 to 50 wt % of a bromine-containing polymer based on the total weight of polymers in the thermoplastic polymer composition, wherein the bromine-containing polymer is effective to provide 9 to 13 wt % of bromine, based on the total weight of the polymers in the thermoplastic polymer composition; and
20 to 65 wt % of a siloxane-containing copolymer based on the total weight of the polymers in the thermoplastic polymer composition, wherein the siloxane-containing copolymer comprises a first repeating unit, and a poly (siloxane) unit having the formula:

$$\left[\begin{array}{c} R \\ | \\ SiO \\ | \\ R \end{array}\right]_E$$

wherein R is each independently a $C_1$-$C_{30}$ hydrocarbon group, and E has an average value of 5 to 200, and wherein the siloxane-containing copolymer is effective to provide a total of 0.2 to 6.5 wt % of siloxane units based on the total weight of the polymers in the thermoplastic polymer composition;
wherein the first repeating unit of the siloxane-containing copolymer comprises a carbonate unit, an ester unit, an arylene sulfone unit, an arylene ether sulfone unit, an arylene ether ketone unit, or a combination comprising at least one of the foregoing units; and
optionally a third polymer, wherein the wt % of the siloxane-containing copolymer, the bromine-containing polymer, and the optional third polymer, sum to 100 wt %;
wherein a molded or formed sample of the thermoplastic polymer composition has
a transmission of 70% to 87% or a haze of 2% to 10%, each measured using the color space CIE 1931 (Illuminant C and a 2° observer) at a thickness of 3.2 mm,
an OSU integrated 2 minute heat release test value of less than 65 kW-min/m2 and a peak heat release rate of less than 65 kW/m2, each measured using the method of FAR F25.4, in accordance with Federal Aviation Regulation FAR 25.853 (d), and
an E662 smoke test DsMax value of less than 200 when measured at a thickness of 1.6 mm.

12. The marine vehicle component of claim 11, the siloxane-containing copolymer comprises:
a first siloxane-containing copolymer having an average siloxane block length from 5 to 20, and a siloxane content of 0.5 to 2 wt % based on the weight of the siloxane-containing copolymer, wherein the first siloxane-containing copolymer contributes 0.2 to 6.5 wt. % of siloxane units, based on the total weight of the polymers in the thermoplastic polymer composition, and
an optional second siloxane-containing copolymer having an average siloxane block length from 25 to 65, and a siloxane content of 0.5 to 10 wt % based on the weight of the siloxane-containing copolymer, wherein the optional second siloxane-containing copolymer contributes 0 to 6.2 wt. % of siloxane units, based on the total weight of the polymers in the thermoplastic polymer composition.

13. The marine vehicle component of claim 12 comprising, based on the total weight of the polymers in the thermoplastic polymer composition,
20 to 65 wt. % of the first siloxane-containing copolymer, wherein the first siloxane-containing copolymer has an average siloxane block length from 5 to 15; and 0 to 60 wt % of the optional second siloxane-containing copolymer, wherein the second siloxane-containing copolymer has an average siloxane block length from 35 to 55.

14. The marine vehicle component of claim 11, wherein the siloxane-containing copolymer comprises, a first siloxane-containing copolymer comprising an average siloxane block length from 25 to 65, and a siloxane content of 2 to 10 wt % based on the weight of the siloxane-containing copolymer, wherein the first siloxane-containing copolymer contributes 0.3 to 4.0 wt. % of siloxane units, based on the total weight of the polymers in the thermoplastic polymer composition, and an optional second siloxane-containing copolymer comprising an average siloxane block length from 5 to 20, and a siloxane content of 0.5 to 2 wt %, based on the weight of the siloxane-containing copolymer, wherein the optional second siloxane-containing copolymer contributes 0 to 0.4 wt. % of siloxane units, based on the total weight of the polymers in the thermoplastic polymer composition.

15. The marine vehicle component of claim 14, comprising, based on the total weight of the polymers in the thermoplastic polymer composition, 20 to 65 wt. % of the first siloxane-containing copolymer, wherein the first siloxane-containing copolymer has an average siloxane block length of 35 to 55; and 0 to 60 wt % of the optional second siloxane-containing copolymer, wherein the second siloxane-containing copolymer has an average siloxane block length from 5 to 15.

16. The marine vehicle component of claim 12, wherein the siloxane-containing copolymer is a poly(carbonate-siloxane) derived from at least one dihydroxy aromatic containing polycarbonate unit, and at least one polysiloxane bisphenol of formula (1), formula (2), or a combination thereof

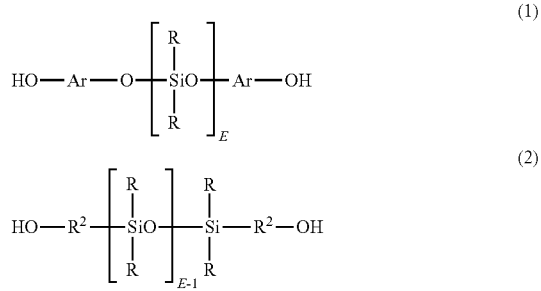

wherein

R is each independently a $C_1$-$C_{30}$ hydrocarbon group, $R^2$ is each independently a $C_7$-$C_{30}$ hydrocarbon group, Ar is a $C_6$-$C_{30}$ aromatic group and E is the average number of siloxane units in each block.

17. The marine vehicle component of claim 16, wherein the siloxane-containing copolymer is a poly(carbonate-siloxane) comprising carbonate units derived from bisphenol A and poly(siloxane) units derived from a polysiloxane bisphenol of the formula

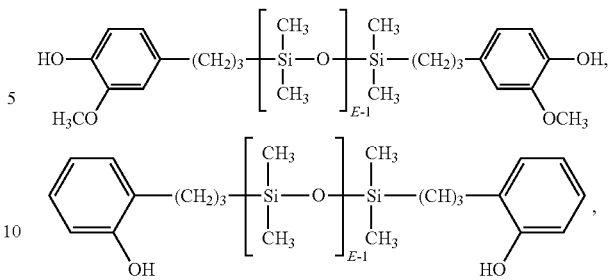

or a combination thereof and wherein E is the average number of siloxane units in each block;

the bromine-containing polymer is a brominated epoxy polymer, a polycarbonate copolymer comprising first carbonate repeating units derived from bisphenol-A and second repeating brominated carbonate units derived from 2,2',6,6'-tetrabromo-4,4'-isopropylidenediphenol, a tetrabromo-bisphenol-A homopolymer, or a combination comprising at least one of the foregoing; and the optional third polymer is a Bisphenol-A homopolymer.

18. The marine vehicle component of claim 11, further comprising 0.00002 to 5.0 wt % of a colorant based on the total weight of the polymers in the thermoplastic polymer composition.

19. A marine vehicle component that is a partition or a light cover, wherein the marine vehicle component is molded or formed from the thermoplastic polymer composition of claim 11, further comprising 0.2 to 3.0 wt % of a light diffuser additive based on the total weight of the polymers in the thermoplastic composition.

20. The marine vehicle component of claim 19, wherein the diffuser additive is silicone, polymethylsilsesquioxane, crosslinked poly(methyl methacrylate), methyl methacrylate/ethyleneglycol dimethacrylate copolymer, $TiO_2$, and a combination comprising at least one of the foregoing.

21. The marine vehicle component of claim 20, comprising 0.2 to 3.0 wt % of the polymethylsilsesquioxane light diffuser additive.

22. The marine vehicle component of claim 21, comprising 0.4 to 1.5 wt % of the crosslinked poly(methyl methacrylate) light diffuser additive, 0.4 to 1.5 wt % of the polymethylsilsesquioxane light diffuser additive, or a combination thereof, provided that the total amount of light diffuser additive is 3.0 wt % or less.

23. A marine vehicle component, wherein the marine vehicle component is a window, window dust cover, partition, light cover, electronics screen, display cover, or plastic mirror, and wherein the marine vehicle component is molded or formed from a thermoplastic polymer composition comprising:

a siloxane-containing copolymer in an amount effective to provide a total of 0.2 to 1.5 wt % of siloxane units based on the total weight of polymers in the thermoplastic polymer composition;

a bromine-containing polymer in an amount effective to provide 9 to 13 wt % of bromine, based on the total weight of the polymers in the thermoplastic polymer composition, and optionally, a third polymer comprising carbonate units, imide units, etherimide units, arylene ether sulfone units, arylene ether units, or a combination thereof, wherein the wt % of the siloxane-containing copolymer, the bromine-containing polymer, and the optional third polymer sum to 100 wt %;

wherein the thermoplastic polymer composition is free of polyarylester-polycarbonate copolymers comprising carbonate units and arylate ester units and the thermoplastic polymer composition is free of polyalkylene esters; and wherein a molded or formed sample of the thermoplastic polymer composition has a transmission of 87% or more or a haze of 2% or less, each measured using the color space CIE 1931 (Illuminant C and a 2° observer) at a thickness of 3.2 mm, an OSU integrated 2 minute heat release test value of less than 65 kW-min/m$^2$ and a peak heat release rate of less than 65 kW/m$^2$, each measured using the method of FAR F25.4, in accordance with Federal Aviation Regulation FAR 25.853 (d), and an E662 smoke test Dmax value of less than 200 when measured at a thickness of 1.6 mm.

24. A marine vehicle component wherein the component is a window, window dust cover, partition, light cover, electronics screen, display cover, or plastic mirror, and wherein the component is molded or formed from a thermoplastic polymer composition, comprising 35 to 50 wt % of a bromine-containing polymer based on the total weight of polymers in the thermoplastic polymer composition, wherein the bromine-containing polymer is effective to provide 9 to 13 wt % of bromine, based on the total weight of the polymers in the thermoplastic polymer composition; and 20 to 65 wt % of a siloxane-containing copolymer based on the total weight of the polymers in the thermoplastic polymer composition, wherein the siloxane-containing copolymer comprises a first repeating unit, and a poly (siloxane) unit having the formula

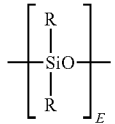

wherein R is each independently a $C_1$-$C_{30}$ hydrocarbon group, and E is the average number of siloxane units in each block, and wherein the siloxane-containing copolymer is effective to provide a total of 0.2 to 1.5 wt % of siloxane units based on the total weight of polymers in the thermoplastic polymer composition; and wherein the first repeating unit of the siloxane-containing copolymer comprises a carbonate unit, an ester unit, an arylene sulfone unit, an arylene ether sulfone unit, an arylene ether ketone unit, or a combination comprising at least one of the foregoing units; and optionally, a third polymer, wherein the wt % of the siloxane-containing copolymer, the bromine-containing polymer, and the optional third polymer sum to 100 wt %;

wherein a molded or formed sample of the thermoplastic polymer composition has a transmission of 87% or more or a haze of 2% or less, each measured using the color space CIE 1931 (Illuminant C and a 2° observer) at a thickness of 3.2 mm, an OSU integrated 2 minute heat release test value of less than 65 kW-min/m$^2$ and a peak heat release rate of less than 65 kW/m$^2$, each measured using the method of FAR F25.4, in accordance with Federal Aviation Regulation FAR 25.853 (d), and an E662 smoke test DsMax value of less than 200 when measured at a thickness of 1.6 mm.

25. The marine vehicle component of claim 24, wherein the siloxane-containing copolymer comprises:

a first siloxane-containing copolymer comprising an average siloxane block length from 5 to 20, and a siloxane content of 0.5 to 2 wt % based on the weight of the siloxane-containing copolymer, wherein the first siloxane-containing copolymer contributes 0.2 to 1.5 wt. % of siloxane units, based on the total weight of the polymers in the thermoplastic polymer composition, and an optional second siloxane-containing copolymer comprising an average siloxane block length from 25 to 65, and a siloxane content of 0.5 to 10 wt %, based on the weight of the siloxane-containing copolymer, wherein the optional second siloxane-containing copolymer contributes 0 to 1.3 wt. % of siloxane units, based on the total weight of the polymers in the thermoplastic polymer composition.

26. The marine vehicle component of claim 25 comprising, based on the total weight of the polymers in the thermoplastic polymer composition, 20 to 65 wt. % of the first siloxane-containing copolymer, wherein the first siloxane-containing copolymer has an average siloxane block length from 5 to 20; and 0 to 30 wt % of the optional second siloxane-containing copolymer, wherein the second siloxane-containing copolymer has an average siloxane block length from 20 to 40.

27. The marine vehicle component of claim 24, wherein the siloxane-containing copolymer is a poly(carbonate-siloxane) derived from at least one dihydroxy aromatic containing polycarbonate unit, and at least one polysiloxane bisphenol of formula (1), formula (2), or a combination thereof:

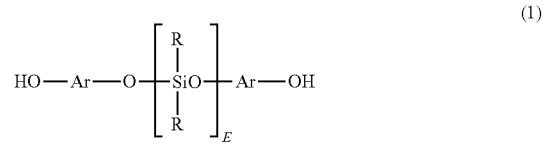

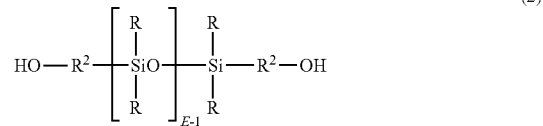

wherein
R is each independently a $C_1$-$C_{30}$ hydrocarbon group,
$R^2$ is each independently a $C_7$-$C_{30}$ hydrocarbon group,
Ar is a $C_6$-$C_{30}$ aromatic group and
E is the average number of siloxane units in each block.

28. The marine vehicle component of claim 27, wherein the siloxane-containing copolymer is a poly(carbonate-siloxane) comprising carbonate units derived from bisphenol A and poly(siloxane) units derived from a polysiloxane bisphenol of the formula

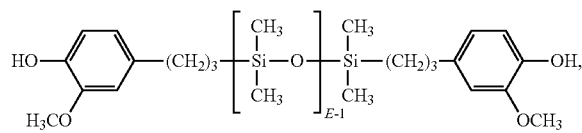

-continued

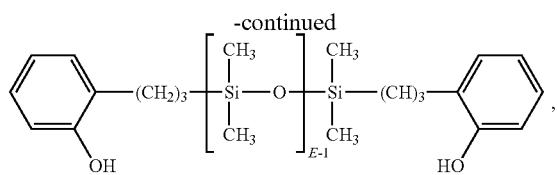

or a combination thereof and wherein E is the average number of siloxane units in each block;

the bromine-containing polymer is a brominated epoxy polymer, a polycarbonate copolymer comprising first carbonate repeating units derived from bisphenol-A and second repeating brominated carbonate units derived from 2,2',6,6'-tetrabromo-4,4'-isopropylidenediphenol, a tetrabromo-bisphenol-A homopolymer, or a combination comprising at least one of the foregoing; and the optional third polymer is a Bisphenol-A homopolymer.

29. The marine vehicle component of claim 23, further comprising 0.00002 to 5.0 wt % of a colorant based on the total weight of the polymers in the thermoplastic polymer composition.

30. The marine vehicle component of claim 29, comprising 0.00003 to 0.001 wt % of a blue colorant and 0.00003 to 0.001% of violet colorant;
a phosphite heat stabilizer; and
a UV absorber.

31. The marine vehicle component of claim 30, wherein the blue colorant is Pigment Blue 60 and the violet colorant is Solvent Violet 36.

32. The marine vehicle component of claim 31, wherein the UV absorber is 2,2'-(1,4-phenylene)bis-2,2'-(1,4-phenylene)bis(4H-3,1-benzoxazin-4-one); 2-(2'hydroxy-5-t-octylphenyl)-benzotriazole; 2-(2H-benzotriazol-2-yl)4,6-bis(1-ethyl-1-phenylethylphenol; or a combination comprising at least one of the forgoing.

33. The marine vehicle component of claim 24 wherein the component is a partition or a light cover, and wherein the thermoplastic polymer composition further comprises 0.2 to 2.0 wt % of a light diffuser additive based on the total weight of the polymers in the thermoplastic polymer composition.

34. The marine vehicle component of claim 33, wherein the diffuser additive comprise silicone, polymethylsilsesquioxane, crosslinked poly(methyl methacrylate), methyl methacrylate/ethyleneglycol dimethacrylate copolymer, $TiO_2$, or a combination comprising at least one of the foregoing.

35. The marine vehicle component of claim 34, comprising 0.2 to 2.0 wt % of the polymethylsilsesquioxane light diffuser additive.

36. The marine vehicle component of claim 33, comprising 0.4 to 1.5 wt % of the crosslinked poly(methyl methacrylate) light diffuser additive, 0.4 to 1.5 wt % of the polymethylsilsesquioxane light diffuser additive, or a combination thereof, provided that the total amount of light diffuser additive is 3 wt % or less.

37. The marine vehicle component of claim 24, wherein the component is a window article comprising a sheet supported by a frame, wherein the sheet is molded or formed from the thermoplastic polymer composition.

38. The marine vehicle component of claim 37, wherein the sheet has a first side and a second opposite side, and the window article further comprises a first hard coat layer disposed on the first side and a second hard coat layer disposed on the second side.

39. The marine vehicle component of claim 38, further comprising a first ultraviolet light-blocking layer disposed between the first hard coat layer and the first side of the sheet, and
a second ultraviolet light-blocking layer disposed between the second hard coat layer and the second side of the sheet.

40. The marine vehicle component of claim 37, wherein the component is a dust cover for a window, the window comprising:
an outer window and an inner window separated by a space;
the dust cover separated from the inner window by a space, and
a frame,
wherein the outer window, inner window, and dust cover are secured in the frame such that the inner window is disposed between and is substantially coplanar with each of the dust cover and the outer window.

41. The marine vehicle component of claim 24, wherein the component is a mirror, comprising:
a layer molded or formed from the thermoplastic polymer composition,
a hard coat disposed on a surface of a first side of the layer, and
an opacifying layer disposed on a surface of a second side of the layer opposite the first side.

42. The mirror of claim 41, wherein the opacifying layer is a metal layer.

43. The mirror of claim 41, further comprising a protective coat disposed on a surface of the opacifying layer opposite the layer molded or formed from the thermoplastic polymer composition.

44. A marine vehicle component, wherein the component is an access door panel, a seat component and a component of a trolley cart, wherein the component is molded or formed from a thermoplastic polymer composition comprising
35 to 50 wt % of a bromine-containing polymer based on the total weight of polymers in the thermoplastic polymer composition, wherein the bromine-containing polymer is effective to provide 9 to 13 wt % of bromine, based on the total weight of the polymers in the thermoplastic polymer composition; and
20 to 65 wt % of a siloxane-containing copolymer based on the total weight of the polymers in the thermoplastic polymer composition, wherein the siloxane-containing copolymer comprises a first repeating unit, and a poly(siloxane) unit having the formula:

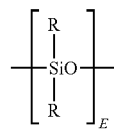

wherein R is each independently a $C_1$-$C_{30}$ hydrocarbon group, and E has an average value of 5 to 200, and wherein the siloxane-containing copolymer is effective to provide a total of 2.5 to 6.0 wt % of siloxane units based on the total weight of polymers in the thermoplastic polymer composition;
wherein the first repeating unit of the siloxane-containing copolymer comprises a carbonate unit, an ester unit, an arylene sulfone unit, an arylene ether sulfone unit, an arylene ether ketone unit, or a combination comprising at least one of the foregoing units; and optionally, a third polymer wherein the wt % of the siloxane-containing copolymer, the bromine-containing polymer, and the optional third polymer, sum to 100 wt %;

wherein a molded or formed sample of the thermoplastic polymer composition has a notched Izod impact strength of 480 J/m or greater, measured according to ASTM D 256-10 at a 3.2 mm thickness at 0° C., an OSU integrated 2 minute heat release test value of less than 65 kW-min/m$^2$ and a peak heat release rate of less than 65 kW/m$^2$, each measured using the method of FAR F25.4, in accordance with Federal Aviation Regulation FAR 25.853 (d), and an E662 smoke test DsMax value of less than 200 when measured at a thickness of 1.6 mm.

45. The high-impact marine vehicle component of claim 44, wherein the siloxane-containing copolymer comprises a first siloxane-containing copolymer having an average siloxane block length from 25 to 65, and a siloxane content of 15 to 25 wt % based on the weight of the siloxane-containing copolymer, wherein the optional second siloxane-containing copolymer contributes 2.5 to 6.0 wt. % of siloxane units, based on the total weight of the polymers in the thermoplastic polymer composition; and a second, optional siloxane-containing copolymer having an average siloxane block length from 25 to 65, and a siloxane content of 4 to 10 wt % based on the weight of the siloxane-containing copolymer, wherein the second siloxane-containing copolymer contributes 0 to 3.0 wt. % of siloxane units, based on the total weight of the polymers in the thermoplastic polymer composition.

46. The marine vehicle component of claim 45, comprising 20 to 40 wt. % of the first siloxane-containing copolymer, wherein the first siloxane-containing copolymer has an average siloxane block length from 40 to 50; and 0 to 37 wt % of the optional second siloxane-containing copolymer, wherein the second siloxane-containing copolymer has an average siloxane block length from 40 to 50.

47. The marine vehicle component of claim 44, wherein the siloxane-containing copolymer is a poly(carbonate-siloxane) derived from at least one dihydroxy aromatic containing polycarbonate unit, and at least one polysiloxane bisphenol of formula (1), formula (2), or a combination thereof:

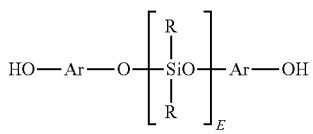

(1)

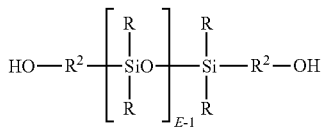

(2)

wherein

R is each independently a C$_1$-C$_{30}$ hydrocarbon group,
R$^2$ is each independently a C$_7$-C$_{30}$ hydrocarbon group,
Ar is a C$_6$-C$_{30}$ aromatic group and
E is the average number of siloxane units in each block.

48. The marine vehicle component of claim 47, wherein the siloxane-containing copolymer is a poly(carbonate-siloxane) comprising carbonate units derived from bisphenol A and poly(siloxane) units derived from a polysiloxane bisphenol of the formula

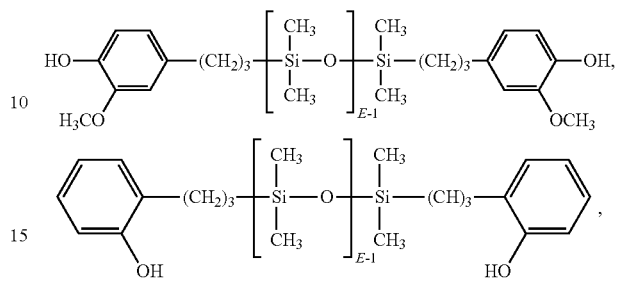

or a combination thereof and wherein E is the average number of siloxane units in each block;

the bromine-containing polymer is a brominated epoxy polymer, a polycarbonate copolymer comprising first carbonate repeating units derived from bisphenol-A and second repeating brominated carbonate units derived from 2,2',6,6'-tetrabromo-4,4'-isopropylidenediphenol, a tetrabromo-bisphenol-A homopolymer, or a combination comprising at least one of the foregoing; and the optional third polymer is a Bisphenol-A homopolymer.

49. A colored marine vehicle component, wherein the component is a stow bin component, a magazine rack, a seat component, a component of a trolley cart, and an access door panel, wherein the component is molded or formed from a thermoplastic polymer composition comprising 35 to 50 wt % of a bromine-containing polymer based on the total weight of polymers in the thermoplastic polymer composition, wherein the bromine-containing polymer is effective to provide 9 to 13 wt % of bromine, based on the total weight of the polymers in the thermoplastic polymer composition; and 20 to 65 wt % of a siloxane-containing copolymer based on the total weight of the polymers in the thermoplastic polymer composition, wherein the siloxane-containing copolymer comprises a first repeating unit, and a poly(siloxane) unit having the formula:

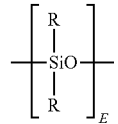

wherein R is each independently a C$_1$-C$_{30}$ hydrocarbon group, and E has an average value of 5 to 200, wherein the siloxane-containing copolymer is effective to provide a total of 2.5 to 5.3 wt % of siloxane units based on the total weight of polymers in the thermoplastic polymer composition;

wherein the first repeating unit of the siloxane-containing copolymer comprises a carbonate unit, an ester unit, an arylene sulfone unit, an arylene ether sulfone unit, an arylene ether ketone unit, or a combination comprising at least one of the foregoing units; and optionally, a third polymer wherein the wt % of the siloxane-containing copolymer, the bromine-containing polymer, and the optional third polymer, sum to 100 wt %; and 0.00002 to 5.0 wt % of a colorant based on the total weight of the polymers in the thermoplastic polymer composition, wherein a molded or formed sample of the thermoplastic polymer composition has a notched izod impact strength of 400 J/m or greater, measured at 10° C. according to ASTM D 256-10 at a 3.2 mm thickness, an OSU integrated 2 minute heat release test value of less than 65 kW-min/m² and a peak heat release rate of less than 65 kW/m², each measured using the method of FAR F25.4, in accordance with Federal Aviation Regulation FAR 25.853 (d), and an E662 smoke test DsMax value of less than 200 when measured at a thickness of 1.6 mm.

50. The colored marine vehicle component of claim 49, wherein the siloxane-containing copolymer comprises a first siloxane-containing copolymer comprising an average siloxane block length from 25 to 65, and a siloxane content of 15 to 25 wt % based on the weight of the siloxane-containing copolymer, wherein the first siloxane-containing copolymer contributes 1.0 to 2.5 wt. % of siloxane units, based on the total weight of the polymers in the thermoplastic polymer composition, and a second siloxane-containing copolymer comprising an average siloxane block length from 25 to 65, and a siloxane content of 4 to 10 wt %, based on the weight of the siloxane-containing copolymer, wherein the second siloxane-containing copolymer contributes 0.3 to 3 wt. % of siloxane units, based on the total weight of the polymers in the thermoplastic polymer composition, with the proviso that the composition comprises a total of 2.5 to 5.3 wt % of siloxane units, based on the total weight of polymers in the thermoplastic polymer composition.

51. The colored marine vehicle component of claim 50, comprising, based on the total weight of the polymers in the thermoplastic polymer composition, 5 to 12 wt. % of the first siloxane-containing copolymer, wherein the first siloxane-containing copolymer has an average siloxane block length from 35 to 55; and 38 to 55 wt % of the optional second siloxane-containing copolymer, wherein the second siloxane-containing copolymer has an average siloxane block length from 35 to 55.

52. The colored marine vehicle component of claim 49, wherein the siloxane-containing copolymer is a poly(carbonate-siloxane) derived from at least one dihydroxy aromatic containing polycarbonate unit, and at least one polysiloxane bisphenol of formula (1), formula (2), or a combination thereof

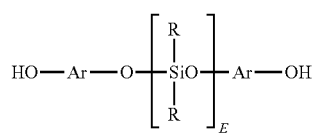  (1)

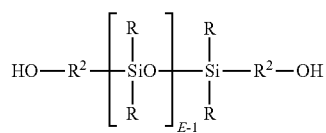  (2)

wherein

R is each independently a $C_1$-$C_{30}$ hydrocarbon group, $R^2$ is each independently a $C_7$-$C_{30}$ hydrocarbon group, Ar is a $C_6$-$C_{30}$ aromatic group and E is the average number of siloxane units in each block.

53. The colored marine vehicle component of claim 52, wherein the siloxane-containing copolymer is a poly(carbonate-siloxane) comprising carbonate units derived from bisphenol A and poly(siloxane) units derived from a polysiloxane bisphenol of the formula

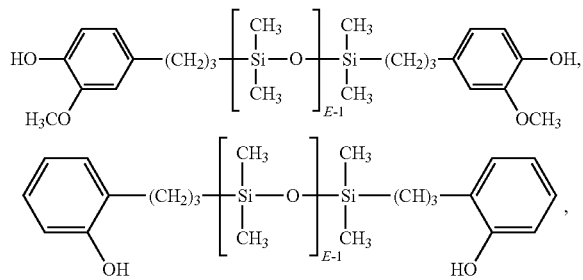

or a combination thereof and wherein E is the average number of siloxane units in each block;

the bromine-containing polymer is a brominated epoxy polymer, a polycarbonate copolymer comprising first carbonate repeating units derived from bisphenol-A and second repeating brominated carbonate units derived from 2,2',6,6'-tetrabromo-4,4'-isopropylidenediphenol, a tetrabromo-bisphenol-A homopolymer, or a combination comprising at least one of the foregoing; and the optional third polymer is a Bisphenol-A homopolymer.

54. The marine vehicle component of claim 49, comprising 0.025 to 5 wt % $TiO_2$, based on the total weight of the polymers in the composition.

55. The marine vehicle component of claim 49, comprising 0.00002 wt % to 0.02 wt % of Solvent Red 135, Solvent Red 52, or a combination comprising at least one of the foregoing; and 0.00002 to 0.02% of a Pigment Blue 28, Pigment Blue 29:77007, or a combination comprising at least one of the foregoing.

56. The marine vehicle component of claim 49, comprising 0.0001 to 0.1 wt % of carbon black.

57. The marine vehicle component of claim 49, wherein at least a portion of a surface of the component is painted.

58. A marine vehicle component, wherein the component is an access door panel, a seat component, a component of a stow bin, a magazine rack, a seat component, a component of a trolley cart, an access door panel call button, a light bezel, a door pull, a door handle, an arm rest, a foot rest, or a trolley cart, wherein the marine vehicle component is molded or formed from a thermoplastic polymer composition comprising a siloxane-containing copolymer in an amount effective to provide a total of 2.5 to 6.0 wt % of siloxane units based on the total weight of polymers in the thermoplastic polymer composition, and wherein the siloxane-containing copolymer comprises siloxane blocks having 10 to 200 siloxane units per block;

a bromine-containing polymer in an amount effective to provide 9 to 13 wt % of bromine, based on the total weight of the polymers in the thermoplastic polymer composition, and optionally a third polymer comprising carbonate units, imide units, etherimide units, arylene ether sulfone units, arylene ether units, or a combination thereof, wherein the wt % of the siloxane-containing copolymer, the bromine-containing polymer, and the optional third polymer, sum to 100 wt %;

wherein the thermoplastic polymer composition is free of polyarylester-polycarbonate copolymers comprising carbonate units and arylate ester units and the thermoplastic polymer composition is free of polyalkylene esters; and wherein a molded or formed sample of the thermoplastic polymer composition has a notched Izod impact strength of 2.0 ft-lb/in or greater, measured according to ASTM D 256-10 at a 3.2 mm thickness at room temperature, an OSU integrated 2 minute heat release test value of less than 65 kW-min/m$^2$ and a peak heat release rate of less than 65 kW/m$^2$, each measured using the method of FAR F25.4, in accordance with Federal Aviation Regulation FAR 25.853 (d), and an E662 smoke test Dmax value of less than 200 when measured at a thickness of 1.6 mm.

59. A marine vehicle component of, wherein the component is an access door panel, a seat component, a component of a stow bin, a magazine rack, a seat component, a component of a trolley cart, an access door panel call button, a light bezel, a door pull, a door handle, an arm rest, a foot rest, or a trolley cart, wherein the component is molded or formed from a thermoplastic polymer composition comprising 35 to 50 wt % of a bromine-containing polymer based on the total weight of polymers in the thermoplastic polymer composition, wherein bromine-containing polymer is effective to provide 9 to 13 wt % of bromine, based on the total weight of the polymers in the thermoplastic polymer composition; and 20 to 65 wt % of a siloxane-containing copolymer based on the total weight of the polymers in the thermoplastic polymer composition, wherein the siloxane-containing copolymer comprises a first repeating unit, and a poly(siloxane) unit having the formula:

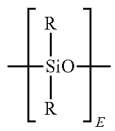

wherein R is each independently a $C_1$-$C_{30}$ hydrocarbon group, and E has an average value of 5 to 200, wherein the siloxane-containing copolymer is effective to provide a total of 2.5 to 6.0 wt % of siloxane units based on the total weight of polymers in the thermoplastic polymer composition;

wherein the first repeating unit of the siloxane-containing copolymer comprises a carbonate unit, an ester unit, an arylene sulfone unit, an arylene ether sulfone unit, an arylene ether ketone unit, or a combination comprising at least one of the foregoing units; and optionally a third polymer, wherein the wt % of the siloxane-containing copolymer, the bromine-containing polymer, and the optional third polymer, sum to 100 wt %;

wherein a molded or formed sample of the thermoplastic polymer composition has a notched Izod impact strength of 2.0 ft-lb/in or greater, measured according to ASTM D 256-10 at a 3.2 mm thickness at room temperature, an OSU integrated 2 minute heat release test value of less than 65 kW-min/m$^2$ and a peak heat release rate of less than 65 kW/m$^2$, each measured using the method of FAR F25.4, in accordance with Federal Aviation Regulation FAR 25.853 (d), and an E662 smoke test DsMax value of less than 200 when measured at a thickness of 1.6 mm.

60. The marine vehicle component of claim 59, wherein the siloxane-containing copolymer is a poly(carbonate-siloxane) derived from at least one dihydroxy aromatic containing polycarbonate unit, and at least one polysiloxane bisphenol of formula (1), formula (2), or a combination thereof:

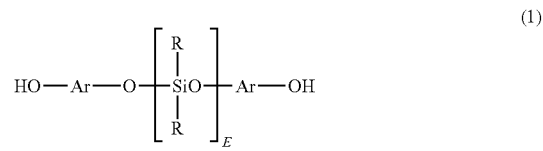

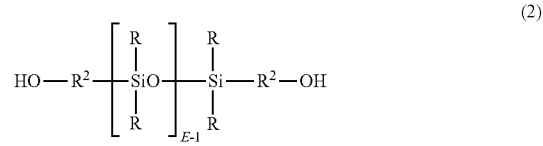

wherein

R is each independently a $C_1$-$C_{30}$ hydrocarbon group,

R$^2$ is each independently a $C_7$-$C_{30}$ hydrocarbon group,

Ar is a $C_6$-$C_{30}$ aromatic group, and

E is the number of siloxane units in each block.

61. The marine vehicle component of claim 60, wherein the siloxane-containing copolymer is a poly(carbonate-siloxane) comprising carbonate units derived from bisphenol A and poly(siloxane) units derived from a polysiloxane bisphenol of the formula

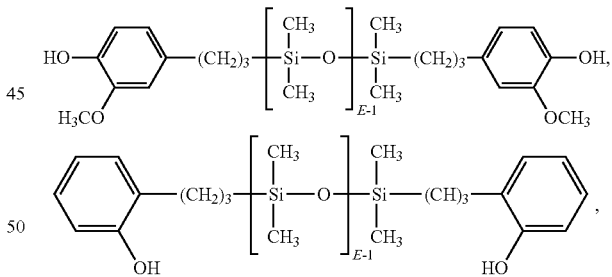

or a combination thereof and wherein E is the average number of siloxane units in each block;

the bromine-containing polymer is a brominated epoxy polymer, a polycarbonate copolymer comprising first carbonate repeating units derived from bisphenol-A and second repeating brominated carbonate units derived from 2,2',6,6'-tetrabromo-4,4'-isopropylidenediphenol, a tetrabromo-bisphenol-A homopolymer, or a combination comprising at least one of the foregoing; and the optional third polymer is a Bisphenol-A homopolymer.

62. The marine vehicle component of claim 59, further comprising 0.00002 to 5.0 wt % of a colorant based on the total weight of the polymers in the thermoplastic polymer composition.

63. The marine vehicle component of claim 62, comprising 0.025 to 5 wt % $TiO_2$, based on the total weight of the polymers in the composition.

64. The marine vehicle component of claim 62, comprising
0.00002 wt % to 0.02 wt % of Solvent Red 135, Solvent Red 52, or a combination comprising at least one of the foregoing; and
0.00002 to 0.02% of Pigment Blue 28, Pigment Blue 29:77007, or a combination comprising at least one of the foregoing.

65. The marine vehicle component of claim 62, comprising 0.0001 to 0.1 wt % of carbon black.

66. The marine vehicle component of claim 62, wherein at least a portion of a surface of the component is painted.

67. The marine vehicle component of claim 23,
wherein a molded plaque of the siloxane-containing copolymer has a percent haze value of 3% or less measured using the color space CIE 1931 (Illuminant C and a 2° observer) at a thickness of 3.2 mm.

68. The marine vehicle component of claim 24, wherein a molded plaque of the siloxane-containing copolymer has a percent haze value of 3% or less measured using the color space CIE 1931 (Illuminant C and a 2° observer) at a thickness of 3.2 mm.

69. The marine vehicle component of claim 68, wherein the siloxane-containing copolymer is a poly(carbonate-siloxane) derived from at least one dihydroxy aromatic containing polycarbonate unit, and at least one polysiloxane bisphenol of formula (1), formula (2), or a combination thereof

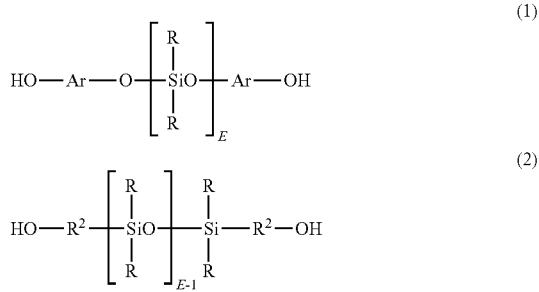

wherein
R is each independently a $C_1$-$C_{30}$ hydrocarbon group,
$R^2$ is each independently a $C_7$-$C_{30}$ hydrocarbon group,
Ar is a $C_6$-$C_{30}$ aromatic group and
E is the average number of siloxane units in each block.

70. The marine vehicle component of claim 69, wherein the siloxane-containing copolymer is a poly(carbonate-siloxane) comprising carbonate units derived from bisphenol A and poly(siloxane) units derived from a polysiloxane bisphenol of the formula

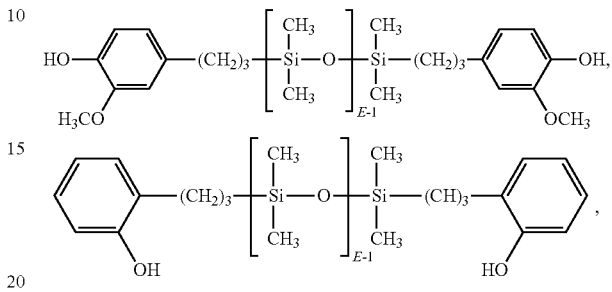

or a combination thereof and wherein E is the average number of siloxane units in each block;
the bromine-containing polymer is a brominated epoxy polymer, a polycarbonate copolymer comprising first carbonate repeating units derived from bisphenol-A and second repeating brominated carbonate units derived from 2,2',6,6'-tetrabromo-4,4'-isopropylidenediphenol, a tetrabromo-bisphenol-A homopolymer, or a combination comprising at least one of the foregoing; and
the optional third polymer is a Bisphenol-A homopolymer.

71. The marine vehicle component of claim 67, further comprising 0.05 to 10 wt % of a light diffuser additive, based on the total weight of polymers in the thermoplastic polymer composition.

72. The marine vehicle component of claim 71, wherein the light diffuser additive comprises silicone, polymethylsilsesquioxane, crosslinked poly(methyl methacrylate), methyl methacrylate/ethyleneglycol dimethacrylate copolymer, $TiO_2$, or a combination comprising at least one of the foregoing.

73. The marine vehicle component of claim 67, further comprising 0.00002 to 5.0 wt % of a colorant based on the total weight of the polymers in the thermoplastic polymer composition.

\* \* \* \* \*